US012674869B2

(12) United States Patent
Ma

(10) Patent No.: US 12,674,869 B2
(45) Date of Patent: Jul. 7, 2026

(54) LiDAR AND AUTOMATED DRIVING DEVICE

(71) Applicant: SUTENG INNOVATION TECHNOLOGY CO., LTD., Shenzhen (CN)

(72) Inventor: Dinglong Ma, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 951 days.

(21) Appl. No.: 17/956,824

(22) Filed: Sep. 30, 2022

(65) Prior Publication Data

US 2023/0035528 A1 Feb. 2, 2023

Related U.S. Application Data

(63) Continuation-in-part of application No. PCT/CN2020/083288, filed on Apr. 3, 2020.

(51) Int. Cl.
G01S 7/481 (2006.01)
G01S 17/931 (2020.01)
(52) U.S. Cl.
CPC .......... G01S 7/4815 (2013.01); G01S 7/4816 (2013.01); G01S 7/4817 (2013.01); G01S 17/931 (2020.01)
(58) Field of Classification Search
CPC .... G01S 17/931; G01S 7/4815; G01S 7/4816; G01S 7/4817; G01S 7/486
See application file for complete search history.

(56) References Cited

U.S. PATENT DOCUMENTS

| 10,571,574 B1 | 2/2020 | Yavid |
| 2017/0176579 A1 | 6/2017 | Niclass et al. |

(Continued)

FOREIGN PATENT DOCUMENTS

| CN | 103645470 A | 3/2014 |
| CN | 106644077 A | 5/2017 |

(Continued)

OTHER PUBLICATIONS

International Search Report and written opinion issued in corresponding International Application No. PCT/CN2020/083288, mailed Jan. 4, 2021, 12 pages.

(Continued)

*Primary Examiner* — Hina F Ayub
(74) *Attorney, Agent, or Firm* — BAYES PLLC

(57) ABSTRACT

The present disclosure describes a LiDAR and an automated driving device. The LiDAR includes an emission driving system, a laser transceiving system, and a control and signal processing system. The laser transceiving system includes an emission assembly and a receiving assembly. The emission assembly is configured to emit an outgoing laser. The receiving assembly includes an array detector, and the array detector includes a plurality of detection units. The array detector is configured to synchronously and sequentially turn on the detection units to receive an echo laser, and the echo laser is the laser returned after the outgoing laser is reflected by an object in a detection region. The emission driving system is used to drive the emission assembly. The control and signal processing driving is used to control the emission driving system to drive the emission assembly, and used to control the receiving assembly to receive the echo laser.

4 Claims, 52 Drawing Sheets

(56)     References Cited

U.S. PATENT DOCUMENTS

| | | | |
|---|---|---|---|
| 2018/0284276 A1 | 10/2018 | Campbell | |
| 2019/0011556 A1 | 1/2019 | Pacala et al. | |
| 2022/0128667 A1* | 4/2022 | Hu | G02B 26/108 |

FOREIGN PATENT DOCUMENTS

| | | |
|---|---|---|
| CN | 107817482 A | 3/2018 |
| CN | 108107417 A | 6/2018 |
| CN | 108152830 A | 6/2018 |
| CN | 108983197 A | 12/2018 |
| CN | 110488247 A | 11/2019 |
| CN | 110850387 A | 2/2020 |
| CN | 210123470 U | 3/2020 |
| JP | 2010151958 A | 7/2010 |
| WO | 2018197246 A1 | 11/2018 |

OTHER PUBLICATIONS

International Search Report and written opinion issued in corresponding International Application No. PCT/CN2020/083290, mailed Dec. 31, 2020, 14 pages.
First Office Action issued in related Chinese Application No. 202080005824.1, mailed May 4, 2023, 10 pages.

* cited by examiner

LiDAR AND AUTOMATED DRIVING DEVICE

CROSS-REFERENCE TO RELATED APPLICATION

The present application is a continuation-in-part of International Application No. PCT/CN2020/083288, filed on Apr. 3, 2020, the content of which is incorporated herein by reference in its entirety.

TECHNICAL FIELD

Embodiments of the present disclosure relate to the technical field of radar, and in particular, to a LiDAR and an automated driving device.

BACKGROUND

A LiDAR is a radar system using lasers to detect characteristics of a target object, such as position and speed. A working principle of the LiDAR is that an emission assembly first emits outgoing lasers for detection to the target, and a receiving assembly then receives echo lasers reflected from the target object, and processes the received echo lasers, to obtain relevant information of the target object, for example, parameters such as distance, azimuth, height, speed, attitude, and even shape.

Single-point or multi-point laser ranging requires a proper optical-mechanical scanning system to obtain laser point cloud data with high resolution from a large field of view. Currently, common LiDAR scanning solutions on the market include conventional mechanical scanning, Micro-Electro-Mechanical System (MEMS) scanning, and the like. When used for a long time and in harsh conditions, the reliability of the above scanning methods will be reduced.

The receiving module is implemented as an array detector. A plurality of detection pixels are arranged into an array to form the array detector. As detection resolution requirements become increasingly high, a pixel size on a unit area in an array detector is becoming increasingly small. If a receiving lens remains unchanged, it is necessary to increase power of a light source for emitting a signal, or increase a size of a receiving surface of the array detector. However, enlarging a size of a receiving surface directly increases difficulty in designing the receiving lens, and increases costs of the array detector and an overall size of a LiDAR product.

SUMMARY

In view of the foregoing shortcomings of the related art, embodiments of the present disclosure mainly aim to provide a LiDAR and an automated driving device, to improve the reliability of a product. In addition, based on the provided LiDAR and automated driving device, peak power of the required light source and emission energy can be reduced while ensuring detection resolution without increasing a size of a receiving surface of an array detector; and a detection distance can be increased under the same emission energy.

A technical solution used in the embodiments of the present disclosure is as follows: a LiDAR is provided, where the LiDAR includes an emission driving system, a laser transceiving system, and a control and signal processing system;

the laser transceiving system includes an emission assembly and a receiving assembly;

the emission assembly is configured to emit an outgoing laser, so that the outgoing laser scans to traverse a detection region;

the receiving assembly includes an array detector, and the array detector includes a plurality of detection units; and the array detector is configured to synchronously and sequentially turn on the detection units to receive an echo laser, and the echo laser is a laser returned after the outgoing laser is reflected by an object in a detection region;

the emission driving system is used to drive the emission assembly; and the control and signal processing system is used to control the emission driving system to drive the emission assembly, and used to control the receiving assembly to receive the echo laser.

In some embodiments, the emission assembly includes a laser emission module, the laser emission module includes a plurality of laser emission units, and the laser emission module is configured to sequentially turn on the laser emission units to emit the outgoing laser, so that the outgoing laser scans to traverse all detection regions of the array detector.

In some embodiments, the array detector includes m*n detection units, on-off of which can be separately controlled, where m and n are both integers greater than 1.

In some embodiments, the laser emission module is an array emitter, and the laser emission units are m*n laser emission units of the array emitter, on-off of which can be separately controlled; and the array emitter is configured to sequentially turn on the laser emission units to emit the outgoing laser, so that the outgoing laser scans to traverse all the detection regions of the array detector.

In some embodiments, the array emitter is configured to sequentially turn on the first laser emission units to emit the outgoing laser, and the first laser emission units include one or more laser emission units; and the array detector is configured to turn on the first detection units synchronously and sequentially to receive the echo laser, and the first detection units include one or more detection units; and a position of the first detection units corresponds to a position of the first laser emission unit, and the echo laser received by the first detection units is the laser returned after the outgoing laser emitted by the first laser emission units is reflected by the object in the detection region.

In some embodiments, the first laser emission units include only one laser emission unit, and the first detection units include only one detection unit; and the array detector is also configured to turn on second detection units synchronously and sequentially to receive the echo laser, and the second detection units include one or more detection units around the first detection unit.

In some embodiments, the first laser emission units include p*q laser emission units, and the first detection units include p*q detection units, where both p and q are integers greater than or equal to 1, and $1 \leq p \leq m$ or $1 \leq q \leq n$.

In some embodiments, p is less than m, and q is less than n; and the laser emission module is configured to turn on the laser emission units along a first direction and then an opposite direction of the first direction back and forth, or turn on the laser emission units row by row or column by column along the first direction constantly; or p is equal to m, and q is less than n; and the laser emission module is configured to turn on the laser emission units in a vertical direction; or p is less than m, and q is equal to n; and the laser emission module is configured to turn on the laser emission units in a horizontal direction.

In some embodiments, the laser emission module is the array emitter, and the laser emission units are m*1 laser emission units of the array emitter, on-off of which can be separately controlled, or the laser emission units are 1*n laser emission units of the array emitter, on-off of which can be separately controlled;

the array emitter is configured to sequentially turn on the laser emission units to emit the outgoing laser, so that the outgoing laser scans in the first direction; and the LiDAR further includes a deflection mechanism, and the deflection mechanism is configured to receive the outgoing laser and reflect the outgoing laser toward the detection region of the array detector, so that the outgoing laser scans in the second direction; the first direction is perpendicular to the second direction.

In some embodiments, the array emitter includes a vertical-cavity surface-emitting laser array, an edge emitting laser array, a light emitting diode array, a micro light emitting diode array, a pulsed laser deposition array, or a laser diode array.

In some embodiments, the array detector includes an avalanche photodiode array, a silicon photomultiplier tube array, a multi-pixel photon counter array, a photomultiplier tube array, a single-photon avalanche diode array, a pin array, a charge-coupled device or a complementary metal oxide semiconductor.

In some embodiments, the emission assembly includes a plurality of first emission assemblies, each first emission assembly includes a laser emission module and an optical deflection module, and each optical deflection module includes a plurality of deflection units arranged in the first direction; and the laser emission module is configured to emit the outgoing laser to the optical deflection module in the first direction, and the optical deflection module is configured to sequentially turn on the deflection units so that the outgoing laser is emitted in the second direction and scans in the first direction or the opposite direction of the first direction; and arrangement of the deflection units is consistent with arrangement of the detection units in the array detector; and the first direction is perpendicular to the second direction.

In some embodiments, all the first emission assemblies are configured to enable laser emission modules of the first emission assemblies to simultaneously emit the outgoing laser in the first direction; or the first emission assembly sequentially enables the laser emission modules to emit the outgoing laser along the first direction in an arrangement sequence.

In some embodiments, the array detector includes m*n detection units, on-off of which can be separately controlled, where m and n are both integers greater than 1; and the emission assembly includes m first emission assemblies, and an optical deflection module in each first emission assembly includes n deflection units arranged along the first direction; or the emission assembly includes n first emission assemblies, and an optical deflection module in each first emission assembly includes m deflection units arranged along the first direction.

In some embodiments, the deflection unit is a controllable polarizer, and the polarizer is configured to reflect the outgoing laser in an on state and transmit the outgoing laser in an off state.

In some embodiments, the emission assembly includes a laser emission module and an optical deflection module, and the optical deflection module includes a plurality of deflection units arranged in the first direction; and the laser emission module is configured to emit the outgoing laser to the optical deflection module in the first direction, and each deflection unit in the optical deflection module is configured to deflect and then emit a preset proportion of outgoing laser; and the LiDAR further includes a deflection mechanism, and the deflection mechanism is configured to receive the outgoing laser and reflect the outgoing laser toward the detection region of the array detector; and the outgoing laser incident to the detection region is a linear light spot, and the deflection mechanism is further configured to scan through the linear light spot to traverse the entire detection region.

In some embodiments, the deflection unit is a plane mirror, and each plane mirror has the same or different transmittance or reflectivity.

In some embodiments, the outgoing lasers reflected by plane mirrors have the same energy; or energy of an outgoing laser reflected by a plane mirror, which is configured to deflect the outgoing laser to a region of interest in the detection region, is greater than energy of an outgoing laser reflected by another plane mirror.

In some embodiments, included angles between outgoing lasers emitted by a plurality of deflection units and the laser emission module are successively decreased in the first direction, so that an outgoing laser passing through each deflection unit is focused toward a center.

In some embodiments, the LiDAR further includes a lens, and the lens is configured to focus the outgoing laser deflected by each deflection unit and direct the outgoing laser to the deflection mechanism.

In some embodiments, the emission assembly includes a laser emission module and an optical shaping module, and the LiDAR further includes a deflection mechanism;

the laser emission module is configured to emit an outgoing laser to the optical shaping module, and the optical shaping module is configured to shape the outgoing laser and direct the outgoing laser to the deflection mechanism; and the deflection mechanism is configured to receive the outgoing laser and reflect the outgoing laser toward the detection region of the array detector; and the deflection mechanism is further configured to scan through the outgoing laser to traverse the entire detection region.

In some embodiments, the optical shaping module is configured to shape the outgoing laser in order to focus the outgoing laser, so that the outgoing laser to the detection region is a linear light spot.

In some embodiments, the optical shaping module is a cylindrical lens or a micro-cylindrical-lens array.

In some embodiments, the emission assembly includes a laser emission module and an optical shaping module, and the LiDAR further includes a deflection mechanism; and the laser emission module is configured to emit an outgoing laser to the deflection mechanism; the deflection mechanism is configured to receive the outgoing laser and reflect the outgoing laser to the optical shaping module; the optical shaping module is configured to shape the outgoing laser into a linear light spot and then emit the linear light spot to the detection region of the array detector; and the deflection mechanism is further configured to scan through the linear light spot to traverse the entire detection region.

In some embodiments, the optical shaping module is the cylindrical lens or the micro-cylindrical-lens array, and a cross-section of the cylindrical lens or the micro-cylindrical-lens array in a rotation plane of the deflection mechanism is arc-shaped and is symmetrical around the deflection mechanism.

In some embodiments, the deflection mechanism is a MEMS micromirror, a reflector, or a transmission prism.

In some embodiments, the emission assembly further includes an emission optical module, configured to collimate the outgoing laser emitted by the laser emission module; and the receiving assembly further includes a receiving optical module, configured to focus the echo laser and emit a focused echo laser to the array detector.

An embodiment of the present disclosure further provides an automated driving device, including a driving device body and a LiDAR as described above. The LiDAR is mounted at the driving device body.

Another technical solution used in the embodiments of the present disclosure is as follows. A LiDAR is provided, where the LiDAR includes an emission driving system, a laser transceiving system, and a control and signal processing system;

the laser transceiving system includes an emission assembly, a deflection mechanism, and a receiving assembly; and the receiving assembly includes an array detector;

the emission assembly includes a laser emission module, and an optical shaping module. The laser emission module is configured to emit an outgoing laser, and the optical shaping module is configured to shape the outgoing laser and direct the shaped outgoing laser to the deflection mechanism;

the laser emission module is configured to emit an outgoing laser to the optical shaping module, and the optical shaping module is configured to shape the outgoing laser and direct the outgoing laser to the deflection mechanism; the deflection mechanism is configured to receive the outgoing laser and reflect the outgoing laser to a local detection region of the array detector, the outgoing laser scanning to traverse all the detection regions of the array detector; and the deflection mechanism is also configured to receive the echo laser and reflect the echo laser to the receiving assembly;

the receiving assembly is configured to receive the echo laser;

the emission driving system is used to drive the emission module; and the control and signal processing system is used to control the emission driving system to drive the emission assembly, and to control the receiving module to receive the echo laser.

In some embodiments, the receiving assembly is configured to synchronously turn on all pixels in the array detector that are corresponding to the first region when the outgoing laser scans the first region in the detection region, to detect the first region.

In some embodiments, the array detector includes m*n pixels, on-off of which can be separately controlled, where m and n are both integers greater than 1.

In some embodiments, the deflection mechanism is a MEMS micromirror, a reflector, or a transmission prism.

In some embodiments, the deflection mechanism includes a mirror, a first rotating shaft, and a second rotating shaft;

the mirror is configured to rotate around the first rotating shaft, so that the outgoing laser scans the detection region of the array detector in a horizontal direction; the mirror is also configured to rotate around the second rotating shaft, so that the outgoing laser scans the detection region of the array detector in a vertical direction; and the mirror is further configured to receive the echo laser and reflect the echo laser to the receiving module; and dimensions of an image formed by the echo laser on the array detector in both the horizontal direction and the vertical direction are both less than dimensions of all the pixels of the array detector in corresponding directions.

In some embodiments, the deflection mechanism includes a mirror and a rotating shaft;

the mirror is configured to rotate around the rotating shaft, so that the outgoing laser scans the detection region of the array detector in the first direction; and the mirror is further configured to receive the echo laser and reflect the echo laser to the receiving module;

a dimension of an image formed by the echo laser on the array detector in the first direction is less than a dimension of all the pixels of the array detector in the first direction, and a dimension of an image formed by the echo laser on the array detector in the second direction is greater than or equal to a dimension of all the pixels of the array detector in the second direction; and the first direction is the horizontal direction, the second direction is the vertical direction; or the first direction is the vertical direction, and the second direction is the horizontal direction.

In some embodiments, the deflection mechanism includes a mirror and a rotating shaft;

the emission assembly includes at least two second emission assemblies, each second emission assembly includes a laser emission unit and an optical shaping module, the laser emission unit is configured to emit the first outgoing laser, and optical shaping module is configured to collimate the first outgoing laser, and emit a collimated first outgoing laser to the two-dimensional MEMS micromirror; the outgoing laser consists of all the first outgoing lasers, and the first outgoing lasers are arranged in the first direction; the mirror is configured to rotate around the rotating shaft, so that the outgoing laser scans the detection region of the array detector in the second direction; and the mirror is also configured to receive the first echo laser and reflect the first echo laser to the receiving module, where the first echo laser is a laser returned after the first outgoing laser is reflected by an object in the detection region, and the echo laser consists of all the first echo lasers;

dimensions of an image formed by the first echo laser on the array detector in both the first direction and the second direction are less than dimensions of all the pixels of the array detector in corresponding directions; and a dimension of an image formed by the echo laser on the array detector in the first direction is greater than or equal to a dimension of all the pixels of the array detector in the first direction; and the first direction is the horizontal direction, the second direction is the vertical direction; or the first direction is the vertical direction, the second direction is the horizontal direction.

In some embodiments, the at least two second emission assemblies sequentially emit the first outgoing laser.

In some embodiments, the emission module includes three second emission assemblies.

In some embodiments, the echo laser is a circular light spot, and the image formed by the echo laser on the array detector is located in a single pixel of the array detector.

In some embodiments, the echo laser is the circular light spot, and the image formed by the echo laser on the array detector exceeds a single pixel of the array detector, but does not exceed an adjacent pixel of the single pixel.

In some embodiments, the image formed by the echo laser on the array detector is located within ½ of the pixel of the array detector, and the single pixel of the array detector is configured to respectively receive echo lasers in a first pixel region and a second pixel region in a scanning sequence of the outgoing laser.

In some embodiments, the image formed by the echo laser on the array detector is located within ¼ of the pixels of the array detector, and the single pixel of the array detector is configured to respectively receive echo lasers in a first pixel region, a second pixel region, a third pixel region, and a fourth pixel region in a scanning sequence of the outgoing laser.

In some embodiments, the emission module includes a laser emission unit and an optical shaping module;

the laser emission unit is configured to emit an outgoing laser; and optical shaping module is configured to collimate the outgoing laser and emit a collimated outgoing laser to a deflection mechanism.

In some embodiments, the receiving module further includes a receiving optical unit;

the receiving optical unit is configured to: focus the echo laser and emit a focused echo laser to the array detector; and the array detector is configured to receive the echo laser.

An embodiment of the present disclosure further provides an automated driving device, including a driving device body and the foregoing LiDAR, where the LiDAR is mounted on the driving device body.

Beneficial effects of the embodiments of the present disclosure are as follows. In the embodiments of the present disclosure, the outgoing laser emitted by the emission assembly scans to traverse the detection region, and the detection units in the corresponding array detector are sequentially turned on to receive the echo laser, to complete the scanning of the entire detection region by means of electronic scanning, which reduces or eliminates the use of a mechanical rotating component, thereby improving the reliability of a product and prolonging the service life of the product.

In the embodiments of the present disclosure, based on an existing conventional detector, the outgoing laser is shaped, so that the outgoing laser spot is a point light spot, a block light spot, or a linear light spot, and the deflection mechanism is added, to complete the detection of the detection region in a traversing and scanning method. Due to the use of a point light spot, a block light spot, or a linear light spot, peak power of the required light source and emission energy can be reduced while ensuring detection resolution without increasing a size of a receiving surface of an array detector; and a detection distance can be increased under the same emission energy. Compared with the related art in which the size of the receiving surface of the array detector needs to be increased to meet a requirement for high resolution, in the embodiments of the present disclosure, the size of the image of the array detector is reduced, which reduces the size of the array detector, so that the number of pixels and the detection resolution can be increased under the same surface size.

BRIEF DESCRIPTION OF DRAWINGS

One or more embodiments are described by using examples with reference to diagrams in drawings corresponding to the embodiments. These example descriptions do not constitute a limitation to the embodiments. Elements with the same reference signs in the drawings indicate similar elements. Unless otherwise stated, the diagrams in the drawings do not constitute a proportional limitation.

FIG. 10b is a schematic diagram of an optical path of the laser device and the plane mirror in FIG. 10a;

Figure 1:
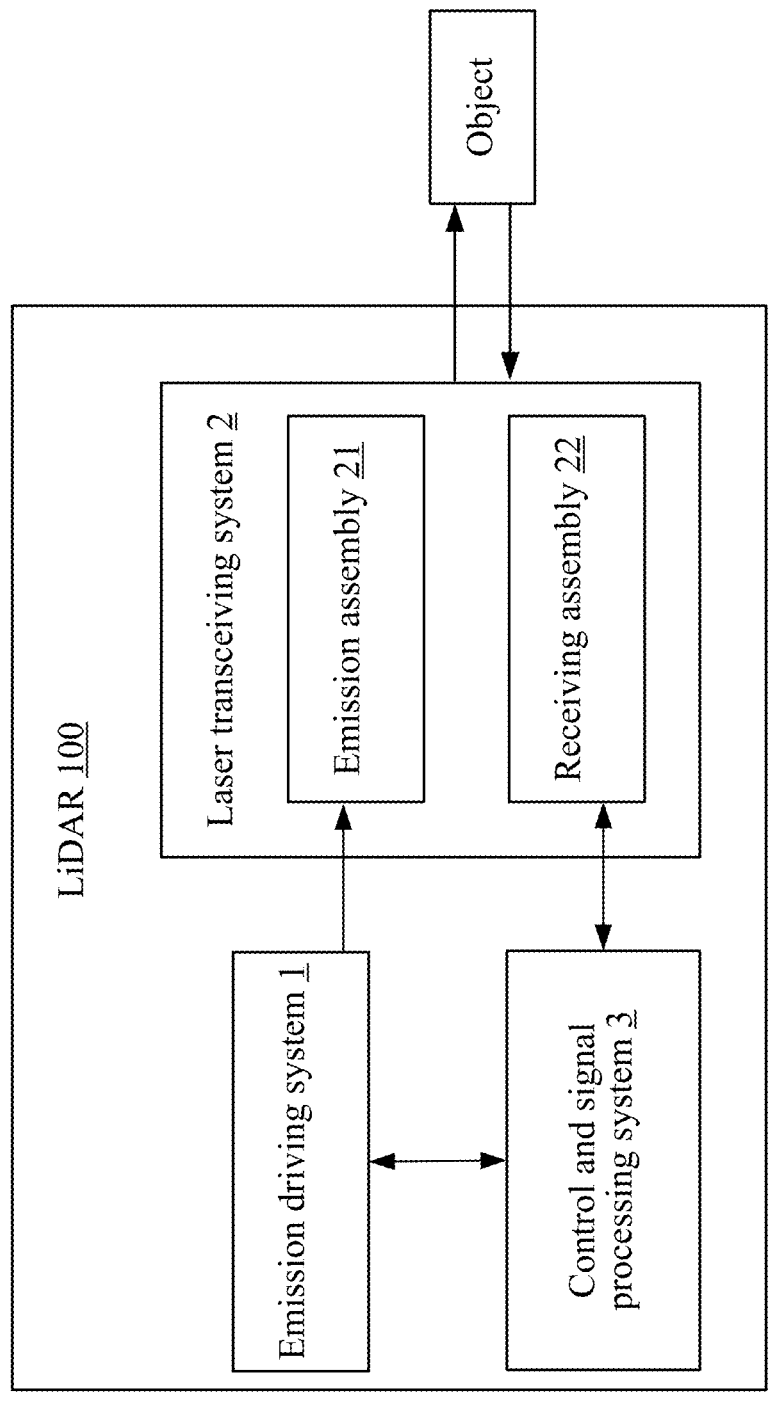
FIG. 1 is a structural block diagram of a LiDAR according to an embodiment of the present disclosure.

Reference signs in the specific embodiments are as follows:

LiDAR 100;

emission driving system 1, laser transceiving system 2, and control and signal processing system 3;

emission assembly 21, first emission assembly 210, laser emission module 211, array emitter 2111, laser emission unit 2111*a*, laser device 2112, emission optical module 212, first lens 212*a*, second lens 212*b*, deflection mechanism 213, optical deflection module 214, deflection unit 214*a*, first optical shaping module 215, and reflector 216;

receiving assembly 22, array detector 221, detection unit 221*a*, receiving optical module 222, deflection mechanism 23, two-dimensional MEMS micromirror 23*a*, one-dimensional MEMS micromirror 23*b*, emission assembly 21, second emission assembly 240, laser emission module 241, second optical shaping module 242, lens 243, optical deflection module 244, third optical shaping module 245, and reflector 246; and automated driving device 200, and driving device body 201.

DETAILED DESCRIPTION

Embodiments of the technical solution of the present disclosure are described in detail below in conjunction with the drawings. The following embodiments are only used to describe the technical solutions of the present disclosure more clearly, hence are only used as examples, and cannot be used to limit the protection scope of the present disclosure.

It should be noted that unless otherwise specified, the technical or scientific terms used in the present disclosure should have general meanings understood by a person of ordinary skill in the art to which the present disclosure belongs.

In the description of the present disclosure, it should be understood that orientations or position relationships indicated by terms such as "center," "longitudinal," "lateral," "length," "width," "thickness," "above," "under," "front," "rear," "left," "right," "vertical," "horizontal," "top," "bottom," "inner," "outer," "clockwise," "counterclockwise," "axial," "radial," and "circumferential" are based on the orientations or position relationships shown in the drawings, are merely intended to describe the present disclosure and simplify the descriptions, but are not intended to indicate or imply that the indicated device or element shall have a specific orientation or be formed and operated in a specific orientation, and therefore cannot be understood as a limitation to the present disclosure.

In addition, the terms such as "first" and "second" are merely intended for a purpose of description, and shall not be understood as an indication or implication of relative importance or implicit indication of a quantity of indicated technical features. In the descriptions of the present disclosure, "a plurality of" and "several" means two or more (including two), unless otherwise specified.

In the present disclosure, unless otherwise clearly specified and limited, terms such as "mounting", "connected", "connection", and "fixing" shall be understood in a general sense. For example, these technical terms may be a fixed connection, a detachable connection, or an integrated connection; or may be a mechanical connection or an electrical connection; or may be a direct connection, an indirect connection by using an intermediate medium, or an internal communication of two elements or an interaction of two elements. A person of ordinary skill in the art may understand specific meanings of the foregoing terms in the present disclosure according to a specific situation.

In the present disclosure, unless otherwise clearly specified and defined, that a first feature is "above" or "under" a second feature may be that the first feature and the second feature are in direct contact, or the first feature and the second feature are in indirect contact through an intermediate medium. Moreover, that a first feature is "above," "over," and "on" a second feature may mean that the first feature is right above or diagonally above the second feature, or may merely indicate that a horizontal height of the first feature is greater than that of the second feature. That a first feature is "below," "under," and "beneath" a second feature may mean that the first feature is right below or diagonally below the second feature, or may merely indicate that a horizontal height of the first feature is less than that of the second feature.

As shown in FIG. 1, an embodiment of the present disclosure provides a LiDAR 100, including an emission driving system 1, a laser transceiving system 2 and a control and signal processing system 3. The laser transceiving system 2 includes an emission assembly 21 and a receiving assembly 22. The emission assembly 21 is configured to emit an outgoing laser, so that the outgoing laser scans to traverse the detection region; and the receiving module 22 is configured to receive an echo laser. The emission driving system 1 is used to drive the emission assembly 21. The control and signal processing system 3 is used to control the emission driving system 1 to drive the emission assembly 21, and used to control the receiving assembly 22 to receive the echo laser. The echo laser is a laser returned after the outgoing laser is reflected by an object in the detection region.

Figure 2:
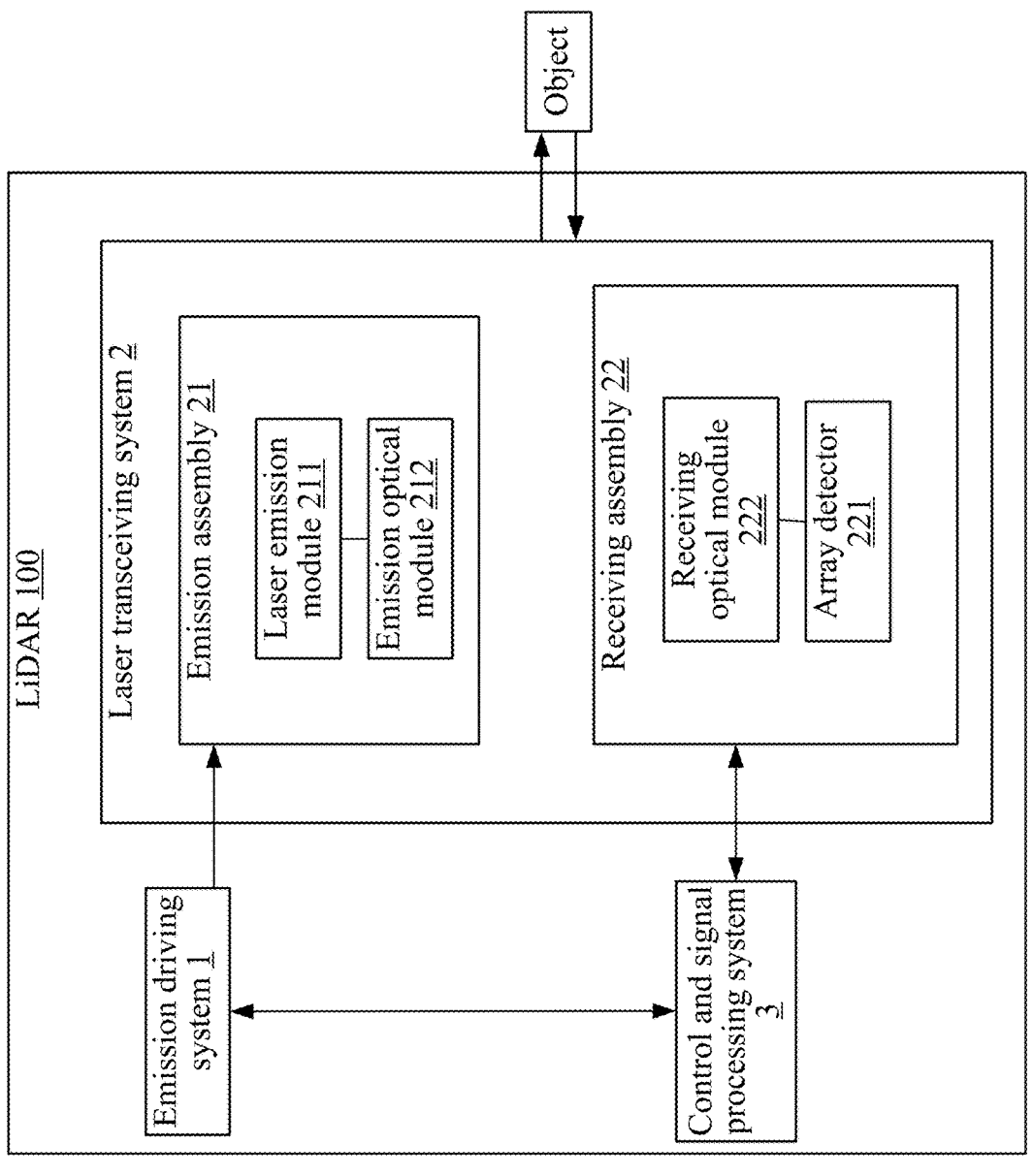
FIG. 2 is a structural block diagram of a LiDAR according to another embodiment of the present disclosure.

As shown in FIG. 2, the emission assembly 21 includes a laser emission module 211 and an emission optical module 212. The laser emission module 211 is configured to emit the outgoing laser, and the emission optical module 212 is configured to collimate the outgoing laser and emit a collimated outgoing laser to the detection region. The laser emission module 211 includes a plurality of laser emission units, and the laser emission module 211 is configured to sequentially turn on the laser emission units to emit the outgoing laser, so that the outgoing laser scans to traverse detection regions. The emission optical module 212 may be an optical fiber, a spherical lens group, a separate spherical lens group, a cylindrical lens group, or the like.

The receiving assembly 22 includes an array detector 221, the array detector 221 includes a plurality of detection units, and each detection unit has a photosensitive region with an area less than that of the detection unit. The array detector 221 may be a receiving device that can form an array, such as an Avalanche Photo Diode (APD) array, a Silicon Photomultiplier (SiPM) array, a Multi-Pixel Photon Counter (MPPC) array, or a photomultiplier tube (PMT) array, a single-photon avalanche diode (SPAD) array, a pin array (PIN array), Charge-coupled Device (CCD), Complementary Metal Oxide Semiconductor (CMOS), or the like. Specifically, the array detector 221 includes m*n detection units, on-off of which can be separately controlled, where m and n are both integers greater than 1. The array detector 221 is configured to turn on the detection units synchronously and sequentially to receive the echo laser. For example, the array detector turns on a selected detection unit, to detect a detection region scanned by an outgoing laser emitted by the laser emission unit. The selected detection unit corresponds to the laser emission unit that emits the outgoing laser. In addition, the receiving assembly 22 also includes a receiving optical module 222. The receiving optical module 222 can be a spherical lens, a spherical lens group, a cylindrical lens group, or the like. The receiving optical module 222 is configured to focus the echo laser and emit a focused echo laser to the array detector 221.

The plurality of laser emission units in the laser emission module 211 and the plurality of detection units in the array detector 221 are in one-to-one correspondence. For example, a laser emission unit at a position (1,1) corresponds to a detection unit at a position (1,1), to detect a region $R_{11}$; and a laser emission unit at a position (1,2) corresponds to a detection unit at a position (1,2), to detect a region $R_{12}$, and so on. The corresponding laser emission unit and detection unit are controlled to be turned on and off simultaneously. When the laser emission unit at the position (1,1) is turned on, the detection unit at the position (1,1) is turned on synchronously, to detect the region $R_{11}$; and when the laser emission unit at the position (1,2) is turned on, the detection unit at the position (1,2) is turned on synchronously, to detect the region $R_{12}$, and so on until the last detection unit is turned on. The last detection unit is turned on synchronously, to detect the last region. A schematic description of the manner of synchronously and sequentially turning on the detection units is provided above, but should not be construed as limitation on the present disclosure. The laser emission unit at the last position can also be turned on first, and the corresponding detection unit is turned on synchronously. The detection regions are scanned in a reverse sequence of the foregoing sequence of (1,1), (1,2) . . . . A sequence of turning on the laser emission units can be any sequence. After the laser emission unit and the corresponding detection unit complete one scan of the corresponding detection region, the laser emission unit and the detection unit are turned off synchronously.

The control and signal processing system 3 may be a Field Programmable Gate Array (FPGA). The FPGA is connected to the emission driving system 1, to control the emission of the outgoing laser. The FPGA is also connected to a clock pin, a data pin, and a control pin of the receiving assembly 22 separately, to control receiving of the echo laser.

In the embodiments of the present disclosure, the outgoing laser emitted by the emission assembly scans to traverse the detection region, and the detection units in the corresponding array detector 221 are sequentially turned on to receive the echo laser, to complete scanning of the entire detection region by means of electronic scanning, which reduces or eliminates the use of a mechanical rotating component, thereby improving the reliability of a product and prolonging the service life of the product.

Embodiments using different laser emission modules 211 are described in detail below.

(1) Laser Emission Module 211 Including a Plurality of Laser Emission Units

Figure 3:
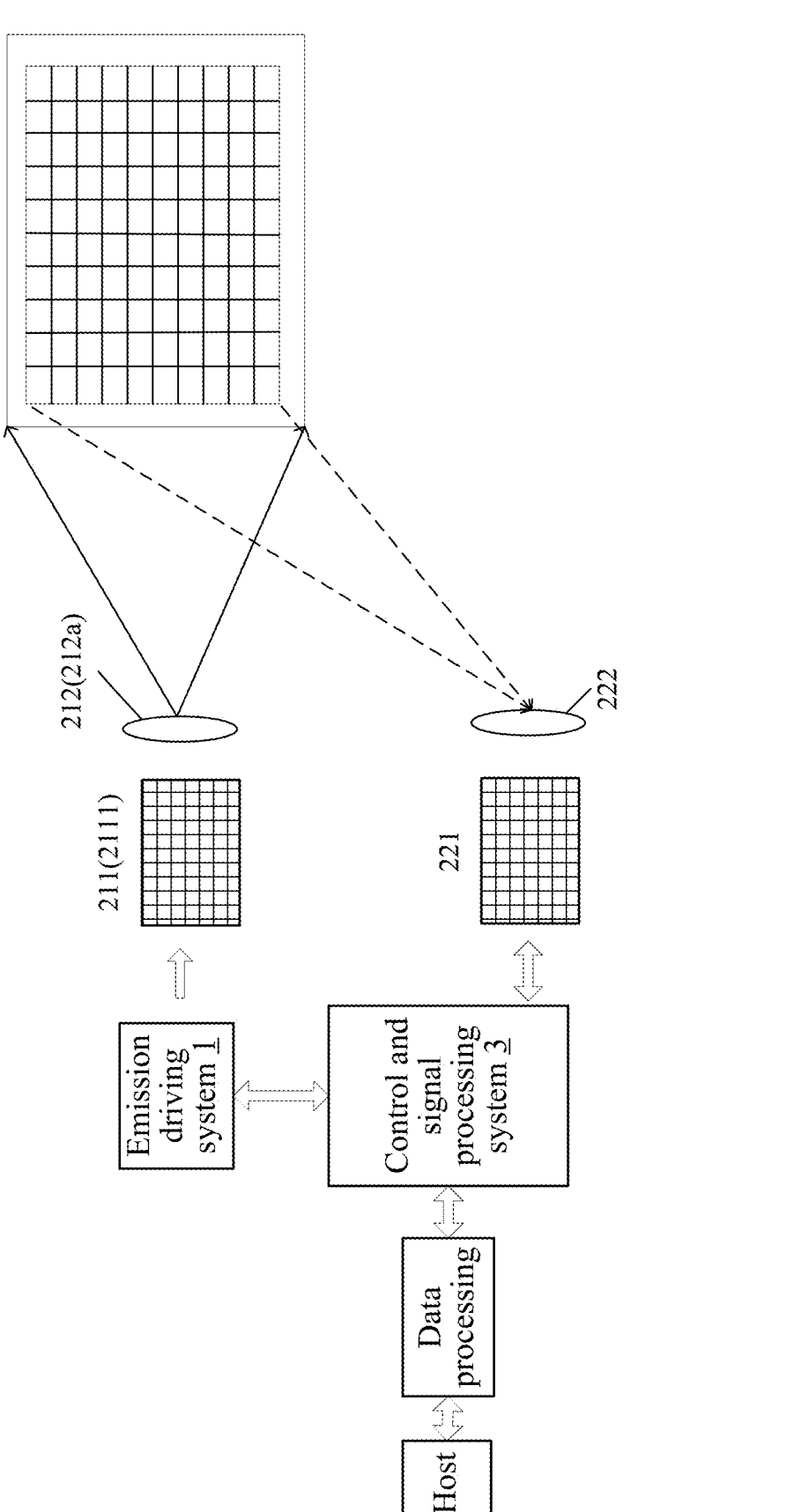
FIG. 3 is a schematic diagram of an optical path of a LiDAR using an array emitter according to an embodiment of the present disclosure.

The laser emission module 211 includes a plurality of laser emission units, and the laser emission module 211 is configured to sequentially turn on the laser emission units to emit the outgoing laser, so that the outgoing laser scans to traverse all detection regions of the array detector 221. As shown in FIG. 3, in an embodiment, the laser emission module 211 is an array emitter 2111, and the laser emission units are m*n laser emission units 2111a of the array emitter 2111, on-off of which can be separately controlled. The array emitter 2111 is configured to sequentially turn on the laser emission units 2111a to emit the outgoing laser, so that the outgoing laser scans to traverse all the detection regions of the array detector 221. For example, the array emitter 2111 is configured to sequentially turn on the first laser emission units to emit the outgoing laser, and the first laser emission unit includes one or more laser emission units 2111a. The array detector 221 is configured to turn on the first detection units synchronously and sequentially to receive the echo laser, and the first detection unit includes one or more detection units 221a; and a position of the first detection unit corresponds to a position of the first laser emission unit, and the echo laser received by the first detection unit is a laser returned after the outgoing laser emitted by the first laser emission unit is reflected by the object in the detection region. The emission optical module 212 uses a first lens 212a. When the first laser emission unit includes a plurality of laser emission units 2111a, a scanning method is a method of regional emission and regional receiving, which can reduce a scanning period for a single frame and improve detection efficiency compared with a method of point-to-point emission and receiving.

The array emitter 2111 can use a Vertical-Cavity Surface-Emitting Laser (VCSEL) array, an Edge Emitting Laser (EEL) array, a Light Emitting Diode (LED) array, a Micro Light Emitting Diode (Micro LED) array, a Pulsed Laser Deposition (PLD) array, a Laser Diode (LD) array, or the like.

For example, during operation, the laser emission unit 2111a at the position (1,1) is turned on and the detection unit 221a of the array detector 221 at the corresponding position (1,1) is synchronously turned on for receiving. After detection at this position is completed, laser emission units 2111a and detection units 221a of the corresponding array detectors 221 at positions (1,2) to (m,n) are sequentially turned on, thereby completing ranging of the entire detection region.

Figure 4:
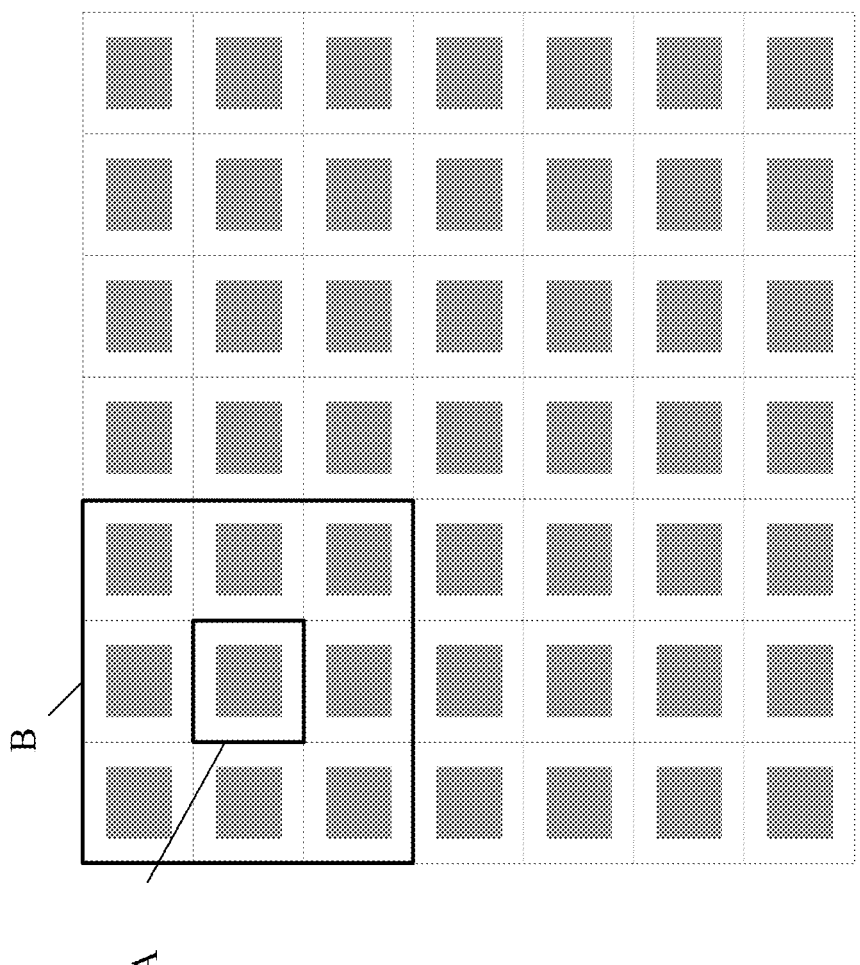
FIG. 4 is a schematic diagram of an array detector in which a second detection unit is turned on according to an embodiment of the present disclosure.

When the first laser emission unit includes one laser emission unit 2111a and the first detection unit also includes one detection unit 221a, in this case, a method of point-to-point emission and receiving is used. In addition, when the first laser emission unit includes one laser emission unit 2111a, that is, single-point emission is performed, the array detector 221 may also be configured to turn on the second detection units synchronously and sequentially to receive the echo laser, and the second detection unit includes one or more detection units around the first detection unit 221a. As shown in FIG. 4, a circle of detection units 221a (region B) around a region A of the first detection unit may be turned on for receiving. A neighboring region of the corresponding detection pixel of the array detector 221 is enabled for simultaneous receiving, which can improve detection accuracy and compensate for processing and installation errors.

When the first laser emission unit includes a plurality of laser emission units 2111a and the first detection unit also includes a plurality of detection units 221a, in this case, a method of block-to-block emission and receiving is used. "Block" herein includes a linear light spot and a block light spot. In this case, the first laser emission unit includes p*q laser emission units, and the first detection unit includes p*q detection units, where both p and q are integers greater than or equal to 1, and $1 \leq p \leq m$ or $1 \leq q \leq n$. When either of p and q is 1, light spots of the outgoing laser and the echo laser are linear light spots, and in other cases, the light spots are block light spots. When p is less than m and q is less than n, the laser emission module is configured to turn on the laser emission units along the first direction and then an opposite direction of the first direction back and forth, or turn on the laser emission units row by row or column by column along the first direction constantly, where the first direction may be a horizontal direction or a vertical direction. When p is equal to m and q is less than n, the laser emission module is configured to turn on the laser emission unit in the vertical direction. Because the number of units in the first laser emission unit in the horizontal direction is equal to the number of detection units 221a of the array detector 221 in the horizontal direction, the detection region only needs to be scanned once in the vertical direction. When p is less than m and q is equal to n, the laser emission module is configured to turn on the laser emission unit in the horizontal direction. Because the number of units in the first laser emission unit in the vertical direction is equal to the number of detection units 221a of the array detector 221 in the vertical direction, the detection region only needs to be scanned once in the horizontal direction.

In the embodiments, the outgoing laser is emitted by setting the laser emission units that can be turned on sequentially, and the detection units 221a in the corresponding array detector 221 are sequentially turned on to receive the echo laser, to complete scanning of the entire detection region, and emission and receiving is implemented by means of electronic scanning without the need of a mechanical rotating component, thereby improving the reliability of a product and prolonging the service life of the product.

Figure 5:
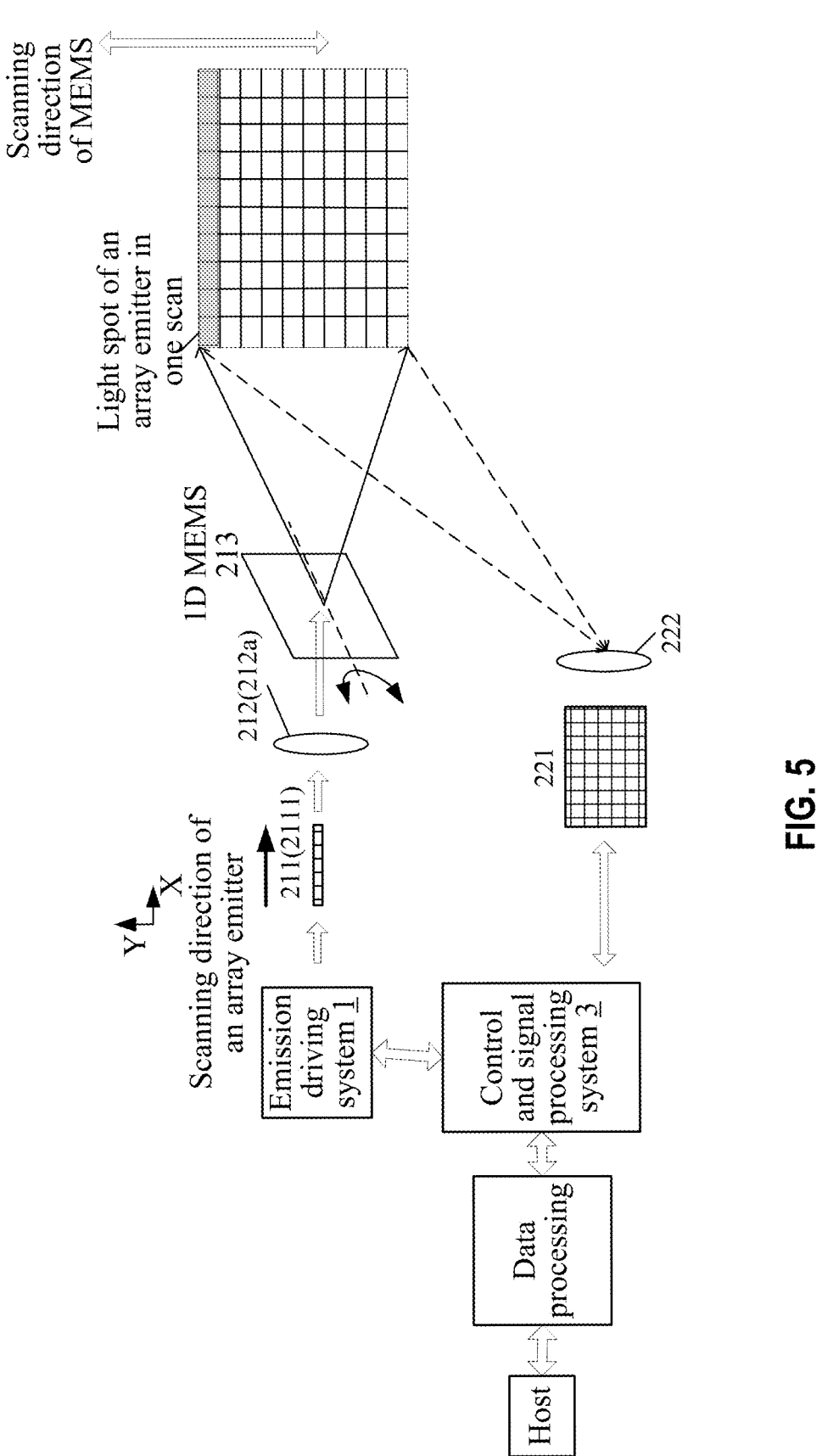
FIG. 5 is a schematic diagram of an optical path of a LiDAR using an array emitter and a one-dimensional MEMS micromirror according to an embodiment of the present disclosure.

The embodiment in which no rotating component is used is described above. In some embodiments, the entire detection region can also be scanned through electronic scanning in combination with rotating component scanning, for example, a strip-shaped (linear) emission array in combination with a one-dimensional scanning structure. As shown in FIG. 5, in another embodiment, the laser emission module 211 includes an array emitter 2111, the laser emission units are m*1 laser emission units 2111a of the array emitter 2111, on-off of which can be separately controlled, and the array emitter 2111 is configured to sequentially turn on the laser emission units 2111a to emit the outgoing laser, so that the outgoing laser scans in the first direction (direction X). The LiDAR 100 further includes a deflection mechanism 213, configured to receive the outgoing laser and reflect the outgoing laser toward the detection region of the array detector 221, so that the outgoing laser scans in the second direction (direction Y). The first direction and the second direction are perpendicular to complete scanning of the entire detection region. The deflection mechanism 213 may use a device that can implement optical scanning, such as a MEMS micromirror, a reflector, or a transmission prism. In this embodiment, the deflection mechanism 213 is a one-dimensional MEMS micromirror.

Compared with LiDAR using a two-dimensional MEMS micromirror or another two-dimensional rotating component, only the one-dimensional MEMS micromirror is used to scan in one direction, and scanning in another direction is completed through electronic scanning, thereby improving the reliability of the product.

Figure 6:
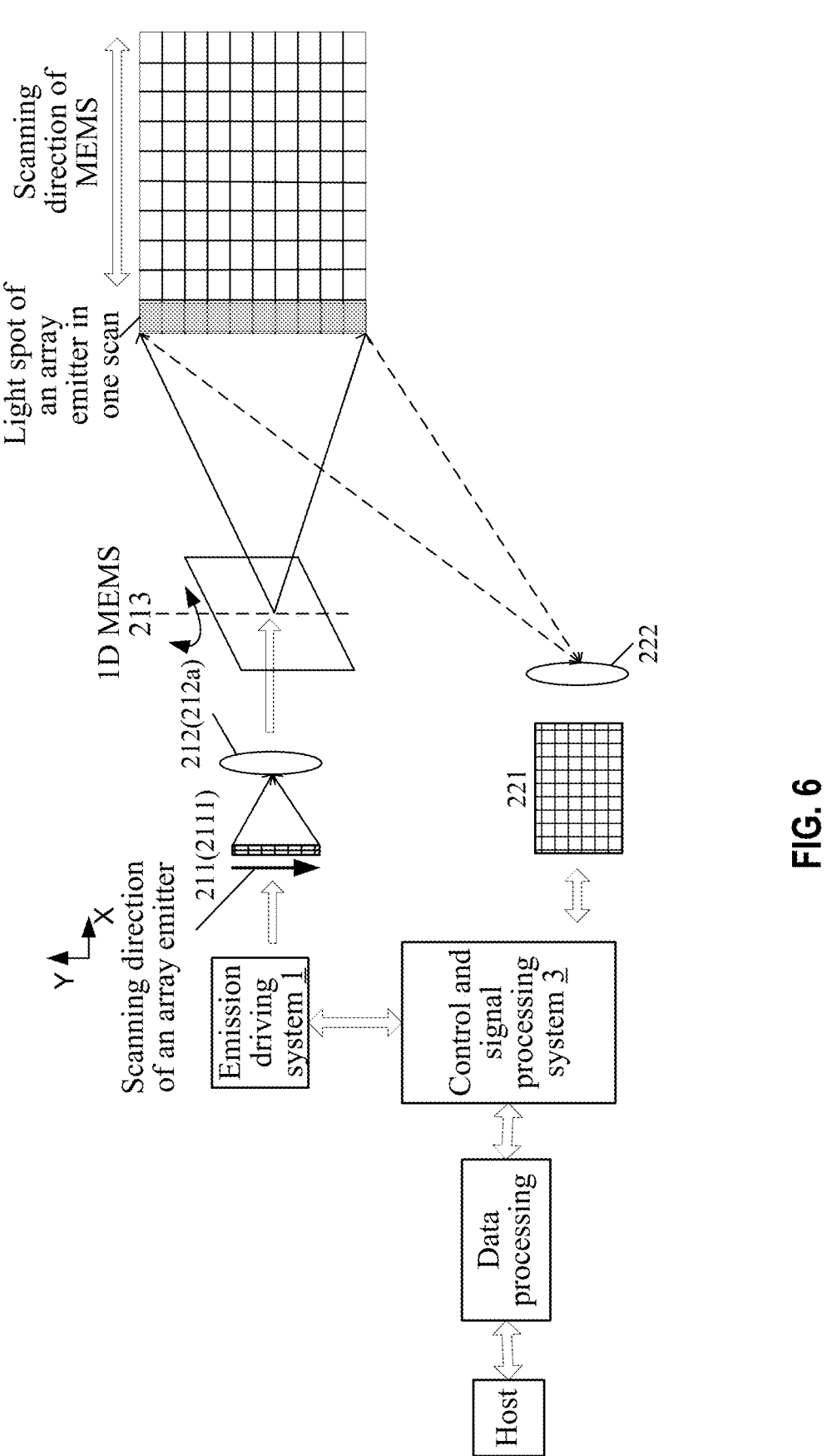
FIG. 6 is a schematic diagram of an optical path of a LiDAR using an array emitter and a one-dimensional MEMS micromirror according to another embodiment of the present disclosure.

As shown in FIG. 6, in another embodiment, the laser emission module 211 includes an array emitter 2111, the laser emission units are 1*n laser emission units 2111a of the array emitter 2111, on-off of which can be separately controlled, and the array emitter 2111 is configured to emit the outgoing laser for scanning in the first direction (direction Y). The emission assembly 21 further includes a one-dimensional MEMS micromirror 213, configured to receive the outgoing laser and reflect the outgoing laser toward the detection region of the array detector 221, so that the outgoing laser scans in the second direction (direction X).

The first direction and the second direction are perpendicular to complete scanning of the entire detection region.

(2) Emission Assembly 21 Including an Optical Deflection Module 214

Figure 7:
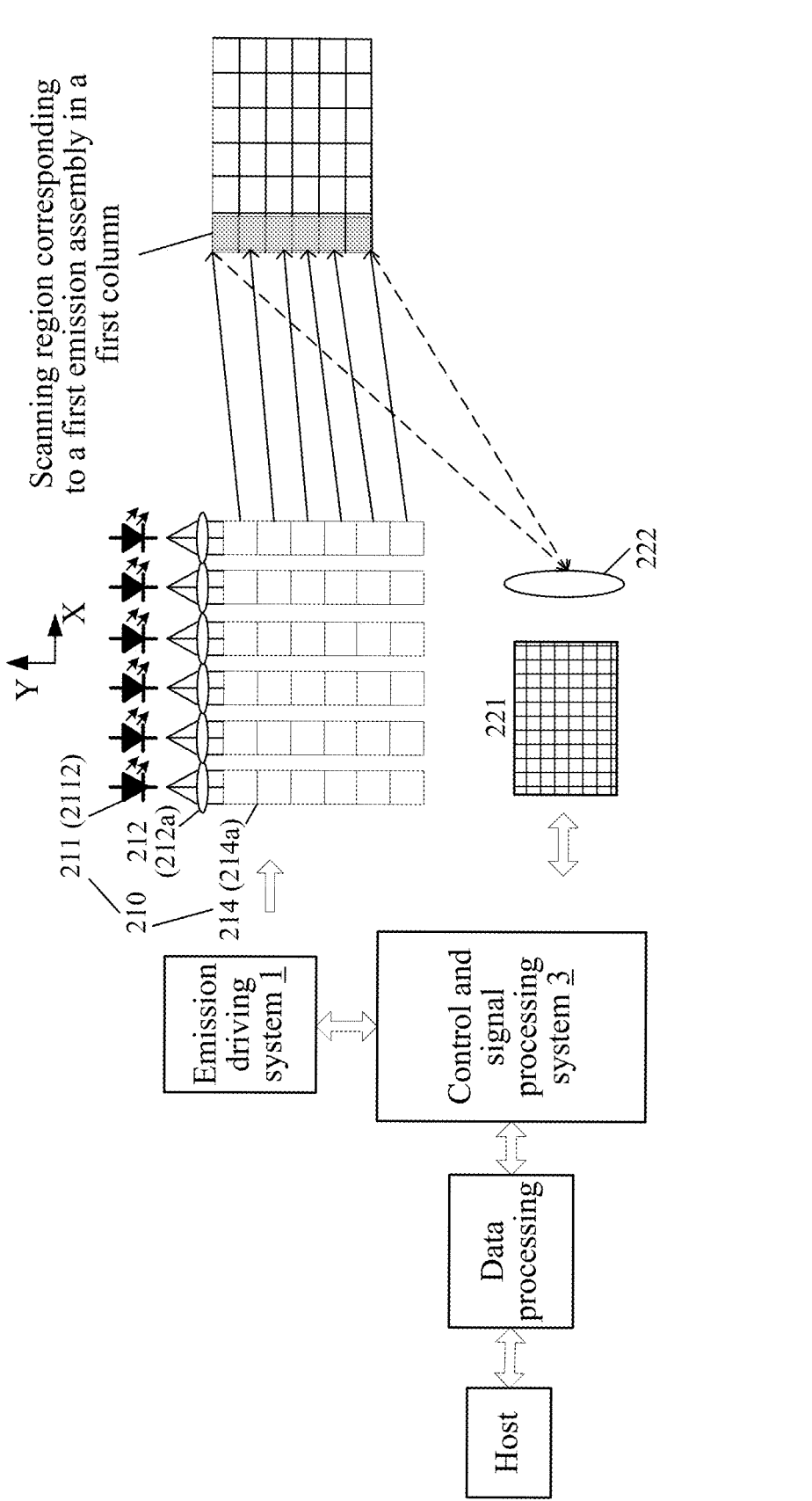
FIG. 7 is a schematic diagram of an optical path of a LiDAR using a laser device and a plurality of groups of deflection units according to an embodiment of the present disclosure.

As shown in FIG. 7, in another embodiment, the emission assembly 21 includes a plurality of first emission assemblies 210 arranged in a horizontal direction, each first emission assembly 210 includes a laser emission module 211 and an optical deflection module 214, and each optical deflection module 214 includes a plurality of deflection units 214a arranged in the first direction (direction Y). The laser emission module 211 uses a laser device 2112. The laser emission module 211 is configured to emit the outgoing laser to the optical deflection module 214 in the first direction (direction Y), and the optical deflection module 214 is configured to sequentially turn on the deflection units 214a, so that the outgoing laser is emitted in the second direction (direction X) and scans in the first direction (direction Y) or an opposite direction (direction −Y) of the first direction. Arrangement of the deflection unit 214a is consistent with arrangement of the detection unit 221a in the array detector 221; and the first direction (direction Y) and the second direction (direction X) are perpendicular. The number of first emission assemblies 210 is the same as the number of detection units 221a in the array detector 221 in the horizontal direction. The array detector 221 includes m*n detection units 221a, on-off of which can be separately controlled, where m and n are both integers greater than 1. The emission assembly 21 includes m first emission assemblies 210, and the optical deflection module 214 in each first emission assembly 210 includes n deflection units 214a arranged in the vertical direction (direction Y).

It can be understood that, in another embodiment, the first direction may also be the direction X, and the second direction may be the direction Y. In this case, the plurality of first emission assemblies 210 are arranged in the vertical direction, and the number of first emission assemblies 210 is the same as the number of detection units 221a in the array detector 221 in the vertical direction. The array detector 221 includes m*n detection units 221a, on-off of which can be separately controlled, where m and n are both integers greater than 1. The emission assembly 21 includes n first emission assemblies 210, and the optical deflection module 214 in each first emission assembly 210 includes m deflection units 214a arranged in the horizontal direction (direction X).

The scanning method in the embodiment shown in FIG. 7 is described below:

Point scanning: A laser emission module 211 in each first emission assembly 210 emits an outgoing laser. First, deflection units 214a in a first emission assembly 210 in a first column are sequentially turned on, so that the outgoing laser emitted by the first emission assembly 210 scans in the first direction (direction Y) or the opposite direction (direction −Y) of the first direction; after the last deflection unit 214a in the first emission assembly 210 is turned on, then deflection units 214a in the first emission assembly 210 in a second column are sequentially turned on, so that the outgoing laser emitted by the first emission assembly 210 scans in the first direction (direction Y) or the opposite direction (direction −Y) of the first direction; and so on, until the deflection units 214a in the first emission assembly 210 in the last column are sequentially turned on and the column completes scanning through the outgoing laser, thereby completing scanning of the entire detection region. It should be understood that first deflection units 214a in each first emission assembly 210 can also be turned on in sequence, then second deflection units 214a in each first emission assembly 210 are turned on in sequence, and so on. Finally, last deflection units 214a in each first emission assembly 210 are turned on in sequence, thereby completing the scanning of the entire detection region.

Row scanning: A laser emission module 211 in each first emission assembly 210 emits an outgoing laser. Deflection units 214a in each first emission assembly 210 are sequentially turned on. For example, first deflection units 214a in each first emission assembly 210 are turned on simultaneously, then second deflection units 214a in each first emission assembly 210 are turned on simultaneously, and so on. Finally, last deflection units 214a in each first emission assembly 210 are turned on simultaneously, so that outgoing lasers emitted by all the first emission assemblies 210 scan synchronously in the first direction (direction Y) or the opposite direction (direction −Y) of the first direction, thereby completing scanning of the entire detection region. That is, the outgoing lasers of each first emission assembly 210 complete scanning in the first direction (direction Y) or the opposite direction (direction −Y) of the first direction synchronously. The first deflection unit 214a may be the first deflection unit counted from the top to the bottom, or the first deflection unit counted from the bottom to the top.

Column scanning: If a plurality of first emission assemblies 210 are arranged in the vertical direction, and the deflection units 214a in each first emission assembly 210 are arranged in the horizontal direction, the foregoing row scanning is switched to column scanning. The scanning process is similar to that of the row scanning. Details are not described herein again. The first deflection unit 214a may be the first deflection unit counted from left to right, or the first deflection unit counted from right to left.

Figure 8:
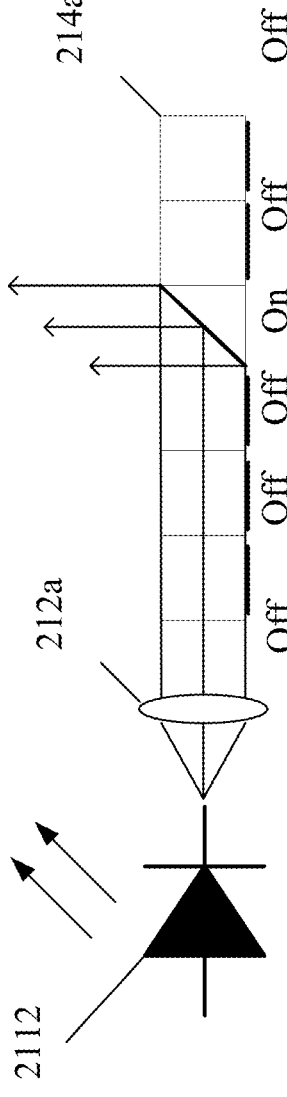
FIG. 8 is a schematic diagram of an optical path of a laser device and a polarizer according to an embodiment of the present disclosure.

As shown in FIG. 8, the deflection unit 214a is a controllable polarizer, and the controllable polarizer is configured to reflect the outgoing laser when in an on state, and has reflectivity close to 100%, which can reflect almost all the incident outgoing lasers. The controllable polarizer is configured to transmit the outgoing laser when in an off state, and has transmittance close to 100%, which can transmit almost all the incident outgoing lasers to the next polarizer. States of different controllable polarizers are controlled, so that the outgoing laser can be controlled to be emitted at different positions of the controllable polarizers. For example, the first controllable polarizer is turned on and other controllable polarizers are turned off, so that almost all the outgoing lasers are emitted at a position of the first controllable polarizer, instead of being incident to the other controllable polarizers (energy of the outgoing laser incident to the other controllable polarizers is very small and can be ignored); the second controllable polarizer is turned on and the other controllable polarizers are turned off, so that 100% of the outgoing lasers passing through the first controllable polarizer are transmitted, and are incident to the second controllable polarizer and emitted at the position of the second controllable polarizer; and so on until the last controllable polarizer is turned on, so that all the outgoing lasers are emitted at the position of the last controllable polarizer.

In this embodiment, a plurality of first emission assemblies 210 are provided, and on-off of the deflection unit 214a in each first emission assembly 210 is controlled, to complete scanning of the entire detection region, and emission and receiving is implemented by means of electronic scanning without needing a mechanical rotating component, thereby improving the reliability of a product and prolonging the service life of the product.

Figure 9:
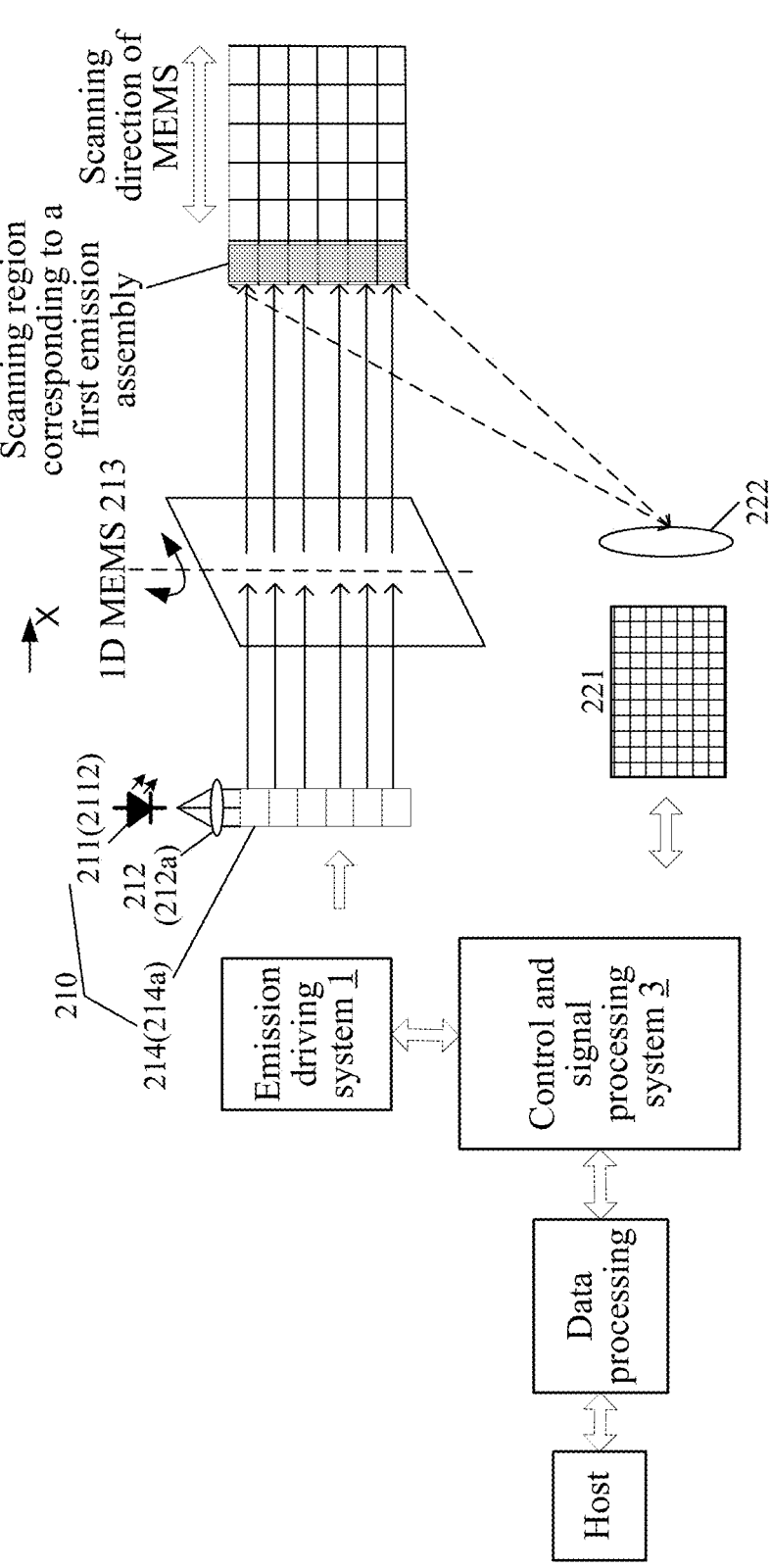
FIG. 9 is a schematic diagram of an optical path of LiDAR using a laser device, a group of deflection units, and a one-dimensional MEMS micromirror according to an embodiment of the present disclosure.

If only one first emission assembly 210 is configured to scan in the first direction, a deflection mechanism 213 further needs to be added to scan in the second direction, in order to scan the entire detection region. As shown in FIG. 9, in another embodiment, the emission assembly 21 includes a laser emission module 211 and an optical deflection module 214, and the optical deflection module 214 includes a plurality of deflection units 214a arranged in the first direction. The laser emission module 211 is configured to emit the outgoing laser to the optical deflection module 214 in the first direction (direction X), and the deflection unit 214a in the optical deflection module 214 is configured to deflect and then emit the outgoing laser. Each deflection unit 214a is configured to individually control the transmittance and reflectivity of an outgoing laser passing each deflection unit. The foregoing controllable polarizer may also be used as the deflection unit 214a. The LiDAR 100 further includes a deflection mechanism 213, and the deflection mechanism 213 is configured to receive the outgoing laser and reflect the outgoing laser toward the detection region of the array detector 221, so that the outgoing laser scans to traverse the entire detection region. The deflection mechanism 213 may use a device that can implement optical scanning, such as a MEMS micromirror, a reflector, or a transmission prism. In this embodiment, the deflection mechanism 213 is a one-dimensional MEMS micromirror. The one-dimensional MEMS micromirror is configured to complete scanning in a direction. Compared with a LiDAR using a two-dimensional MEMS micromirror or another two-dimensional rotating component, this embodiment only uses a one-dimensional MEMS micromirror to scan in one direction and completes scanning in another direction through electronic scanning, thereby improving the reliability of the product.

Figure 10A:
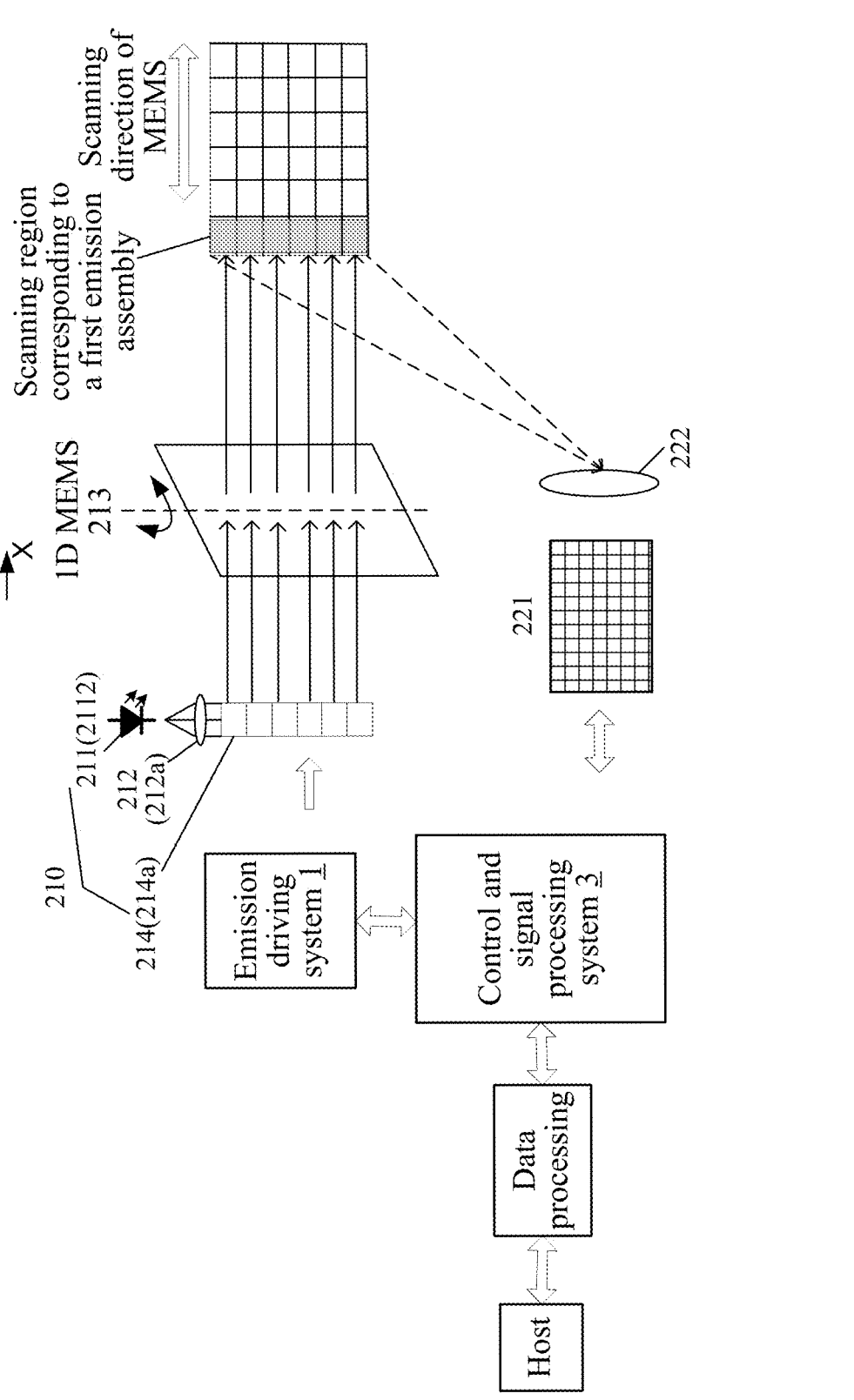
FIG. 10a is a schematic diagram of another optical path of a LiDAR using a laser device, a deflection unit of a plane mirror, and a one-dimensional MEMS micromirror according to an embodiment of the present disclosure.
Figure 10B:
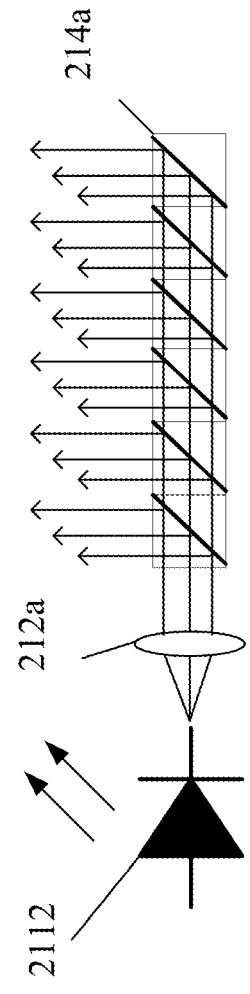

Referring to FIG. 10a, a difference in this embodiment from the embodiment shown in FIG. 9 is that the deflection unit 214a uses a plane mirror (referring to FIG. 10b), and each plane mirror is configured to deflect a preset proportion of the outgoing laser for emission. Preset proportions of the outgoing laser reflected by plane mirrors may be the same or different.

Each plane mirror has the same or different transmittance or reflectivity, so that the outgoing laser is reflected from each plane mirror in a preset fixed proportion. The prepared plane mirror has fixed transmittance or reflectivity. In some embodiments, the transmittance or reflectivity of each plane mirror is calculated in advance according to an actual need, and the corresponding plane mirror is selected or prepared according to the determined transmittance or reflectivity, so that energy of the outgoing lasers reflected by each plane mirror is the same or approximately the same. For example, there are 5 plane mirrors in total. The first plane mirror has transmittance of 80% and reflectivity of 20%, and therefore, the energy of the outgoing laser reflected by the first plane mirror is 20% of the total energy of the outgoing laser. The second plane mirror has transmittance of 75% and reflectivity of 25%, and therefore, a ratio of the energy of the outgoing laser reflected by the second plane mirror to the total energy of the outgoing laser is 80%*25%=20%. The third plane mirror has transmittance of 67% and reflectivity of 33%, and therefore, a ratio of the energy of the outgoing laser reflected by the third plane mirror to the total energy of the outgoing laser is 80%*75%*33%=19.8%, which is approximately 20%. The fourth plane mirror has transmittance of 50% and reflectivity of 50%, and therefore, a ratio of the energy of the outgoing laser reflected by the fourth plane mirror to the total energy of the outgoing laser is 80%*75%*67%*50%=20.1%, which is approximately 20%.

The fifth plane mirror has transmittance of approximately 0% and reflectivity of approximately 100%, and therefore, a ratio of the energy of the outgoing laser reflected by the fifth plane mirror to the total energy of the outgoing laser is 80%*75%*67%*50%*100%=20.1%, which is approximately 20%. If the foregoing plane mirrors are selected, the energy of the outgoing laser reflected by each plane mirror is about 20% of the total energy of the outgoing laser.

In another embodiment, to satisfy a detection requirement for high resolution of a region of interest, the energy of an outgoing laser reflected by a plane mirror, which is configured to deflect the outgoing laser to a region of interest in the detection region, may also be greater than the energy of an outgoing laser reflected by another plane mirror. For example, there are 5 plane mirrors in total, a central region is a region of interest, and the energy of an outgoing laser reflected by 3 plane mirrors in the central detection region needs to be greater than the energy of an outgoing laser reflected by the other two plane mirrors. The first plane mirror has transmittance of 90% and reflectivity of 10%, and therefore, the energy of the outgoing laser reflected by the first plane mirror is 10% of the total energy of the outgoing laser. The second plane mirror has transmittance of 71% and reflectivity of 29%, and therefore, a ratio of the energy of the outgoing laser reflected by the second plane mirror to the total energy of the outgoing laser is 90%*29%=26.1%. The third plane mirror has transmittance of 58% and reflectivity of 42%, and therefore, a ratio of the energy of the outgoing laser reflected by the third plane mirror to the total energy of the outgoing laser is 90%*71%*42%=26.8%. The fourth plane mirror has transmittance of 28% and reflectivity of 72%, and therefore, a ratio of the energy of the outgoing laser reflected by the fourth plane mirror to the total energy of the outgoing laser is 90%*71%*58%*72%=26.7%. The fifth plane mirror has approximately transmittance of 0% and reflectivity of 100%, and therefore, a ratio of the energy of the outgoing laser reflected by the fifth plane mirror to the total energy of the outgoing laser is 90%*71%*58%*28%*100%=10.4%. The foregoing plane mirrors are selected so that the energy of outgoing lasers reflected by the three plane mirrors, which are configured to deflect the outgoing lasers to the central detection region, needs to be greater than the energy of outgoing lasers reflected by the other two plane mirrors. The transmittance or reflectivity of the plane mirrors can be changed based on an actual situation. After the transmittance or reflectivity of each plane mirror is determined, the corresponding plane mirror is selected or prepared to meet the actual detection need.

In this embodiment, different from the foregoing controllable polarizer, the plane mirrors cannot be controlled in terms of on-off. Plane mirrors in the first emission assembly 210 reflect the outgoing laser almost simultaneously (transmission time of light in each plane mirror is negligible), the outgoing laser of the first emission assembly 210 in the first direction can cover the detection region in this direction, and therefore, the first emission assembly 210 does not scan a detection region in the first direction (direction Y), and the deflection mechanism 213 scans in the second direction (direction X) to scan the entire detection region.

Figure 11:
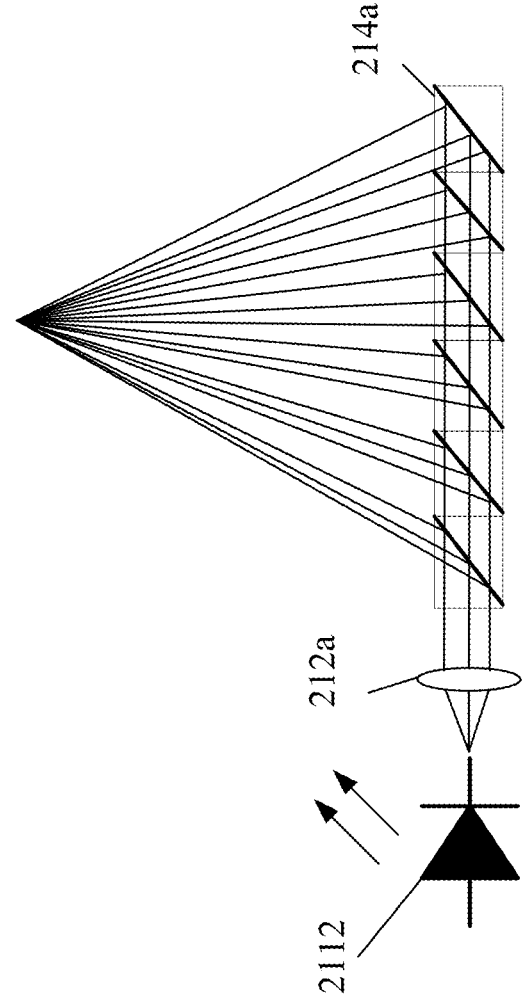
FIG. 11 is a schematic diagram of an optical path of a laser device and a plane mirror according to another embodiment of the present disclosure.

Regarding angles of the plane mirrors, all the plane mirrors can be at 45 degrees, so that the outgoing lasers are evenly distributed in stripes. However, in this case, a deflection mechanism 213 with a larger area needs to be provided to receive the outgoing lasers reflected by all the plane mirrors. Therefore, the angle of the plane mirror can be changed to change the deflection direction, so that the outgoing laser passing through the plane mirrors can arrive and be focused, thereby reducing the size of the deflection mechanism 213. For example, as shown in FIG. 11, included angles between outgoing lasers emitted by a plurality of plane mirrors and the laser emission module 211 are successively decreased in the first direction, so that an outgoing laser passing through each plane mirror is focused toward the center.

Figure 12A:
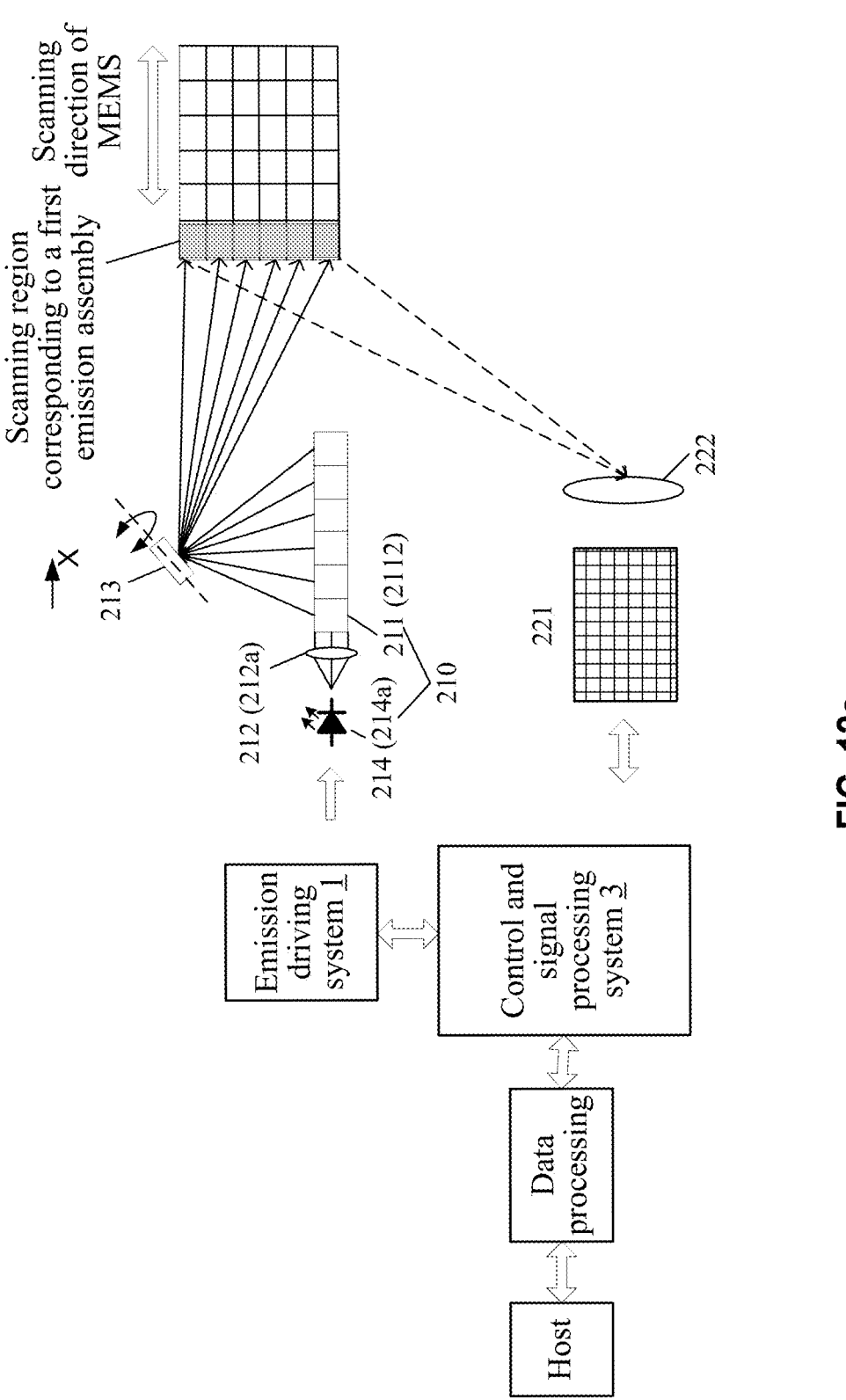
FIG. 12a is a schematic diagram of an optical path of a LiDAR using a laser device, a deflection unit of a plane mirror, and a one-dimensional MEMS micromirror according to another embodiment of the present disclosure.
Figure 12B:
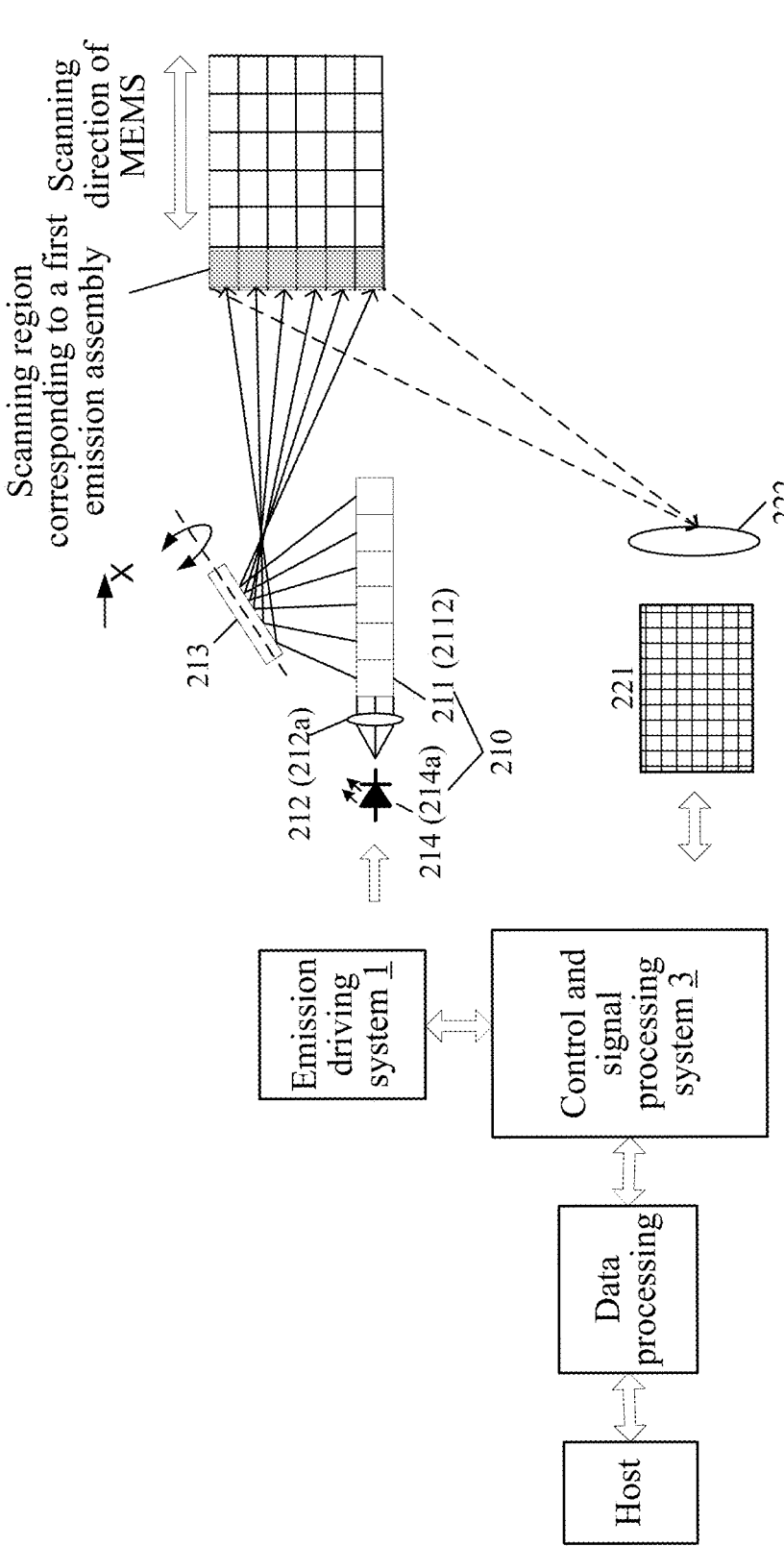
FIG. 12b is a schematic diagram of an optical path of LiDAR using a laser device, a deflection unit of a plane mirror, and a one-dimensional MEMS micromirror according to still another embodiment of the present disclosure.

As shown in FIG. 12a, the deflection mechanism 213 is exactly located at a focal position at which the outgoing laser is focused. When the deflection mechanism 213 is at this position, the size of the deflection mechanism 213 can be minimized. The deflection mechanism 213 may also be located at a non-focus position, for example, a position shown in FIG. 12b. In this case, the deflection mechanism 213 has a larger size than that in FIG. 12a.

Figure 13:
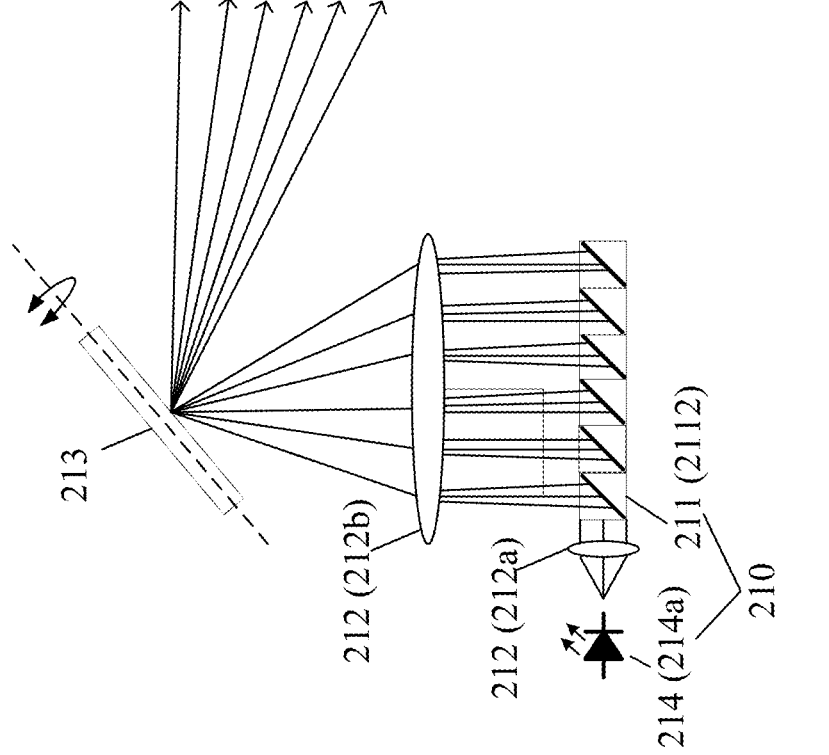
FIG. 13 is a schematic diagram of a local optical path of a LiDAR using a laser device, a deflection unit of a plane mirror, a lens, and a one-dimensional MEMS micromirror according to yet another embodiment of the present disclosure.

As shown in FIG. 13, in another embodiment, in addition to the first lens 212a used by the emission optical module 212 to collimate the outgoing laser emitted by the laser device 2112, the emission optical module 212 of the LiDAR 100 further includes a second lens 212b, and the second lens 212b is configured to focus the outgoing laser deflected by each plane mirror and direct the outgoing laser to the deflection mechanism 213. There is an optical path gap between outgoing laser beams collimated by the first lens 212a, and therefore, a light spot reflected by the deflection mechanism 213 is a non-continuous linear light spot, and there is a blind spot during detection. A second lens 212b is provided on an outgoing laser path reflected by the plane mirror to focus the beam, so that the light spot incident on the deflection mechanism 213 is a continuous gapless linear light spot, and therefore, the light spot reflected by the deflection mechanism 213 is also a continuous gapless linear light spot to avoid a blind spot during detection.

(3) Emission Assembly 21 Including an Optical Shaping Module

In some embodiments, the emission assembly 21 includes a laser emission module, an optical shaping module, and a deflection mechanism. The laser emission module is configured to emit an outgoing laser to the optical shaping module. the optical shaping module is configured to shape the outgoing laser and direct the outgoing laser to the deflection mechanism. The deflection mechanism is configured to receive the outgoing laser and reflect the outgoing laser to the detection region of the array detector. The deflection mechanism is also configured to scan through the outgoing laser to traverse the entire detection region.

Figure 14:
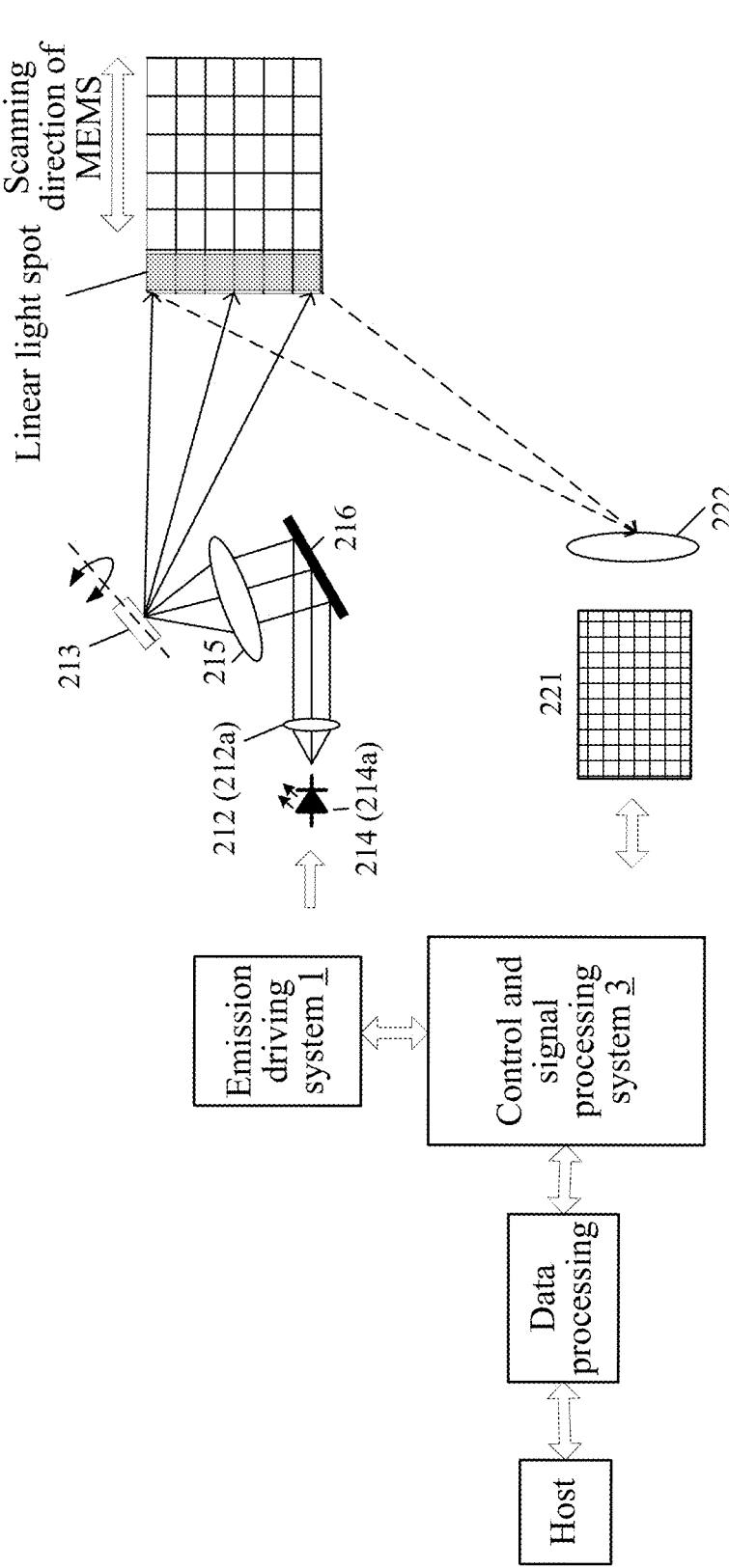
FIG. 14 is a schematic diagram of an optical path of a LiDAR including an optical shaping module according to an embodiment of the present disclosure.

As shown in FIG. 14, in one embodiment, the emission assembly 21 includes a laser emission module 211 and a first optical shaping module 215, and the LiDAR 100 further includes a deflection mechanism 213. The laser emission module 211 uses a laser device 2112. The laser emission module 211 is configured to emit an outgoing laser to the first optical shaping module 215, and the first optical shaping module 215 is configured to focus the outgoing laser and direct the outgoing laser to the deflection mechanism 213. The deflection mechanism 213 is configured to receive the outgoing laser and reflect the outgoing laser to the detection region of the array detector 221. The outgoing laser incident to the detection region is a linear light spot, and the deflection mechanism 213 is also configured to scan through the linear light spot to traverse the entire detection region. The first optical shaping module 215 may use a cylindrical lens or a micro-cylindrical-lens array. The deflection mechanism 213 may use a device that can implement optical scanning, such as a MEMS micromirror, a reflector, or a transmission prism. In this embodiment, the deflection mechanism 213 is a one-dimensional MEMS micromirror. The one-dimensional MEMS micromirror is configured to complete scanning in a direction.

To reduce the size of the product, a reflection module may also be provided in the optical path. For example, in this embodiment, a reflector 216 is provided between the first lens 212a and the first optical shaping module 215.

In this embodiment, the first optical shaping module 215 is provided between the laser emission module 211 and the deflection mechanism 213, and therefore, the first optical shaping module 215 focuses the outgoing laser and then emits the outgoing laser to the deflection mechanism 213, so that an outgoing laser spot reflected by the deflection mechanism 213 is a linear light spot, to avoid a blind spot during detection. Compared with a LiDAR using a two-dimensional MEMS micromirror or another two-dimensional rotating component, in this embodiment, the first optical shaping module 215 shapes the outgoing laser into a linear light spot in the first direction, and scans in the second direction by using only the one-dimensional MEMS micromirror, thereby improving reliability of the product.

Figure 15:
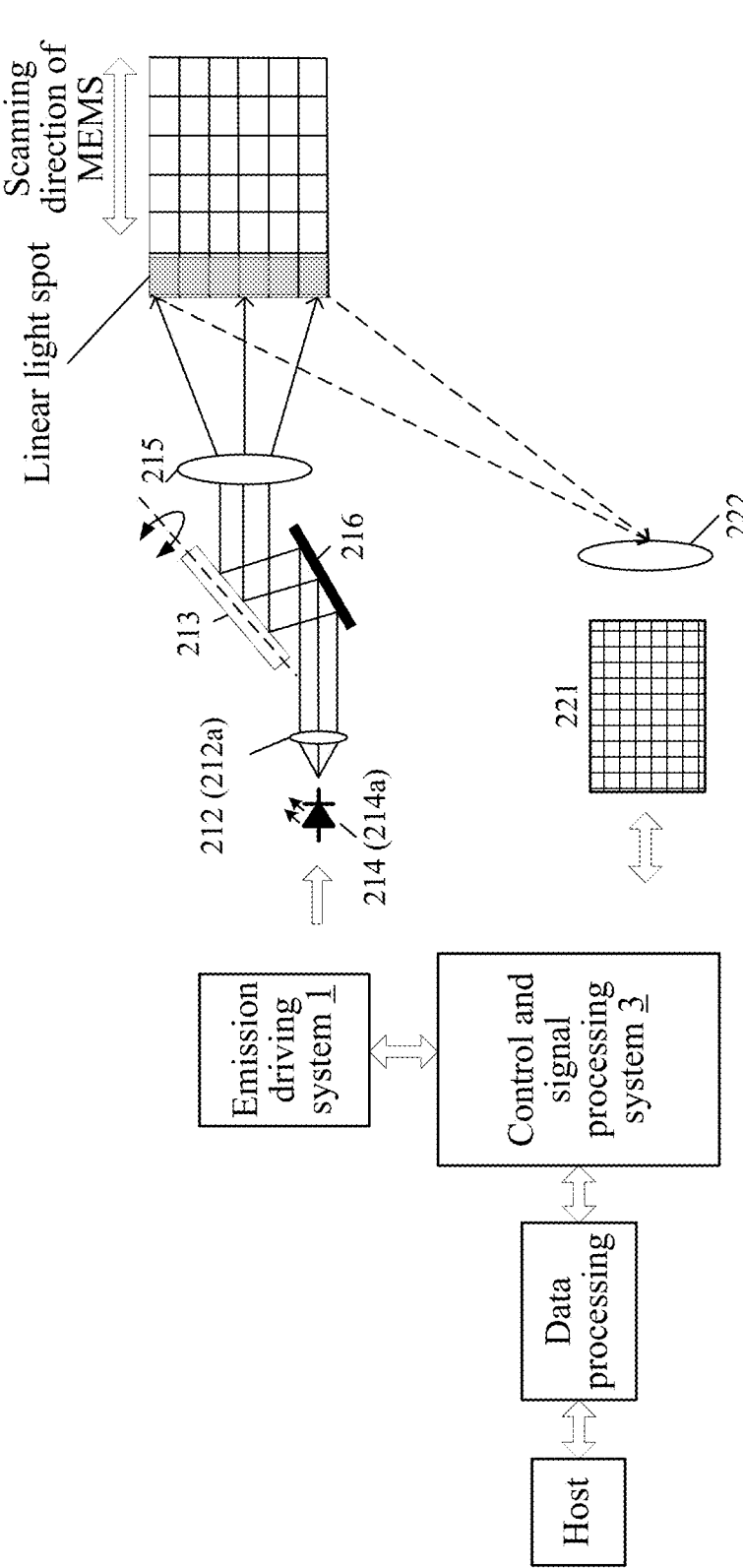
FIG. 15 is a schematic diagram of an optical path of a LiDAR including an optical shaping module according to another embodiment of the present disclosure.
Figure 16:
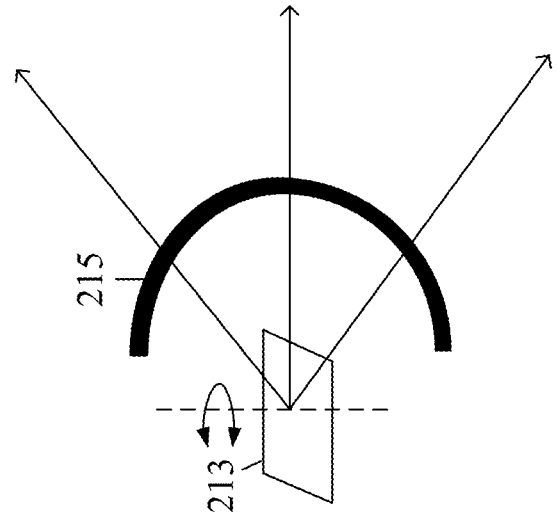
FIG. 16 is a schematic diagram of a deflection mechanism and the optical shaping module in FIG. 15.

The position of the first optical shaping module 215 can also be adjusted. As shown in FIG. 15, in another embodiment, a laser emission module 211 is configured to emit an outgoing laser to a deflection mechanism 213. The deflection mechanism 213 is configured to receive the outgoing laser and reflect the outgoing laser to the first optical shaping module 215. The first optical shaping module 215 is configured to shape the outgoing laser into a linear light spot and then emit the linear light spot to the detection region of the array detector 221. The deflection mechanism 213 is further configured to scan through the linear light spot to traverse the entire detection region. The first optical shaping module 215 is the cylindrical lens or the micro-cylindrical-lens array. For example, a cross-section of the first optical shaping module 215 in a rotation plane of the deflection mechanism 213 is arc-shaped and is symmetrical around the deflection mechanism 213, as shown in FIG. 16. The deflection mechanism 213 may use a device that can implement optical scanning, such as a MEMS micromirror, a reflector, or a transmission prism. In this embodiment, the deflection mechanism 213 is a one-dimensional MEMS micromirror. The one-dimensional MEMS micromirror is configured to complete scanning in a direction.

In this embodiment, the first optical shaping module 215 is provided on the optical path of the outgoing laser reflected by the deflection mechanism 213. The first optical shaping module 215 shapes the outgoing laser reflected by the deflection mechanism 213 into the linear light spot and then emits the linear light spot to the detection region of the array detector 221, and a finally emitted outgoing laser spot is the linear light spot, thereby avoiding the blind spot during detection. Compared with a LiDAR using a two-dimensional MEMS micromirror or another two-dimensional rotating component, in this embodiment, the first optical shaping module 215 shapes the outgoing laser into a linear light spot in the first direction, and scans in the second direction by using only the one-dimensional MEMS micromirror, thereby improving the reliability of the product.

Figure 17:
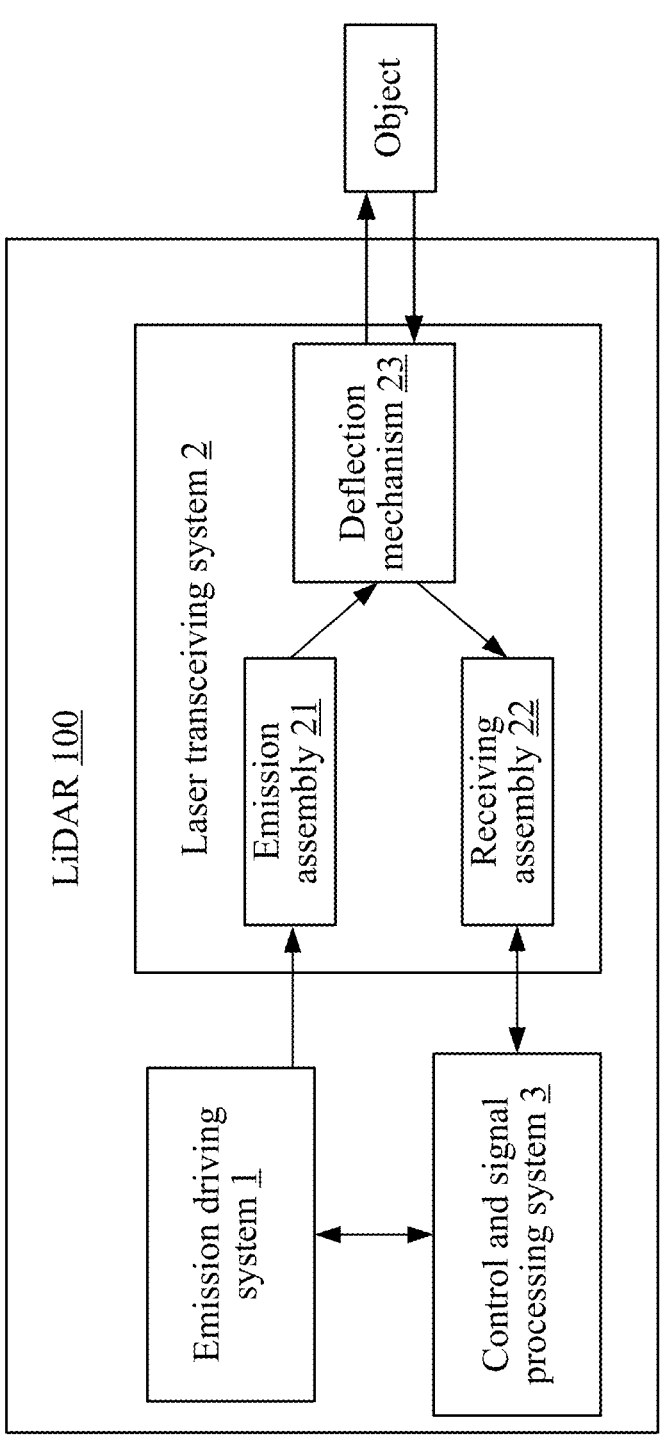
FIG. 17 is a structural block diagram of a LiDAR according to an embodiment of the present disclosure.
Figure 18:
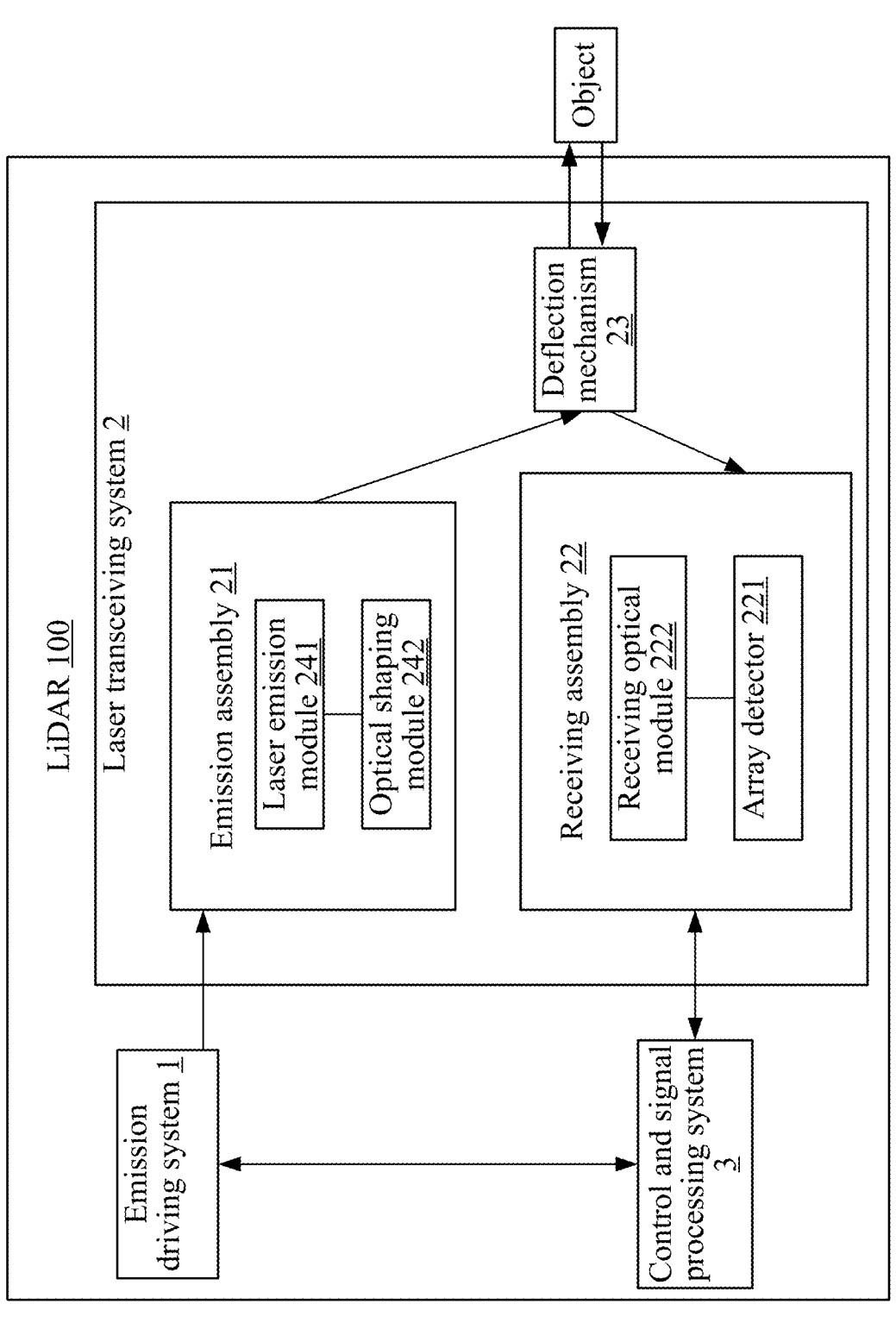
FIG. 18 is a structural block diagram of a LiDAR according to another embodiment of the present disclosure.

As shown in FIGS. 17 and 18, in some embodiments, the emission assembly 21 includes a laser emission module 241, and a second optical shaping module 242. The laser emission module 241 is configured to emit an outgoing laser, and the second optical shaping module 242 is configured to shape the outgoing laser and direct the shaped outgoing laser to the deflection mechanism 23. A shaped light spot can be a point light spot, a linear light spot, or a block light spot.

The shaped light spot is reflected by the deflection mechanism 23 to a local detection region, that is, a part of the detection region. The laser emission module 241 may be various types of signal light sources, such as Laser Diode (LD), Vertical-Cavity Surface-Emitting Laser (VCSEL), Edge Emitting Laser (EEL), a Light Emitting Diode (LED) fiber, and other devices.

Second optical shaping module 242 can use a lens and a lens group, an optical fiber and a spherical lens group, a separate spherical lens group, a cylindrical lens group, Slow-Axis-Collimator Lens (SAC Lens), Fast-Axis-Collimator Lens (Fast-Axis-Collimator LENS), a microlens array, a Diffractive Optical Element (DOE), a diffuser, or the like. For example, if the laser emission module 241 uses the EEL, FAC and SAC can be used to shape the outgoing laser along a fast-axis and a slow-axis, respectively. If the laser emission module 241 uses an array arrangement device such as a VCSEL array, a lens can be used for shaping. If the laser emission module 241 uses a signal light source without an array arrangement, a collimating lens and a microlens (or a microcylindrical lens) can be used in combination to shape the outgoing laser.

The receiving assembly 22 includes a receiving optical module 222 and an array detector 221. The receiving optical module 222 is configured to focus the echo laser and emit a focused echo laser to the array detector 221. The array detector 221 is configured to receive the echo laser. The receiving optical module 222 can be a spherical lens, a spherical lens group, a cylindrical lens group, or the like. The array detector 221 may be a receiving device that can form an array, such as an Avalanche Photo Diode (APD) array, a Silicon Photomultiplier (SiPM), a Multi-Pixel Photon Counter (MPPC) array, or a photomultiplier tube (PMT) array, a single-photon avalanche diode (SPAD) array, Charge-coupled Device (CCD), Complementary Metal Oxide Semiconductor (CMOS), or the like. The array detector 221 may use an area array detector, including m*n pixels (that is, detection units), on-off of which can be separately controlled, where m and n are both integers greater than 1.

The control and signal processing system 3 may be a Field Programmable Gate Array (FPGA). The FPGA is connected to the emission driving system 1, to control emission of the outgoing laser. The FPGA is also connected to a clock pin, a data pin, and a control pin of the receiving assembly 22 separately, to control receiving of the echo laser.

The deflection mechanism 23 is configured to receive the shaped outgoing laser, reflect the outgoing laser toward the local detection region of the array detector 221, and deflect the outgoing laser for scanning to traverse all the detection regions of the array detector 221. The deflection mechanism 23 is further configured to receive the echo laser and reflect the echo laser to the receiving assembly 22. The echo laser is the laser returned after the outgoing laser is reflected by an object in the detection region. The outgoing laser has the same light spot size as the echo laser. The light spot size of the outgoing laser is controlled through beam shaping, so that a size of an image formed by the echo laser on the array detector 221 in one scan is less than a size of all the pixels of the array detector 221, that is, a receiving surface of the array detector 221.

The receiving assembly 22 is configured to synchronously turn on all pixels in the array detector 221 that are corresponding to the first region when the outgoing laser scans the first region in the detection region to detect the first region. For example, when the outgoing laser is incident on a first pixel in the detection region, the array detector 221 turns on the first pixel for detection, and in this case, another pixel is in an off state; then the outgoing laser is incident on a second pixel, the array detector 221 turns on the second pixel for detection, and in this case, the first pixel is stopped from detecting, and so on, so that pixels dynamically perform detection in sequence. When the outgoing laser is incident on a plurality of pixels in the detection region, the array detector 221 turns on the plurality of pixels corresponding to the outgoing laser for detection. The array detector can also turn on all the pixels simultaneously, but detection regions corresponding to some pixels are not scanned by the outgoing laser at the same moment, and therefore, power consumption and the losses of the array detector 221 are increased in the method.

Figure 19A:
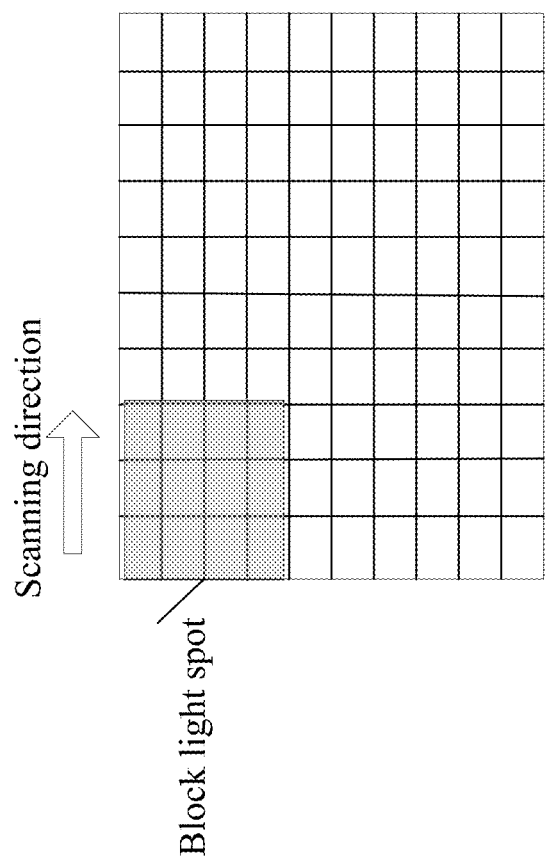
FIG. 19a is a schematic diagram of scanning of a block light spot according to an embodiment of the present disclosure.
Figure 19B:
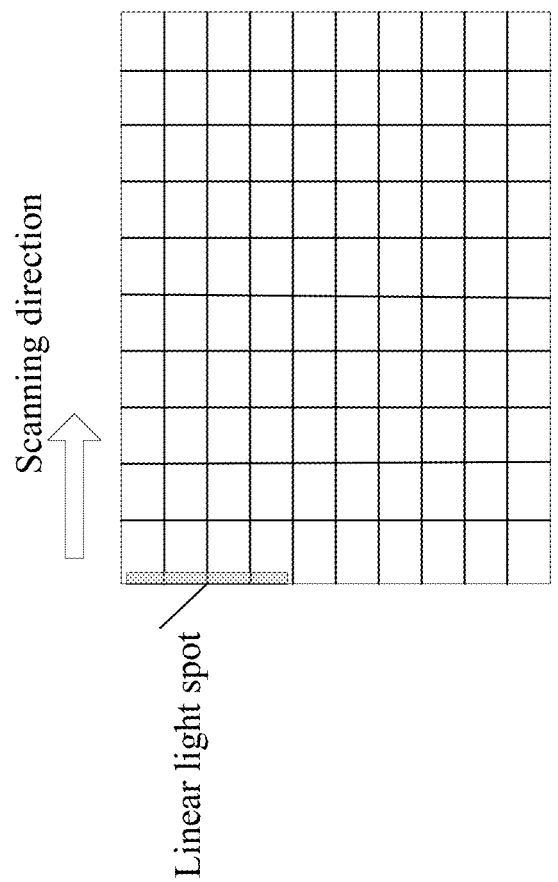
FIG. 19b is a schematic diagram of scanning of a linear light spot according to an embodiment of the present disclosure.
Figure 19C:
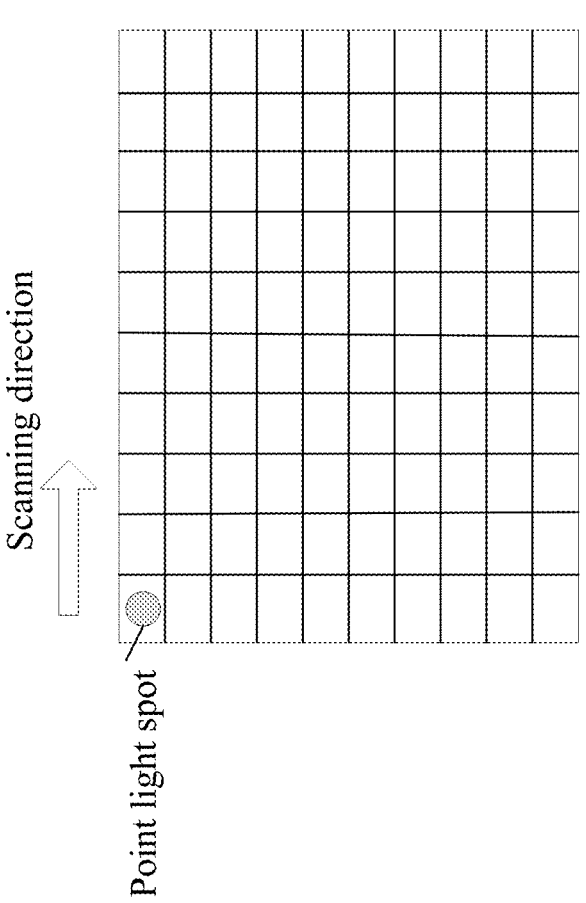
FIG. 19c is a schematic diagram of scanning of a point light spot according to an embodiment of the present disclosure.

As shown in FIG. 19a, the outgoing laser spot can be a block light spot with a small divergence angle (small-area light spot). As shown in FIG. 19b, the outgoing laser spot can also be a linear light spot; and correspondingly, the echo laser spot is also a block light spot or a linear light spot. As shown in FIG. 19c, the echo laser spot can also be a point light spot (a light spot located in a single pixel). The collimated outgoing laser is deflected by the deflection mechanism 23 to a detection range of one or more pixels in the detection region of the array detector 221, and the array detector 221 turns on a pixel corresponding to the collimated outgoing laser synchronously to start ranging, to obtain a distance from a corresponding position. The deflection mechanism 23 scans, to traverse the detection region of all the pixels of the entire array detector 221, to obtain a distance from each position, thereby obtaining 3D point cloud data of the entire detection region.

In the embodiments of the present disclosure, based on an existing conventional detector, the outgoing laser is shaped, so that the outgoing laser spot is a point light spot, a block light spot, or a linear light spot, and the deflection mechanism is added, to complete the detection of the detection region in a traversing and scanning method. Due to the use of a point light spot, a block light spot, or a linear light spot, peak power of the required light source and emission energy can be reduced while ensuring detection resolution without increasing a size of a receiving surface of an array detector; and a detection distance can be increased under the same emission energy. Compared with the related art in which the size of the receiving surface of the array detector needs to be increased to meet a requirement for high resolution, in the embodiments of the present disclosure, the size of the image of the array detector is reduced, which reduces the size of the array detector, so that the number of pixels and the detection resolution can be increased under the same surface size.

The deflection mechanism 23 may use a MEMS micromirror, a reflector, a transmission prism, or the like to scan the detection region.

The following further describes several embodiments in which the outgoing laser spot is used:
(I) Using Two-Dimensional MEMS Micromirror and Point Light Spot In this embodiment, the outgoing laser and the echo laser are both circular point light spots, and an image formed by the echo laser on the array detector 221 is located in a single pixel of the array detector 221.

Figure 20A:
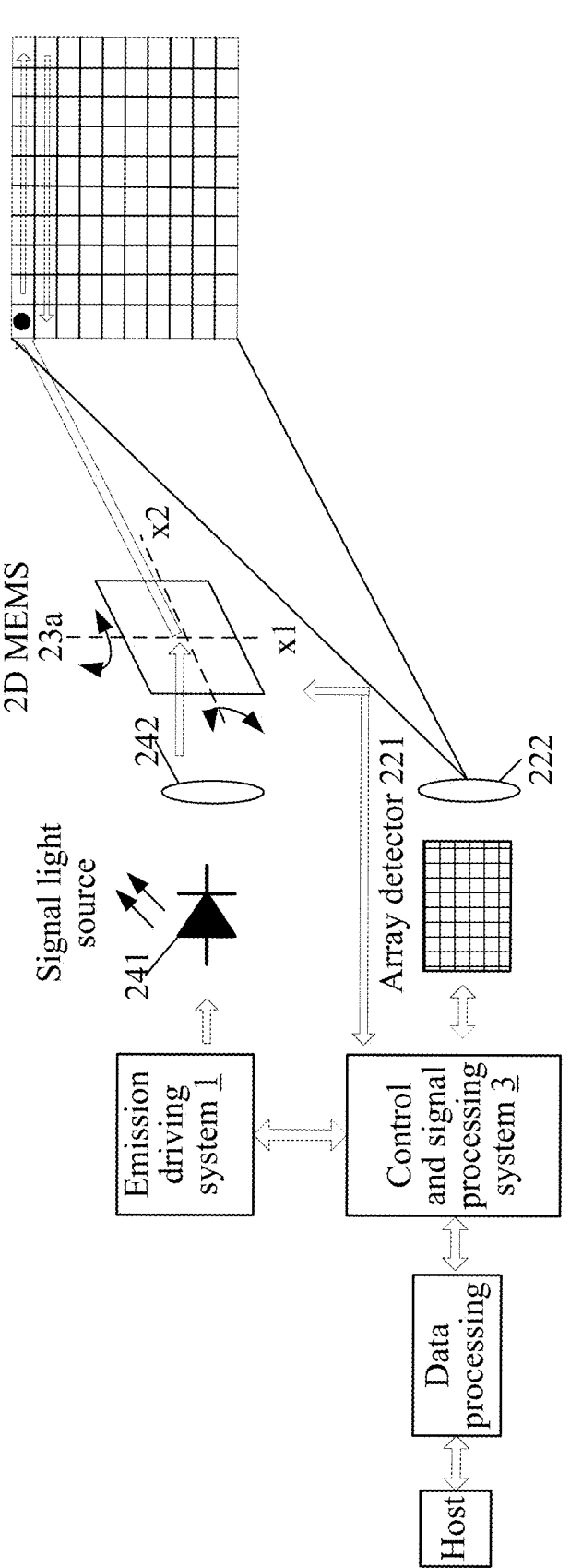
FIG. 20a is a schematic diagram illustrating that a laser transceiving system first scans in a horizontal direction by using a two-dimensional MEMS micromirror and a point light spot according to an embodiment of the present disclosure.

As shown in FIG. 20a, the deflection mechanism 23 is a two-dimensional MEMS micromirror 23a, and the two-dimensional MEMS micromirror 23a includes a mirror, a first rotation shaft x1, and a second rotation shaft x2, the light spots of the outgoing laser and the echo laser are point light spots, and the light spot size of the outgoing laser is controlled (that is, a divergence angle of the outgoing laser is controlled), to control the light spot size of the echo laser, so that an image formed by the echo laser on the array detector 221 is located in a single pixel of the array detector 221 and covers most of a sensing region of the single pixel. The mirror is configured to rotate around the first rotation shaft x1, so that the outgoing laser scans the detection region of the array detector 221 in the horizontal direction. The mirror is further configured to rotate around the second rotation shaft x2, so that the outgoing laser scans the detection region of the array detector 221 in the vertical direction. The mirror is also configured to receive the echo laser and reflect the echo laser to the receiving assembly 22.

An exemplary scanning process is as follows. The mirror rotates around the first rotation shaft x1 in the first direction, so that the outgoing laser scans the detection region of the array detector 221 rightward in the horizontal direction. After the outgoing laser completes the first scan in the horizontal direction, the mirror rotates around the second shaft x2 in the second direction, so that the outgoing laser scans the detection region of the array detector 221 downward in the vertical direction, and the outgoing laser only needs to scan to a pixel position of the light spot in the second row in the vertical direction, to complete the first scan in the vertical direction; then the mirror rotates around the first rotation shaft x1 in the third direction, so that the outgoing laser scans the detection region of the array detector 221 leftward in the horizontal direction, and the third direction is the opposite direction of the first direction. After the outgoing laser completes the second scan in the horizontal direction, the mirror rotates around the second shaft x2 in the second direction, so that the outgoing laser scans the detection region of the array detector 221 from downward in the vertical direction, and the outgoing laser only needs to scan to a pixel position of the light spot in the third row in the vertical direction, to complete the second scan in the vertical direction. After the outgoing laser completes the second scan in the vertical direction, the mirror rotates around the first shaft x1 in the first direction, and so on. Reciprocating scanning is performed until the detection region of the entire array detector 221 is traversed. The outgoing laser can also scan from right to left in the horizontal direction in the beginning.

Figure 20B:
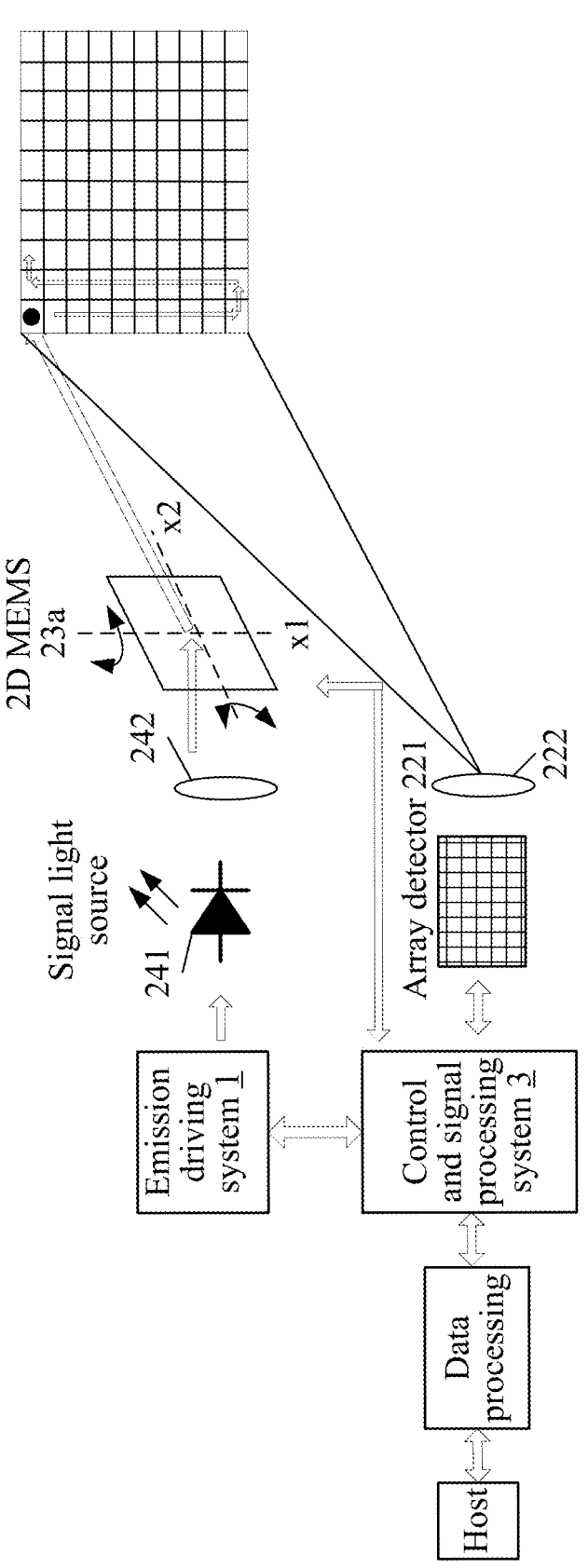
FIG. 20b is a schematic diagram illustrating that a laser transceiving system first scans in a vertical direction by using a two-dimensional MEMS micromirror and a point light spot according to an embodiment of the present disclosure.

It can be understood that, as shown in FIG. 20b, during scanning, scanning can also be performed first in the vertical direction, and then scanning is performed in the horizontal direction, so that the second scan is performed in the vertical direction after the light spot reaches a position for the second scanning in the vertical direction.

It can be understood that, in another embodiment, a divergence angle of the collimated outgoing laser may be slightly larger than angular resolution of the array detector 221, that is, an image formed by the echo laser on the array detector 221 slightly exceeds a single pixel of the array detector (221), but does not exceed a pixel adjacent to the single pixel. However, in the method, photoelectric efficiency of the system is affected, and the impact factor is approximately the divergence angle divided by the angular resolution.

In the foregoing embodiment, the collimated outgoing laser is deflected by the two-dimensional MEMS micromirror 23a to a detection range of a specific pixel in the detection region of the array detector 221, and a divergence angle of a shaped beam (that is, a divergence angle of the collimated outgoing laser) of the signal light source is less than the angular resolution of the single pixel, thereby achieving greater utilization of luminous energy. The array detector 221 synchronously turns on a corresponding pixel to start ranging, to obtain a distance from the corresponding position. The two-dimensional MEMS micromirror $23a$ scans, to traverse the detection region of all the pixels of the entire array detector 221, to obtain a distance from each position, thereby obtaining 3D point cloud data of the entire detection region.

The existing array detector 221 is approximately on the order of 100,000 pixels. In the foregoing embodiment, when a test is performed at the same distance by using the same receiving optical module 222 and array detector 221, the required laser energy can be reduced by $10^5$ orders of magnitude, thereby reducing costs of the signal light source and improving reliability. In the foregoing embodiment, a size of the image area of the array detector 221 can be compressed to meet a miniaturization requirement for the product.

Figure 21A:
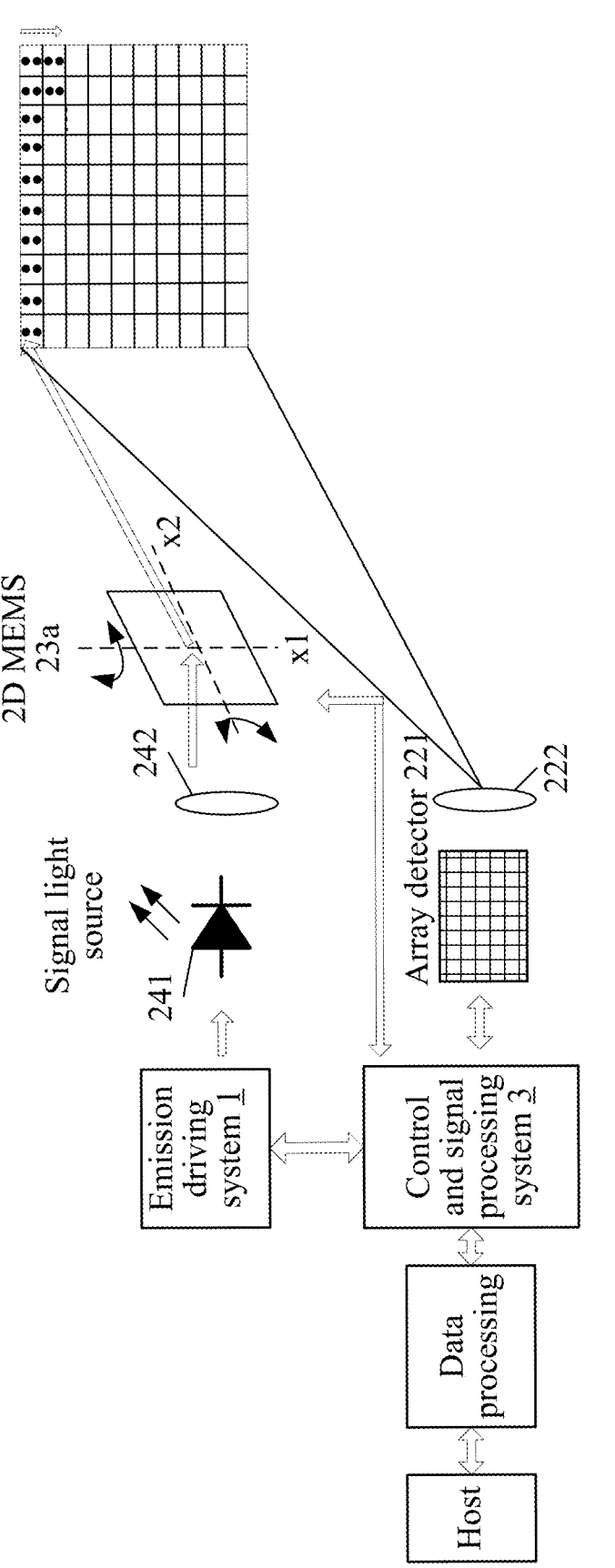
FIG. 21a is a schematic diagram of a laser transceiving system using a two-dimensional MEMS micromirror and ½ of a point light spot according to an embodiment of the present disclosure.
Figure 21B:
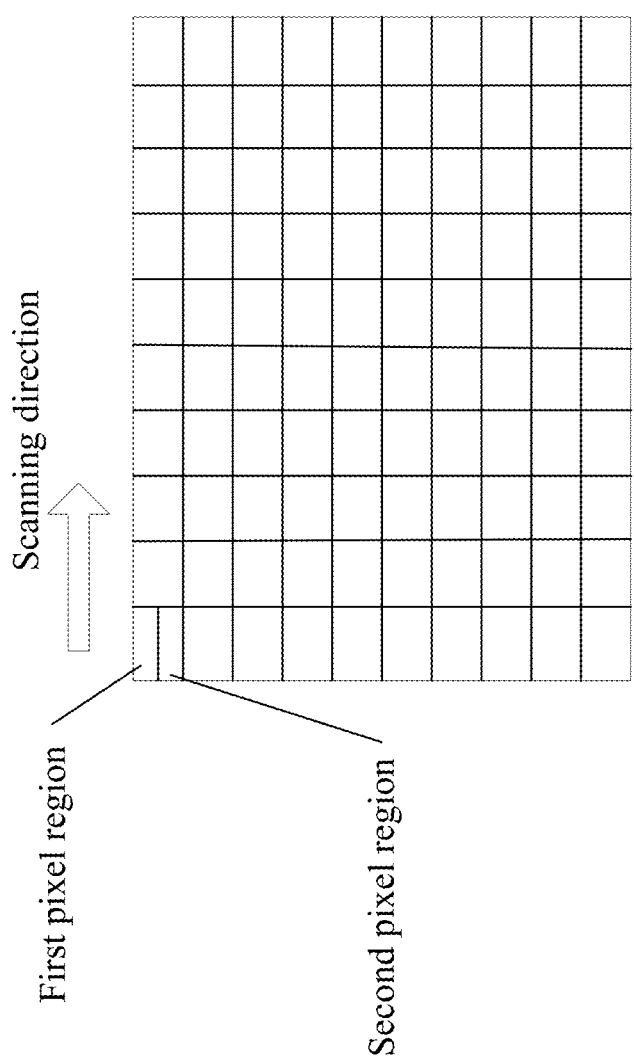
FIG. 21b is a schematic diagram illustrating that a single pixel of an array detector is divided into two pixel regions according to an embodiment of the present disclosure.
Figure 21C:
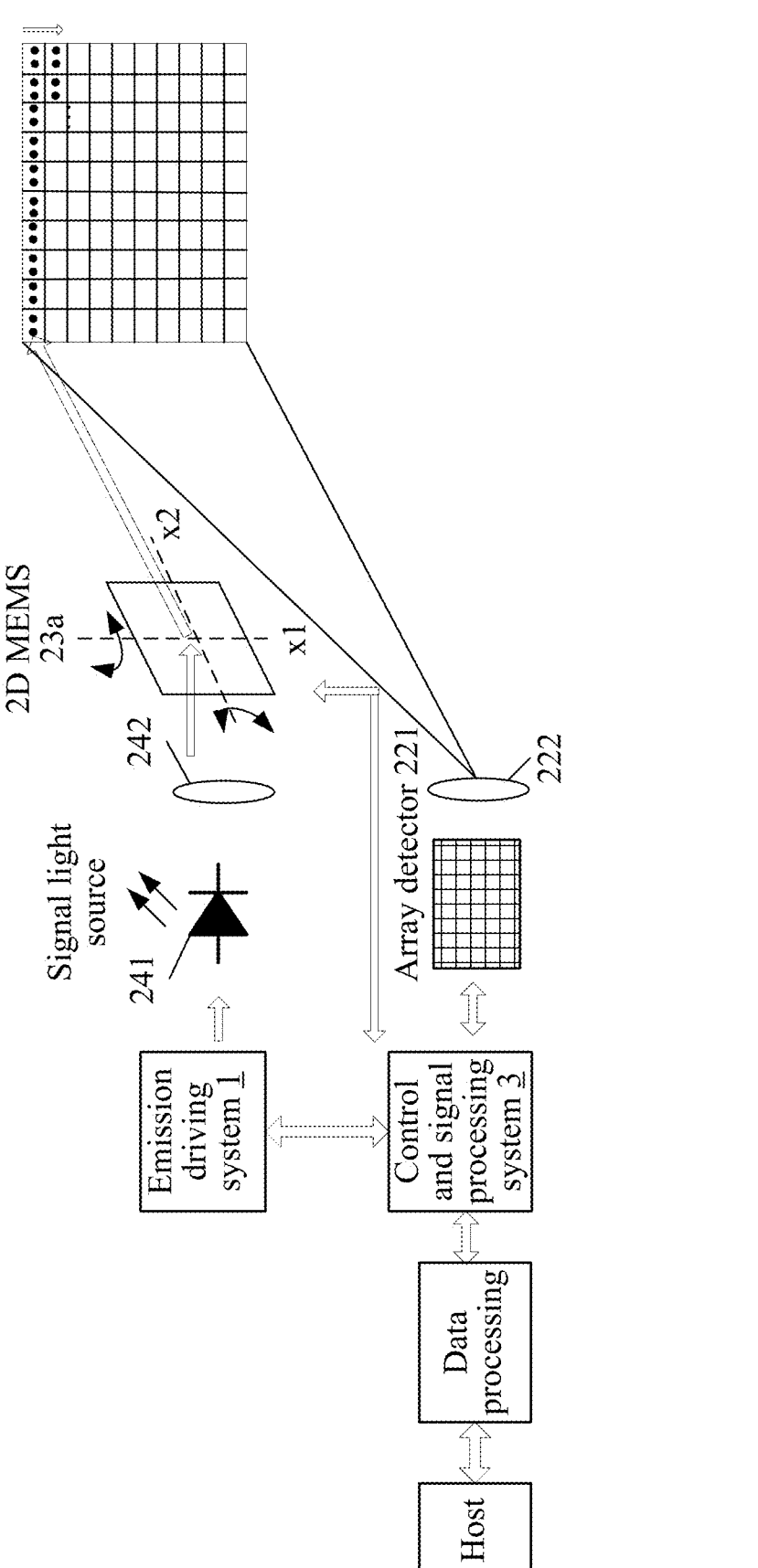
FIG. 21c is a schematic diagram of a laser transceiving system using a two-dimensional MEMS micromirror and ½ of a point light spot according to another embodiment of the present disclosure.

As shown in FIG. 21$a$, in another embodiment, the image formed by the echo laser on the array detector 221 is located within ½ of the pixel of the array detector 221, and the single pixel of the array detector 221 is configured to respectively receive echo lasers in a first pixel region and a second pixel region (referring to FIG. 21$b$) in a scanning sequence of the outgoing laser. The scanning method is similar to the scanning method in the foregoing embodiment shown in FIG. 4$a$. A difference is that, as shown in FIG. 21$a$, when the image formed by the echo laser on the array detector 221 is located within ½ of the pixel of the array detector 221 in the vertical direction and scanning is first performed in the horizontal direction, in order that each row of pixels complete scanning, scanning needs to be performed horizontally once, vertically once, and horizontally once more. That is, in order that each row of pixels complete scanning, scanning needs to be performed twice in the horizontal direction. For another example, as shown in FIG. 21$c$, when the image formed by the echo laser on the array detector 221 is located within ½ of the pixel of the array detector 221 in the horizontal direction and scanning is first performed in the horizontal direction, in order that each row of pixels complete scanning, scanning only needs to be performed horizontally once, which is similar to that in the embodiment shown in FIG. 4$a$.

In the foregoing embodiment, in a single pixel region, the laser emission module 241 needs to perform emission twice, and a corresponding pixel of the array detector 221 performs two coordinated operations synchronously, thereby increasing the resolution by two times. Taking a single pixel as an example, at a moment $t1$, an image formed by the echo laser spot is on a left half (or upper half) of the pixel, and in this case, an angle of the two-dimensional MEMS micromirror $23a$ is $\alpha_1$; and at a moment $t_2$, an image formed by the echo laser spot is on a right half (or lower half) of the pixel, and an angle of the two-dimensional MEMS micromirror $23a$ is $\alpha_2$. Then azimuth angles of the detected object at the moment $t_1$ and the moment $t_2$ can be determined based on $a_1$ and $a_2$ respectively. The angle of the two-dimensional MEMS micromirror $23a$ can be directly read from the MEMS. When images formed by the echo laser spot are on the left and right parts of the pixel, the read angle of the two-dimensional MEMS micromirror $23a$ is a deflection angle around the first shaft $x1$, or when images formed by the echo laser spot are on the upper and lower parts of the pixel, the read angle of the two-dimensional MEMS micromirror $23a$ is the deflection angle around the second rotation axis $x2$. Compared with the case in which the single pixel scans only once, in this embodiment, it can be detected whether the target object is located in the first pixel region or the second pixel region of the pixel, and the angular resolution is doubled. It can be understood that, the size of the image formed by the echo laser on the array detector 221 can be further reduced, and the number of detections performed by the corresponding single pixel is further increased, thereby further improving angular resolution for detection.

Figure 22A:
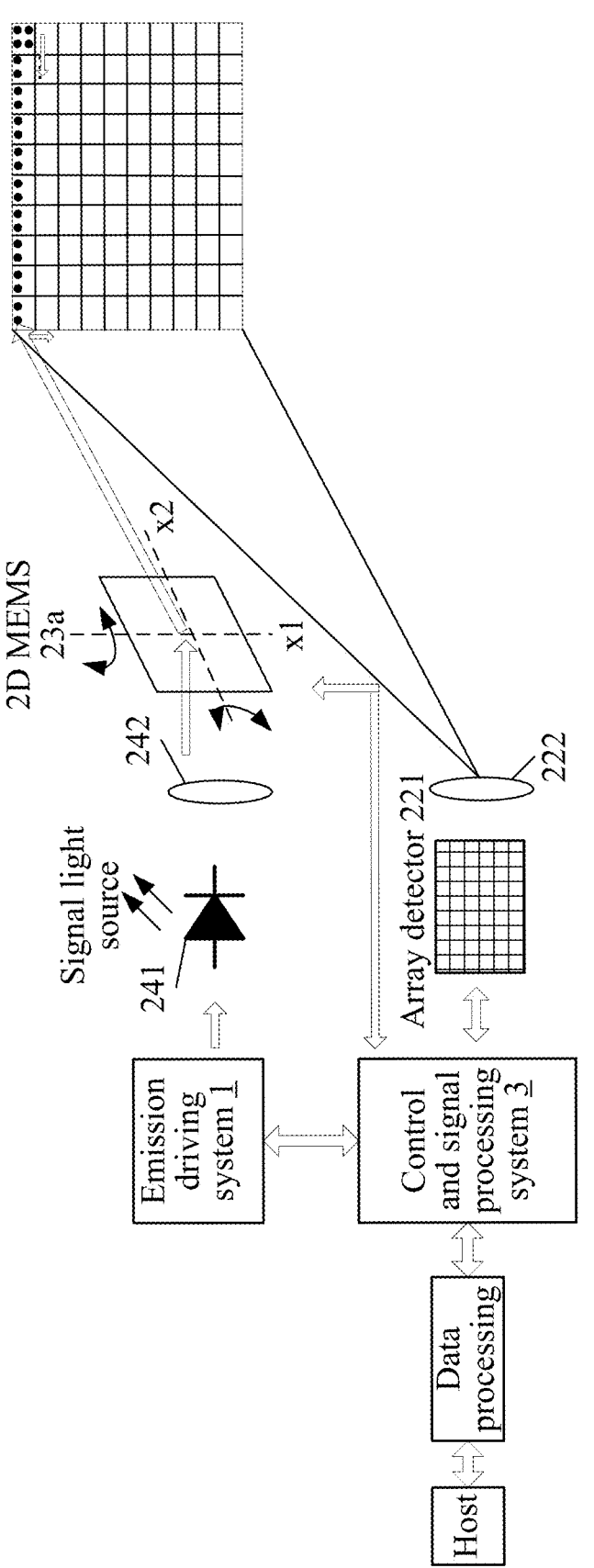
FIG. 22a is a schematic diagram of a laser transceiving system using a two-dimensional MEMS micromirror and ¼ of a point light spot according to an embodiment of the present disclosure.
Figure 22B:
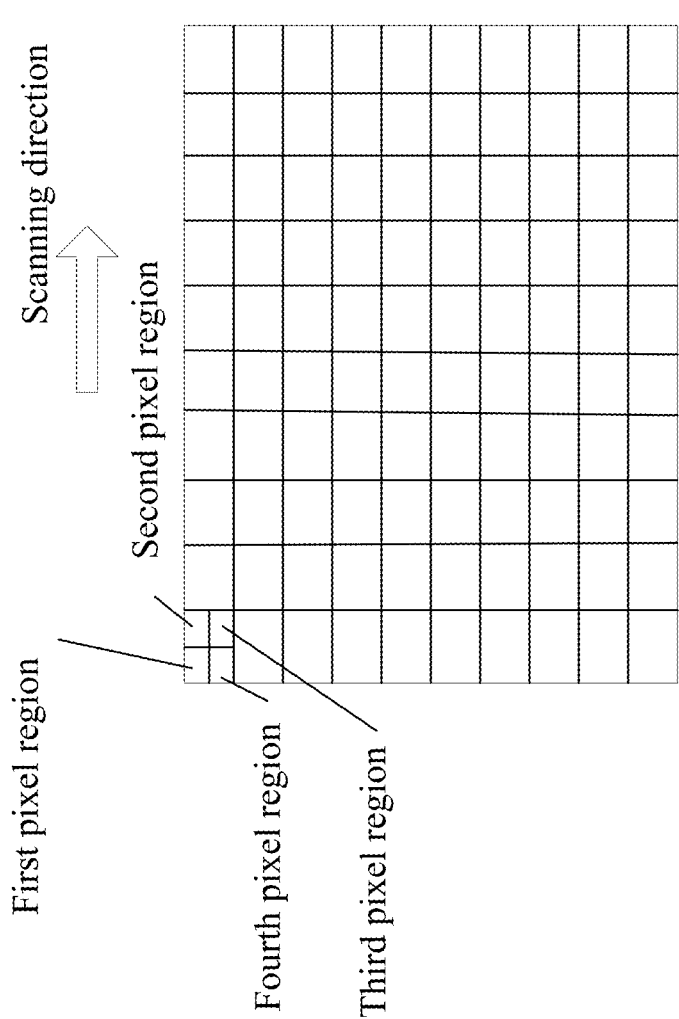
FIG. 22b is a schematic diagram illustrating that a single pixel of an array detector is divided into four pixel regions according to an embodiment of the present disclosure.

As shown in FIG. 22$a$, in another embodiment, the image formed by the echo laser on the array detector 221 is located within ¼ of the pixel of the array detector 221, and the single pixel of the array detector 221 is configured to respectively receive echo lasers in a first pixel region, a second pixel region, a third pixel region, and a fourth pixel region (referring to FIG. 22$b$) in a scanning sequence of the outgoing laser. The scanning method is similar to the scanning method in the foregoing embodiment shown in FIG. 22$a$. A difference is that, in order that each row of pixels complete scanning, scanning needs to be performed horizontally once, vertically once and horizontally once more. That is, in order that each row of pixels complete scanning, scanning needs to be performed twice in the horizontal direction. In a single pixel region, the laser emission module 241 needs to perform emission four times, and a corresponding pixel of the array detector 221 performs four coordinated operations synchronously, it can be detected whether the target object is located in the first pixel region, the second pixel region, the third pixel region or the fourth pixel region of the pixel, thereby increasing the resolution by four times.

In the embodiment in which the image formed by the echo laser on the array detector 221 is located within ½ or ¼ of the pixel of the array detector 221, because a single pixel performs detection twice or four times, in the case of using the same receiving optical module 222 and array detector 221, in the foregoing method, the angular resolution of the array detector 221 can be effectively improved and a purpose of identifying a smaller object can be achieved without increasing other costs. For example, the corresponding horizontal angle of view of the single pixel is between 0° and 0.2°, and the vertical angle of view is also between 0° and 0.2°; and after the single pixel scans twice in the horizontal direction, an angle of the deflection mechanism is added, that is, the angle of the two-dimensional MEMS micromirror $23a$, and therefore, it can be learned whether the detected object is within the angle of view of 0°~0.1° or the angle of view of 0.1°~0.2°, thereby increasing the resolution by two times. After the single pixel scans four times in total in the horizontal and vertical directions, the angle of the deflection mechanism is added, that is, the angle of the two-dimensional MEMS micromirror $23a$, and therefore, it can be learned whether the detected object is within a horizontal angle of view of 0°~0.1°, a vertical angle of view of 0°~0.1°, a horizontal angle of view of 0.1°~0.2°, a vertical angle of view of 0°~0.1°, a horizontal angle of view of 0°~0.1°, a vertical angle of view of 0.1°~0.2°, a horizontal angle of view of 0.1°~0.2°, or a vertical angle of view of 0.1°~0.2°, thereby increasing the resolution by four times. With the same resolution requirement, an array device with lower resolution is selected and a photosensitive area of a single pixel is increased, which can improve ranging performance and reduce costs. The improvement multiple of the foregoing resolution is not limited to four, and higher resolution can also be implemented. When a divergence angle of the outgoing laser is less than a corresponding multiple of original resolution of the array device, a smaller image formed by the echo laser on the array detector 221 indicates a higher improvement multiple for the single pixel.

Figure 23A:
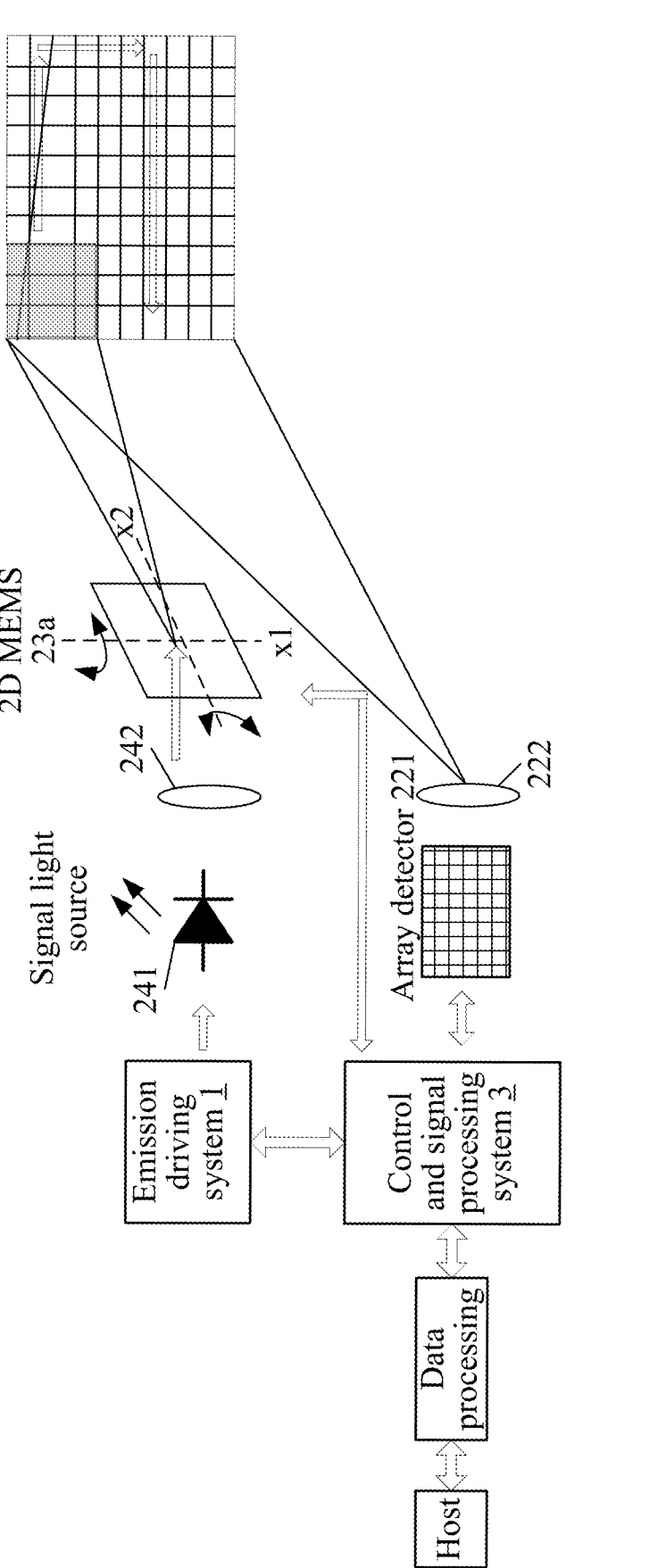
FIG. 23a is a schematic diagram illustrating that a laser transceiving system first scans in a horizontal direction by using a two-dimensional MEMS micromirror and a small-area light spot according to an embodiment of the present disclosure.

(II) Scanning Using a Two-Dimensional MEMS Micromirror and a Small-Area Light Spot As shown in FIG. 23*a*, in this embodiment, the deflection mechanism is a two-dimensional MEMS micromirror 23*a*, and the two-dimensional MEMS micromirror 23*a* includes a mirror, a first rotation shaft x1, and a second rotation shaft x2. An outgoing laser spot is a small-area light spot, that is, dimensions of an image formed by an echo laser on an array detector 221 in the horizontal direction and the vertical direction are less than dimensions of all pixels of the array detector 221 in the corresponding directions, but are greater than dimensions of a single pixel on a receiving surface of the array detector 221 in the corresponding directions. The mirror is configured to rotate around the first rotation shaft x1, so that the outgoing laser scans the detection region of the array detector 221 in the horizontal direction. The mirror is further configured to rotate around the second rotation shaft x2, so that the outgoing laser scans the detection region of the array detector 221 in the vertical direction. The mirror is also configured to receive the echo laser and reflect the echo laser to the receiving assembly 22.

An exemplary scanning process is as follows. The mirror rotates around the first rotation shaft x1 in the first direction, so that the outgoing laser scans the detection region of the array detector 221 from rightward in the horizontal direction. After the outgoing laser completes the first scan in the horizontal direction, the mirror rotates around the second shaft x2 in the second direction, so that the outgoing laser moves downward in the vertical direction to a position for second scan in the horizontal direction, to complete the first scan in the vertical direction. The mirror rotates around the first rotation shaft x1 in the third direction, so that the outgoing laser scans the detection region of the array detector 221 leftward in the horizontal direction, and the third direction is the opposite direction of the first direction. After the outgoing laser completes the second scan in the horizontal direction, the mirror rotates around the second shaft x2 in the second direction, so that the outgoing laser moves downward in the vertical direction to a position for third scan in the horizontal direction, and so on. Reciprocating scanning is performed until the detection region of the entire array detector 221 is traversed.

Figure 23B:
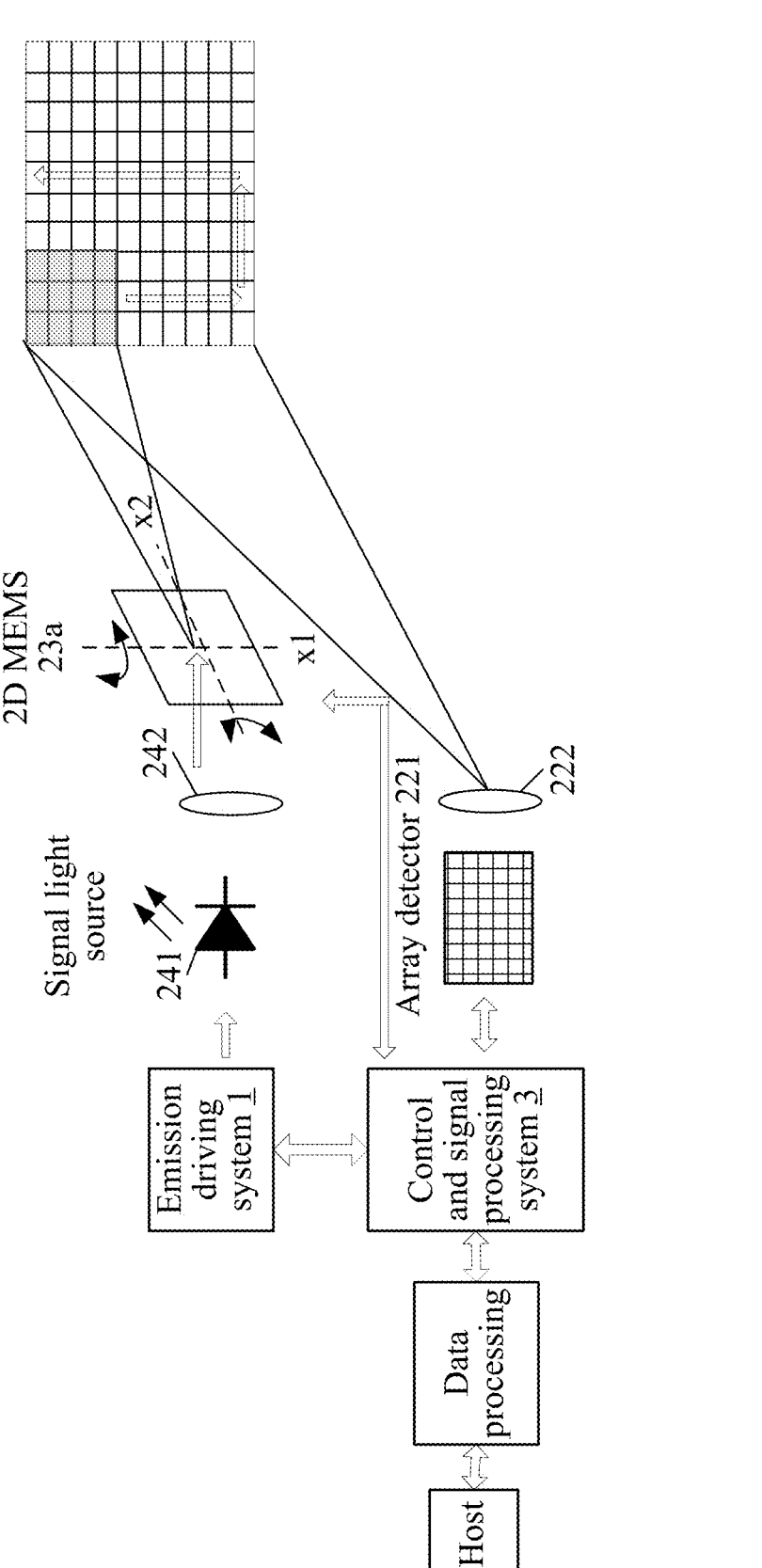
FIG. 23b is a schematic diagram illustrating that a laser transceiving system first scans in a vertical direction by using a two-dimensional MEMS micromirror and a small-area light spot according to an embodiment of the present disclosure.

It can be understood that, as shown in FIG. 23*b*, during scanning, scanning can also be performed first in the vertical direction, and then scanning is performed in the horizontal direction, so that the second scan is performed in the vertical direction after the light spot reaches a position for the second scanning in the vertical direction.

Figure 24A:
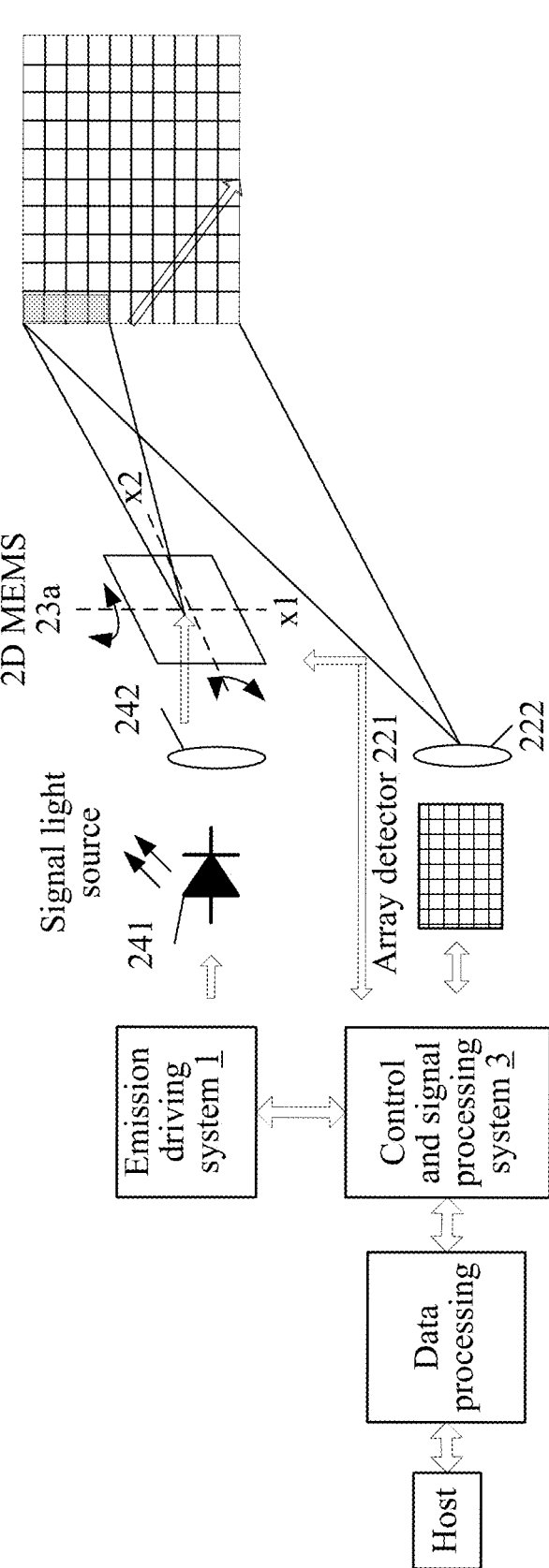
FIG. 24a is a schematic diagram illustrating that a laser transceiving system first scans in a horizontal direction by using a two-dimensional MEMS micromirror and a short linear light spot according to an embodiment of the present disclosure.

(III) Scanning Using a Two-Dimensional MEMS Micromirror and a Short Linear Light Spot As shown in FIG. 24*a*, in this embodiment, the deflection mechanism is a two-dimensional MEMS micromirror 23*a*, and the two-dimensional MEMS micromirror 23*a* includes a mirror, a first rotation shaft x1, and a second rotation shaft x2. An outgoing laser spot is a vertical short linear light spot, that is, a dimension of an image formed by an echo laser on an array detector 221 in the horizontal direction is less than or equal to a dimension of a single pixel on a receiving surface of the array detector 221 in the corresponding direction (which are equal in the figure). A dimension of an image formed by an echo laser on an array detector 221 in the vertical direction is greater than a dimension of a single pixel on a receiving surface of the array detector 221 in the corresponding direction, but a dimension of the image formed by the echo laser on the array detector 221 in the vertical direction is less than a dimension of all pixels of the array detector 221 in the vertical direction. The mirror is configured to rotate around the first rotation shaft x1, so that the outgoing laser scans the detection region of the array detector 221 in the horizontal direction. The mirror is further configured to rotate around the second rotation shaft x2, so that the outgoing laser scans the detection region of the array detector 221 in the vertical direction. The mirror is also configured to receive the echo laser and reflect the echo laser to the receiving assembly 22.

An exemplary scanning process is as follows. The mirror rotates around the first rotation shaft x1 in the first direction, so that the outgoing laser scans the detection region of the array detector 221 from rightward in the horizontal direction. After the outgoing laser completes the first scan in the horizontal direction, the mirror rotates around the second shaft x2 in the second direction, so that the outgoing laser moves downward in the vertical direction to a position for second scan in the horizontal direction, to complete the first scan in the vertical direction. The mirror rotates around the first rotation shaft x1 in the third direction, so that the outgoing laser scans the detection region of the array detector 221 leftward in the horizontal direction, and the third direction is the opposite direction of the first direction. After the outgoing laser completes the second scan in the horizontal direction, the mirror rotates around the second shaft x2 in the second direction, so that the outgoing laser moves downward in the vertical direction to a position for third scan in the horizontal direction to scan the detection region of the array detector 221, to complete the second scan in the vertical direction. The mirror rotates around the first shaft x1 in the first direction, and so on. Reciprocating scanning is performed until the detection region of the entire array detector 221 is traversed.

Figure 24B:
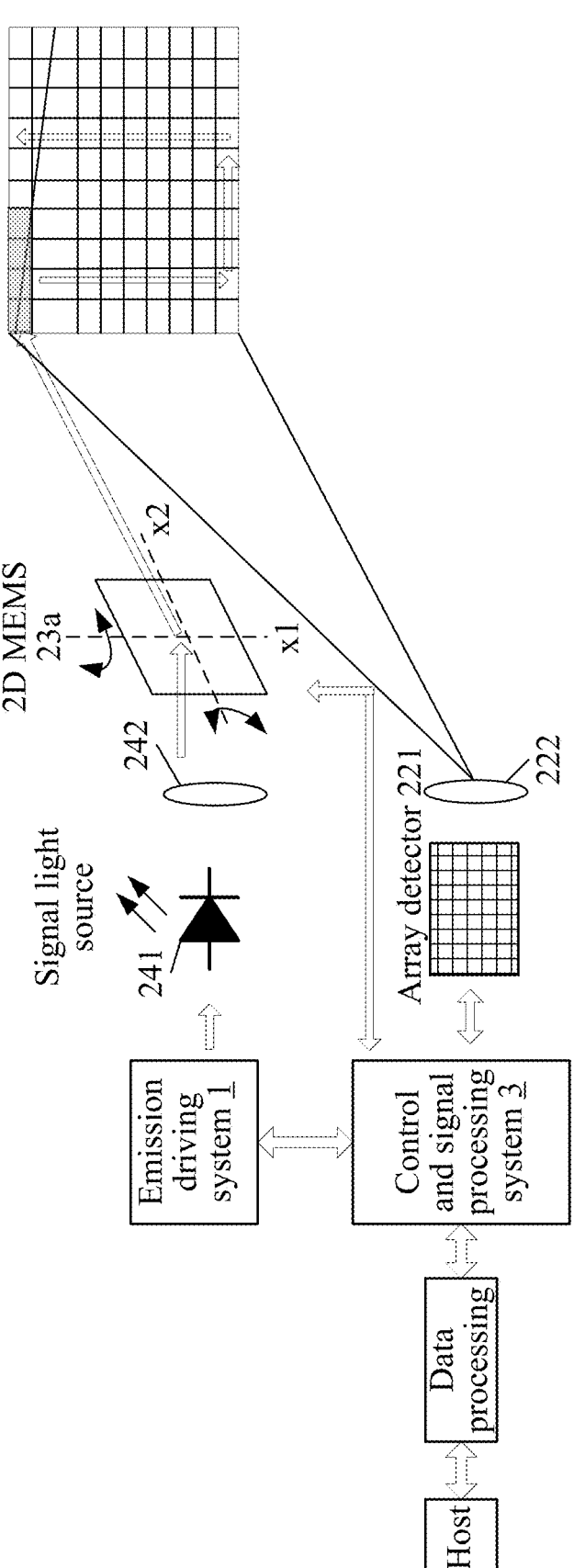
FIG. 24b is a schematic diagram illustrating that a laser transceiving system first scans in a vertical direction by using a two-dimensional MEMS micromirror and a short linear light spot according to an embodiment of the present disclosure.

In another embodiment, as shown in FIG. 24*b*, the light spot may further be a horizontal short linear light spot, that is, a dimension of an image formed by an echo laser on an array detector 221 in the vertical direction is less than or equal to a dimension of a single pixel on a receiving surface of the array detector 221 in the corresponding direction. A dimension of an image formed by an echo laser on an array detector 221 in the horizontal direction is greater than a dimension of a single pixel on a receiving surface of the array detector 221 in the corresponding direction, but a dimension of the image formed by the echo laser on the array detector 221 in the horizontal direction is less than a dimension of all pixels of the array detector 221 in the horizontal direction. During scanning, the horizontal linear light spot can also first perform first scan in the vertical direction, and then perform the scan in the horizontal direction, so that the second scan is performed in the vertical direction after the light spot reaches a position for the second scan in the vertical direction.

A difference from Embodiment (II) is that, in this embodiment, the linear light spot is used, and a region detected in the single scan is narrower than that in Embodiment (II), which can reduce emission energy, thereby reducing power of the laser emission module 241. Required total detection time is longer than that in Embodiment (II). If a proper length is set for the linear light spot in the horizontal direction or the vertical direction, the total detection time can be kept within an acceptable range.

Figure 24C:
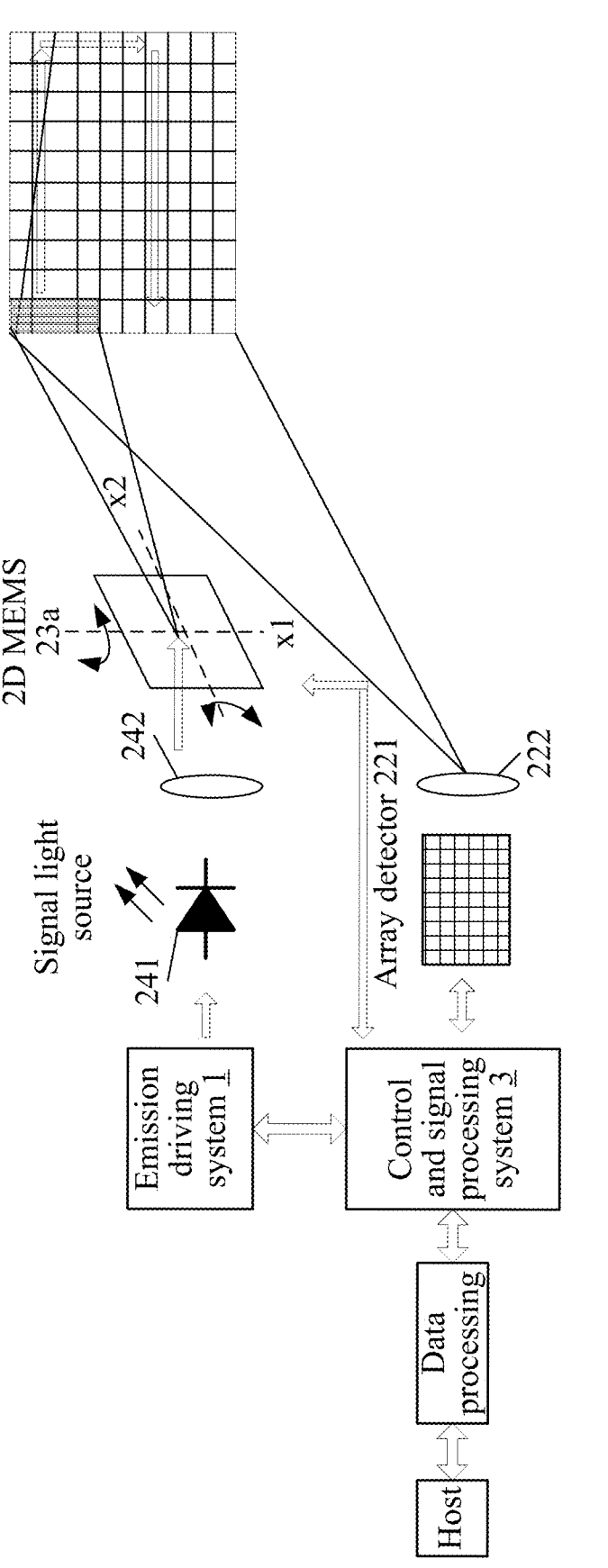
FIG. 24c is a schematic diagram illustrating that a laser transceiving system first scans in a horizontal direction by using a two-dimensional MEMS micromirror and ¼ of a short linear light spot according to another embodiment of the present disclosure.

As shown in FIG. 24*c*, in another embodiment, a difference from FIG. 24*a* is that, a dimension of an image formed by an echo laser on an array detector 221 in the horizontal direction is less than a dimension of a single pixel on a receiving surface of the array detector 221 in the corresponding direction. For example, the size of the image formed by the echo laser on the array detector 221 in the horizontal direction is only ¼ of the dimension of the single pixel on the receiving surface of the array detector 221 in the corresponding direction. It can be learned from description of FIG. 22_a_ that, because the single pixel performs detection four times, in the case of using the same receiving optical module 222 and array detector 221, compared with the embodiment in FIG. 24_a_, the current embodiment can effectively improve the angular resolution of the array detector 221, and finally improve the resolution by four times, thereby achieving the purpose of identifying a smaller object without increasing additional costs.

Figure 25A:
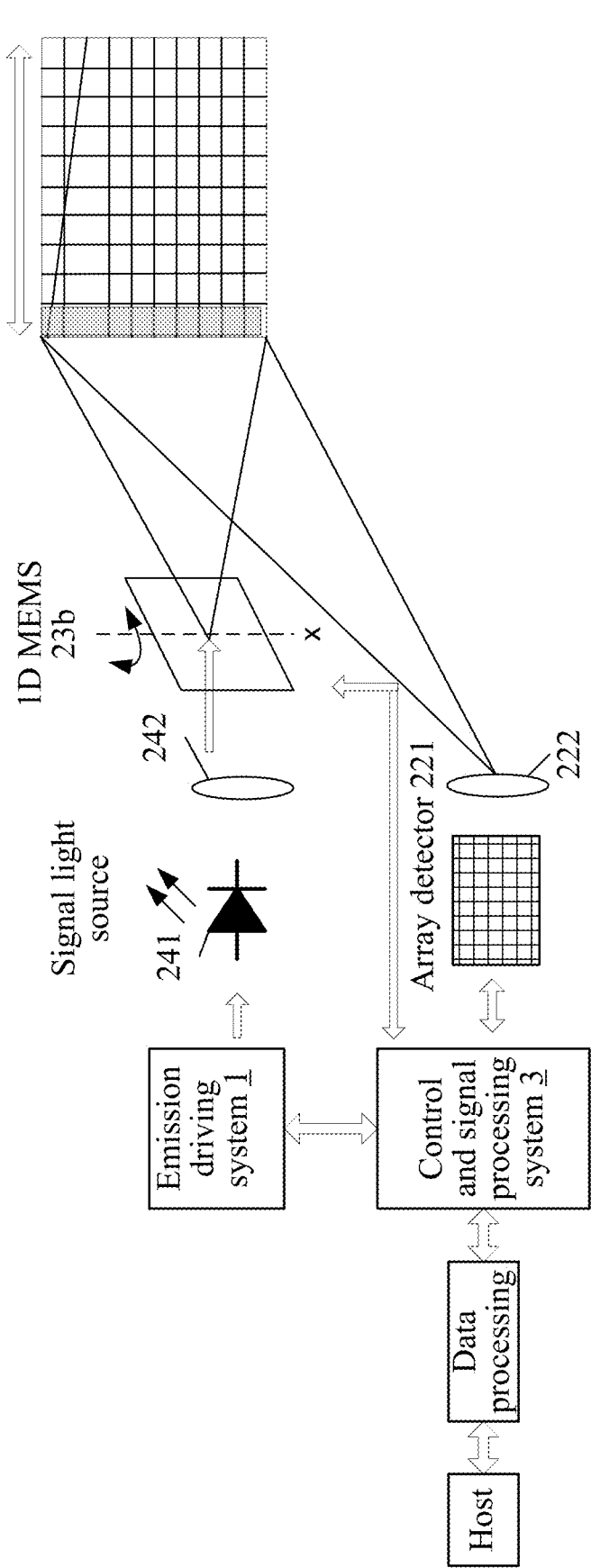
FIG. 25a is a schematic diagram illustrating that a laser transceiving system first scans in a horizontal direction by using a one-dimensional MEMS micromirror and a long linear light spot according to an embodiment of the present disclosure.
Figure 25B:
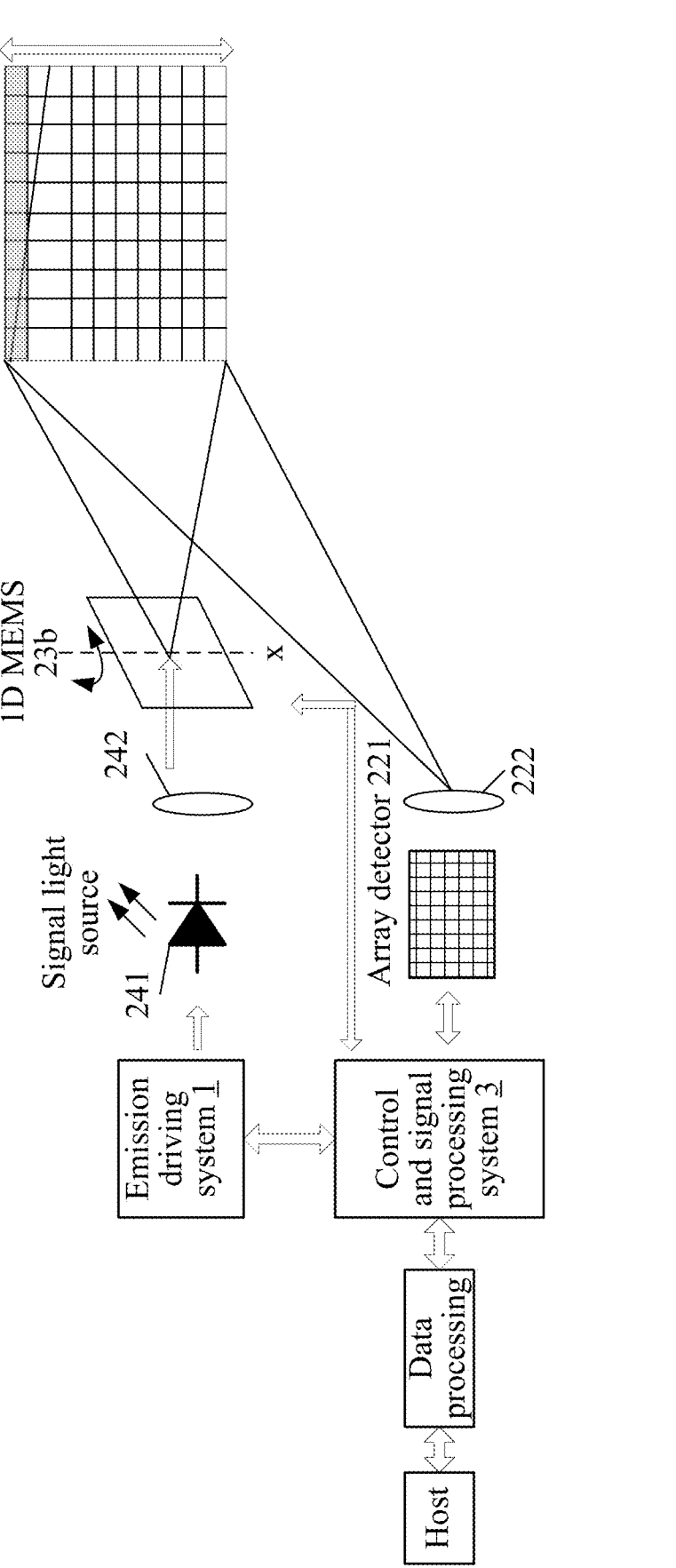
FIG. 25b is a schematic diagram illustrating that a laser transceiving system first scans in a vertical direction by using a one-dimensional MEMS micromirror and a long linear light spot according to an embodiment of the present disclosure.
Figure 25C:
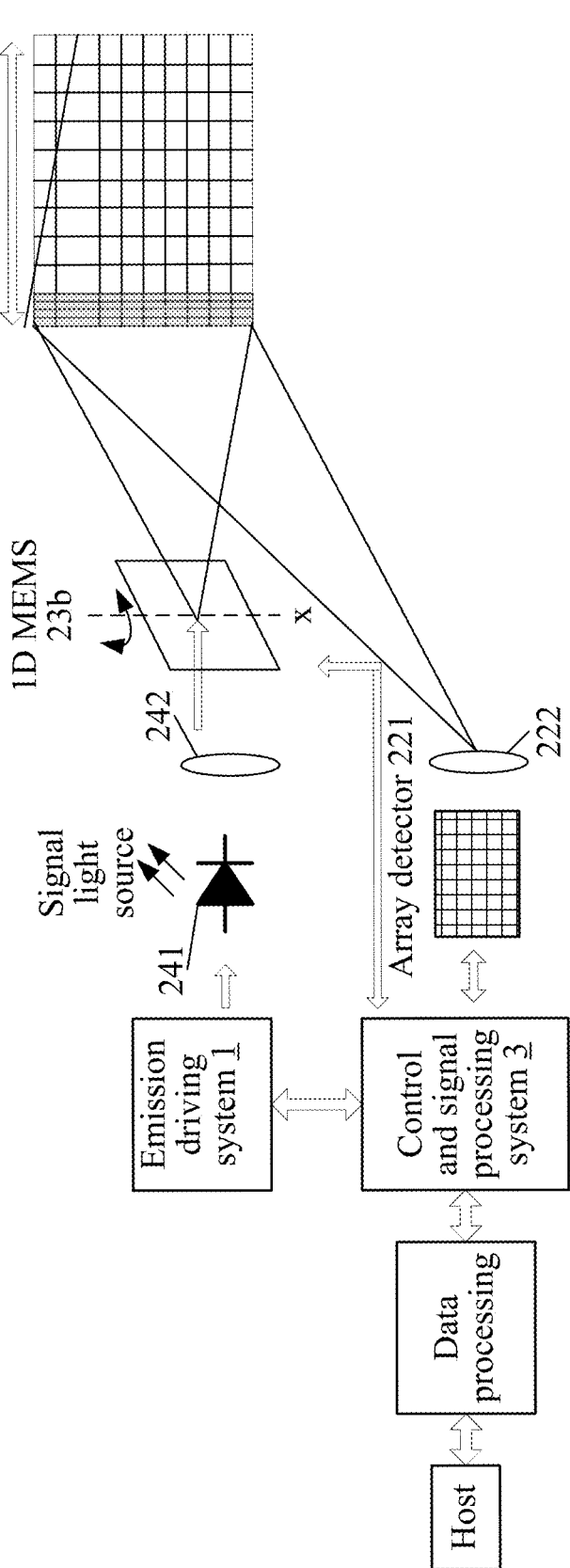
FIG. 25c is a schematic diagram illustrating that a laser transceiving system first scans in a horizontal direction by using a one-dimensional MEMS micromirror and ¼ of a long linear light spot according to another embodiment of the present disclosure.

(IV) Scanning Using a One-Dimensional MEMS Micromirror and a Long Linear Light Spot As shown in FIG. 25_a_, the deflection mechanism is a one-dimensional MEMS micromirror 23_b_, and the one-dimensional MEMS micromirror 23_b_ includes a mirror and a rotation shaft x. The outgoing laser spot is a vertical long linear spot. That is, a dimension of an image formed by the echo laser on the array detector 221 in the horizontal direction is less than or equal to a dimension of a single pixel of a receiving surface of the array detector 221 in the corresponding direction; and the dimension of the image formed by the echo laser on the array detector 221 in the vertical direction is greater than or equal to a dimension of all the pixels of the array detector 221 in the vertical direction. The mirror is configured to rotate around the rotation shaft x, so that the outgoing laser scans the detection region of the array detector 221 in the horizontal direction. The mirror is also configured to receive the echo laser and reflect the echo laser to the receiving assembly 22.

An exemplary scanning process is as follows. The mirror rotates around the rotation shaft x in the first direction, so that the outgoing laser scans the detection region of the array detector 221 rightward in the horizontal direction until the detection region of the entire array detector 221 is traversed. Because the outgoing laser spot is the long linear light spot, the dimension of the image formed by the echo laser on the array detector 221 in the vertical direction covers the receiving surface of the entire array detector 221, and the detection region of the entire array detector 221 can be traversed through one scan in the horizontal direction.

In another embodiment, as shown in FIG. 25_b_, the light spot may also be a horizontal long linear spot. That is, a dimension of an image formed by the echo laser on the array detector 221 in the vertical direction is less than or equal to a dimension of a single pixel of a receiving surface of the array detector 221 in the corresponding direction; and the dimension of the image formed by the echo laser on the array detector 221 in the horizontal direction is greater than or equal to a dimension of all the pixels of the array detector 221 in the horizontal direction. The horizontal linear light spot scans in the vertical direction during scanning.

As shown in FIG. 25_c_, in another embodiment, a difference from FIG. 25_a_ is that, a dimension of an image formed by an echo laser on an array detector 221 in the horizontal direction is less than a dimension of a single pixel on a receiving surface of the array detector 221 in the corresponding direction. For example, the size of the image formed by the echo laser on the array detector 221 in the horizontal direction is only ¼ of the dimension of the single pixel on the receiving surface of the array detector 221 in the corresponding direction. It can be learned from description of FIG. 22_a_ that, because the single pixel performs detection four times, in the case of using the same receiving optical module 222 and array detector 221, compared with the embodiment in FIG. 25_a_, the current embodiment can effectively improve the angular resolution of the array detector 221, and finally improve the resolution by four times, thereby achieving the purpose of identifying a smaller object without increasing additional costs.

Figure 26A:
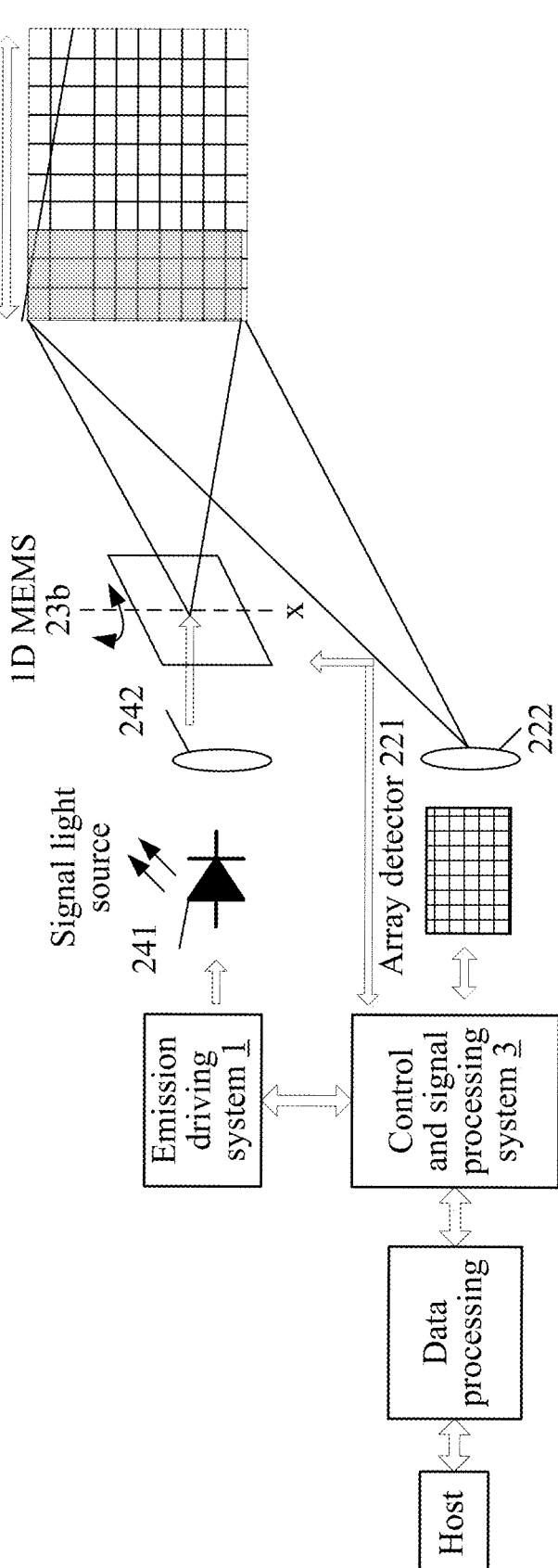
FIG. 26a is a schematic diagram illustrating that a laser transceiving system first scans in a horizontal direction by using a one-dimensional MEMS micromirror and a large-area light spot according to an embodiment of the present disclosure.
Figure 26B:
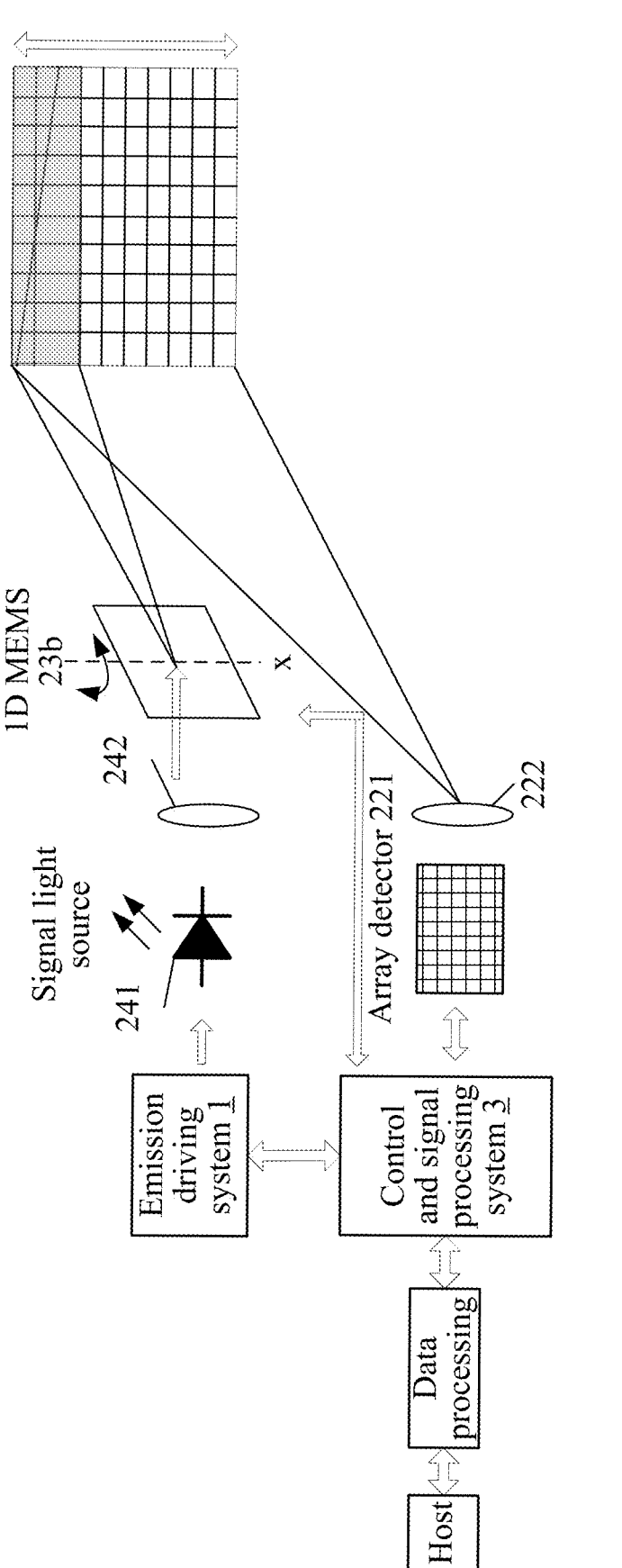
FIG. 26b is a schematic diagram illustrating that a laser transceiving system first scans in a vertical direction by using a one-dimensional MEMS micromirror and a large-area light spot according to an embodiment of the present disclosure.

(V) Scanning Using a One-Dimensional MEMS Micromirror and a Large-Area Light Spot As shown in FIG. 26_a_, the deflection mechanism is a one-dimensional MEMS micromirror 23_b_, and the one-dimensional MEMS micromirror 23_b_ includes a mirror and a rotation shaft x. The outgoing laser spot is a vertical large-area light spot. That is, a dimension of an image formed by the echo laser on the array detector 221 in the horizontal direction is less than a dimension of all the pixels of the array detector 221 in the horizontal direction, but is greater than a dimension of a single pixel of a receiving surface of the array detector 221 in the corresponding direction. The dimension of the image formed by the echo laser on the array detector 221 in the vertical direction is greater than or equal to a dimension of all the pixels of the array detector 221 in the vertical direction. The mirror is configured to rotate around the rotation shaft x, so that the outgoing laser scans the detection region of the array detector 221 in the horizontal direction. The mirror is also configured to receive the echo laser and reflect the echo laser to the Receiving assembly 22.

An exemplary scanning process is as follows. The mirror rotates around the rotation shaft x in the first direction, so that the outgoing laser scans the detection region of the array detector 221 rightward in the horizontal direction until the detection region of the entire array detector 221 is traversed. Because the outgoing laser spot is the large-area light spot, the dimension of the image formed by the echo laser on the array detector 221 in the vertical direction covers the receiving surface of the entire array detector 221, and the detection region of the entire array detector 221 can be traversed through one scan in the horizontal direction.

A difference from Embodiment (IV) is that, in this embodiment, the large-area light spot is used, a region detected in the single scan is wider than that in Embodiment (IV), and therefore, the emission energy is greater, thereby improving power of the laser emission module 241.

In another embodiment, as shown in FIG. 26_b_, the light spot may also be a horizontal large-area light spot. That is, a dimension of an image formed by the echo laser on the array detector 221 in the vertical direction is less than a dimension of all the pixels of the array detector 221 in the vertical direction, but is greater than a dimension of a single pixel of a receiving surface of the array detector 221 in the corresponding direction. The dimension of the image formed by the echo laser on the array detector 221 in the horizontal direction is greater than or equal to a dimension of all the pixels of the array detector 221 in the horizontal direction. The horizontal linear light spot scans in the vertical direction during scanning.

Figure 27A:
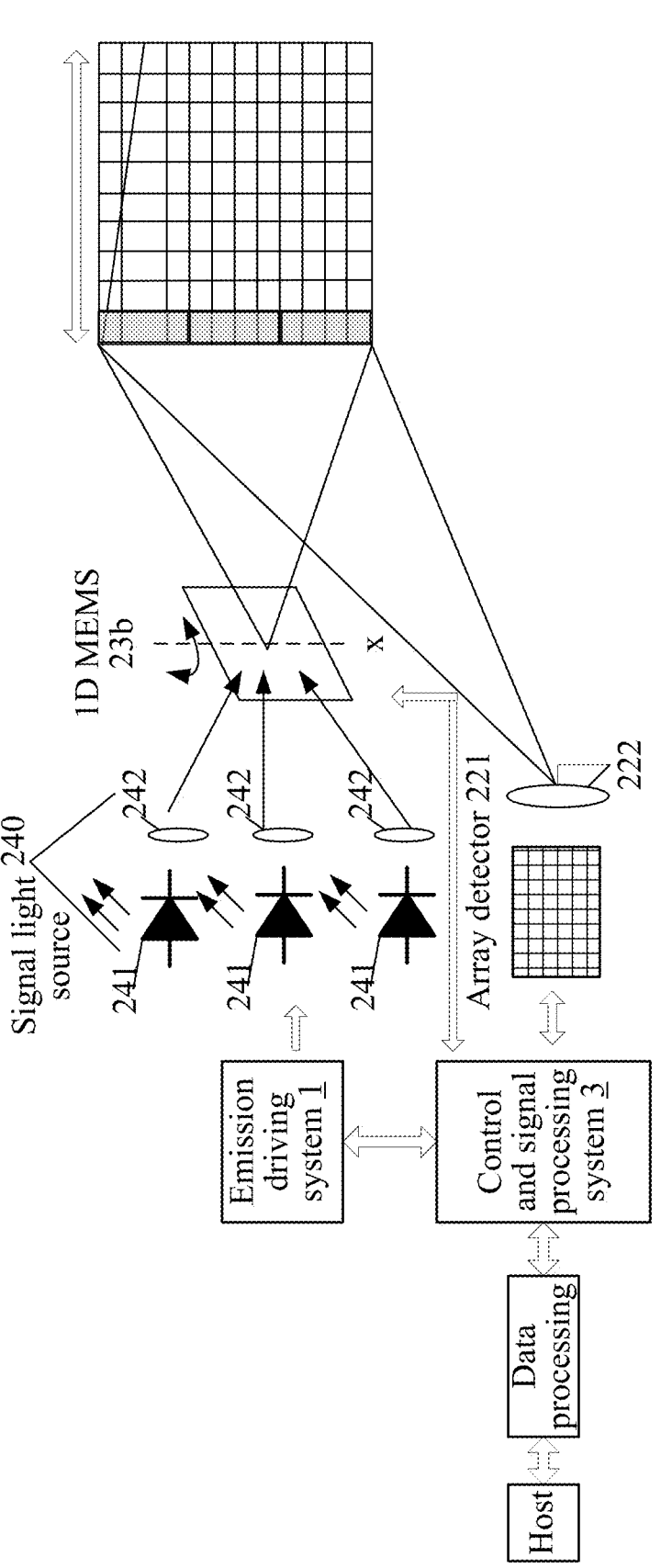
FIG. 27a is a schematic diagram illustrating that a laser transceiving system uses a one-dimensional MEMS micromirror and a linear light spot to first scan in a horizontal direction by spicing a plurality of emissions according to an embodiment of the present disclosure.

(VI) Scanning by Using a One-Dimensional MEMS Micromirror and a Linear Light Spot and by Spicing a Plurality of Emissions As shown in FIG. 27_a_, the deflection mechanism is a one-dimensional MEMS micromirror 23_b_, and the one-dimensional MEMS micromirror 23_b_ includes a mirror and a rotation shaft x. The emission module includes three second emission assemblies 240. Each second emission assembly 240 includes a laser emission module 241 and a second optical shaping module 242. The laser emission module 241 is configured to emit the first outgoing laser. The second optical shaping module 242 is configured to collimate the first outgoing laser and emit the collimated first outgoing laser to the one-dimensional MEMS micromirror 23b. The outgoing laser consists of all the first outgoing lasers, and the first outgoing lasers are arranged in the vertical direction. A light spot size of the collimated first outgoing laser is less than a receiving surface of the array detector 221, and light spots of all the first outgoing lasers are spliced into the long linear light spot. That is, dimensions of an image formed by the first echo laser on the array detector 221 in the horizontal direction and the vertical direction are both less than dimensions of all the pixels of the array detector 221 in the corresponding directions. The dimension of the image formed by the echo laser on the array detector 221 in the vertical direction is greater than or equal to a dimension of all the pixels of the array detector 221 in the vertical direction. The mirror is configured to rotate around the rotation shaft, so that the outgoing laser scans the detection region of the array detector 221 in the horizontal direction. The mirror is further configured to receive the first echo laser and reflect the first echo laser to the receiving assembly 22. The first echo laser is laser returned after the first outgoing laser is reflected by an object in the detection region. The echo laser consists of all the first echo lasers.

An exemplary scanning process is as follows. The mirror rotates around the rotation shaft x in the first direction, so that the outgoing laser scans the detection region of the array detector 221 rightward in the horizontal direction until the detection region of the entire array detector 221 is traversed. Because the outgoing laser spot is the long linear light spot, the dimension of the image formed by the echo laser on the array detector 221 in the vertical direction covers the receiving surface of the entire array detector 221, and the detection region of the entire array detector 221 can be traversed through one scan in the horizontal direction.

To reduce mutual crosstalk between the three second emission assemblies 240 when simultaneously emitting outgoing lasers, a polling manner may be used for the three second emission assemblies 240 during emission. For example, one second emission assembly 240 first emits the outgoing laser, followed by the other second emission assemblies 240 sequentially, and the second emission assembly 240 that performs emission first emits the outgoing laser again, and so on, until the detection region of the entire array detector 221 is traversed.

Figure 27B:
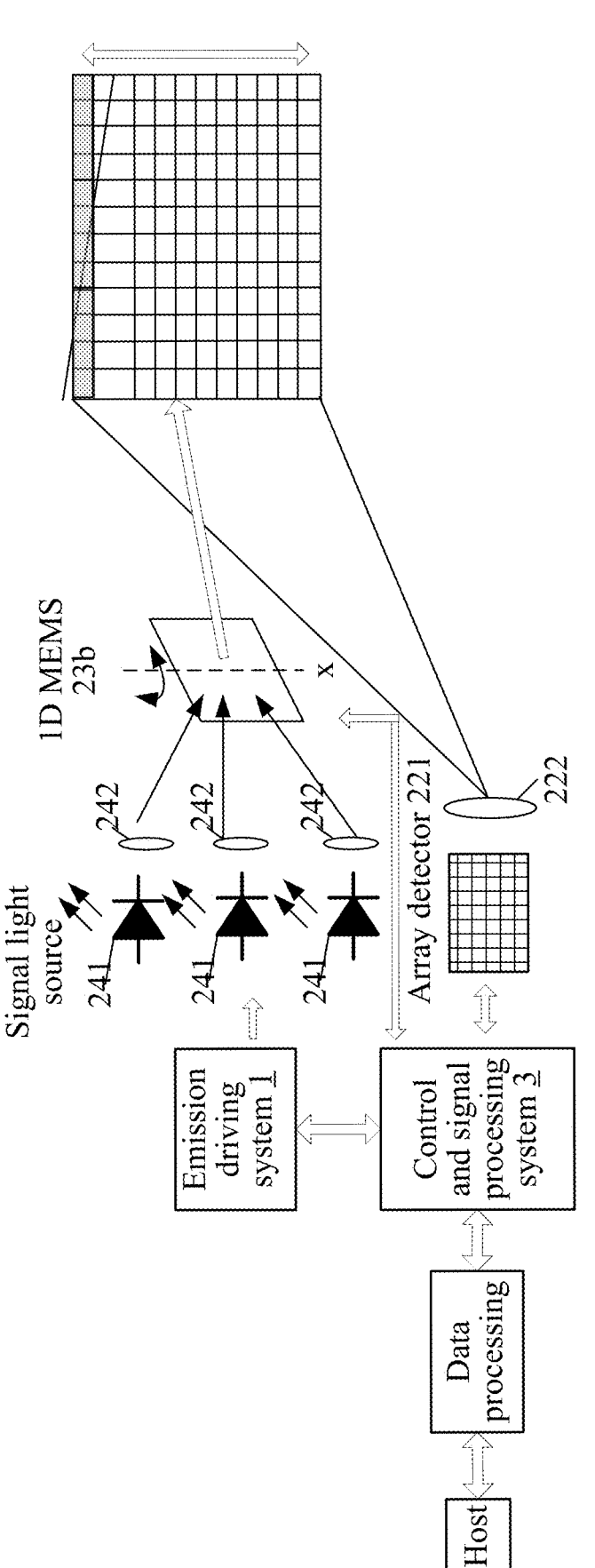
FIG. 27b is a schematic diagram illustrating that a laser transceiving system uses a one-dimensional MEMS micromirror and a linear light spot to first scan in a vertical direction by spicing a plurality of emissions according to an embodiment of the present disclosure.

In another embodiment, as shown in FIG. 27b, the spliced light spot may also be a horizontal long linear light spot. That is, a dimension of an image formed by the spliced echo laser on the array detector 221 in the vertical direction is less than or equal to a dimension of a single pixel of a receiving surface of the array detector 221 in the corresponding direction. The dimension of the image formed by the spliced echo laser on the array detector 221 in the horizontal direction is greater than or equal to a dimension of all the pixels of the array detector 221 in the horizontal direction. The horizontal linear light spot scans in the vertical direction during scanning.

In another embodiment, the emission module may further include two, four, five, six, or more second emission assemblies 240, and the dimension of the image formed by the echo laser on the array detector 221 in the vertical direction or the horizontal direction is greater than or equal to a dimension of all the pixels of the array detector 221 in the corresponding direction.

In another embodiment, light spots of all the first outgoing lasers may be further spliced into a large-area light spot. That is, a dimension of an image formed by the echo laser on the array detector 221 in the horizontal direction is greater than a dimension of a single pixel of a receiving surface of the array detector 221 in the corresponding direction, but is less than a dimension of all the pixels of the array detector 221 in the horizontal direction. A sum of dimensions of the images formed by the echo lasers on the array detector 221 in the vertical direction is greater than or equal to a dimension of all the pixels of the array detector 221 in the vertical direction.

In the foregoing embodiments, the outgoing laser is shaped by second optical shaping module 242 to form the point light spot, the linear light spot or the block light spot. When the light spot of the outgoing laser needs to be the linear light spot, the following methods can also be used.

Figure 28A:
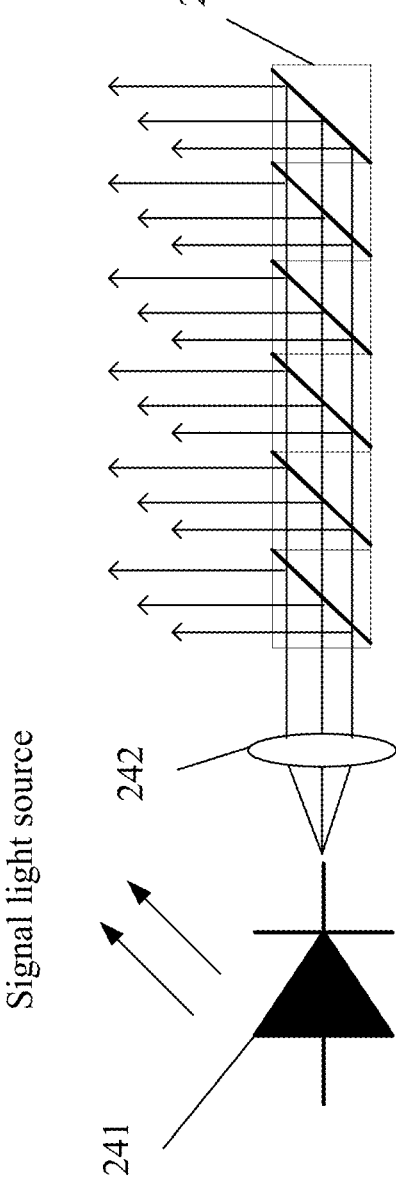
FIG. 28a is a schematic diagram of a local optical path of a LiDAR using an optical deflection module according to an embodiment of the present disclosure.

Based on FIG. 24a, referring to FIG. 28a, in some embodiments, the emission assembly 21 includes a laser emission module 241, a second optical shaping module 242, and an optical deflection module 244, and the optical deflection module 244 includes a plurality of deflection units arranged in the first direction. The laser emission module 241 is configured to emit the outgoing laser to the second optical shaping module 242 in the first direction, the second optical shaping module 242 collimates the outgoing laser and then emit the outgoing laser to the optical deflection module 244, and each deflection unit in the optical deflection module 244 is configured to deflect and then emit a preset proportion of outgoing laser. The LiDAR 100 further includes a deflection mechanism 23, and the deflection mechanism 23 is configured to receive the outgoing laser and reflect the outgoing laser toward the detection region of the array detector 221, so that the outgoing laser scans to traverse the entire detection region. The deflection mechanism 23 may use a device that can implement optical scanning, such as a MEMS micromirror, a reflector, or a transmission prism. In this embodiment, the linear light spot incident on the detection region covers the entire detection region in the second direction, and therefore, a one-dimensional MEMS micromirror 23b can be used as the deflection mechanism 23, to complete scanning in one direction through the one-dimensional MEMS micromirror 23b. If the linear light spot only covers part of the detection region in the second direction, the two-dimensional MEMS micromirror is required to complete scanning in both directions.

The plane mirror is used as the deflection unit, and each plane mirror is configured to deflect and then emit a preset proportion of outgoing laser. Preset proportions of the outgoing laser reflected by plane mirrors may be the same or different.

Specifically, each plane mirror has the same or different transmittance or reflectivity, so that the outgoing laser is reflected from each plane mirror in a preset fixed proportion. The prepared plane mirror has fixed transmittance or reflectivity. In some embodiments, the transmittance or reflectivity of each plane mirror is calculated in advance according to an actual need, and the corresponding plane mirror is selected or prepared according to the determined transmittance or reflectivity, so that energy of the outgoing lasers reflected by each plane mirror is the same or approximately same. For example, there are 5 plane mirrors in total. The first plane mirror has transmittance of 80% and reflectivity of 20%, and therefore, energy of the outgoing laser reflected by the first plane mirror is 20% of the total energy of the outgoing laser. The second plane mirror has transmittance of 75% and reflectivity of 25%, and therefore, a ratio of the energy of the outgoing laser reflected by the second plane mirror to the total energy of the outgoing laser is 80%*25%=20%. The third plane mirror has transmittance of 67% and reflectivity of 33%, and therefore, a ratio of the energy of the outgoing laser reflected by the third plane mirror to the total energy of the outgoing laser is 80%*75%*33%=19.8%, which is approximately 20%. The fourth plane mirror has transmittance of 50% and reflectivity of 50%, and therefore, a ratio of the energy of the outgoing laser reflected by the fourth plane mirror to the total energy of the outgoing laser is 80%*75%*67%*50%=20.1%, which is approximately 20%. The fifth plane mirror has transmittance of approximately 0% and reflectivity of approximately 100%, and therefore, a ratio of energy of the outgoing laser reflected by the fifth plane mirror to the total energy of the outgoing laser is 80%*75%*67%*50%*100%=20.1%, which is approximately 20%. If the foregoing plane mirrors are selected, the energy of the outgoing laser reflected by each plane mirror is about 20% of the total energy of the outgoing laser.

In another embodiment, to satisfy a detection requirement for high resolution of a region of interest, energy of an outgoing laser reflected by a plane mirror, which is configured to deflect the outgoing laser to a region of interest in the detection region, is greater than energy of an outgoing laser reflected by another plane mirror. For example, there are 5 plane mirrors in total, a central region is a region of interest, energy of outgoing lasers reflected by three plane mirrors, which are configured to deflect the outgoing lasers to the central detection region needs to be greater than energy of an outgoing laser reflected by the other two plane mirrors. The first plane mirror has transmittance of 90% and reflectivity of 10%, and therefore, energy of the outgoing laser reflected by the first plane mirror is 10% of the total energy of the outgoing laser. The second plane mirror has transmittance of 71% and reflectivity of 29%, and therefore, a ratio of energy of the outgoing laser reflected by the second plane mirror to the total energy of the outgoing laser is 90%*29%=26.1%. The third plane mirror has transmittance of 58% and reflectivity of 42%, and therefore, a ratio of energy of the outgoing laser reflected by the third plane mirror to the total energy of the outgoing laser is 90%*71%*42%=26.8%. The fourth plane mirror has transmittance of 28% and reflectivity of 72%, and therefore, a ratio of energy of the outgoing laser reflected by the fourth plane mirror to the total energy of the outgoing laser is 90%*71%*58%*72%=26.7%. The fifth plane mirror has approximately transmittance of 0% and reflectivity of 100%, and therefore, a ratio of energy of the outgoing laser reflected by the fifth plane mirror to the total energy of the outgoing laser is 90%*71%*58%*28%*100%=10.4%. The foregoing plane mirrors are selected so that the energy of outgoing lasers reflected by the three plane mirrors, which are configured to deflect the outgoing lasers to the central detection region, needs to be greater than energy of outgoing lasers reflected by the other two plane mirrors. The transmittance or reflectivity of the plane mirrors can be changed based on an actual situation. After the transmittance or reflectivity of each plane mirror is determined, the corresponding plane mirror is selected or prepared to meet the actual detection need.

Figure 28B:
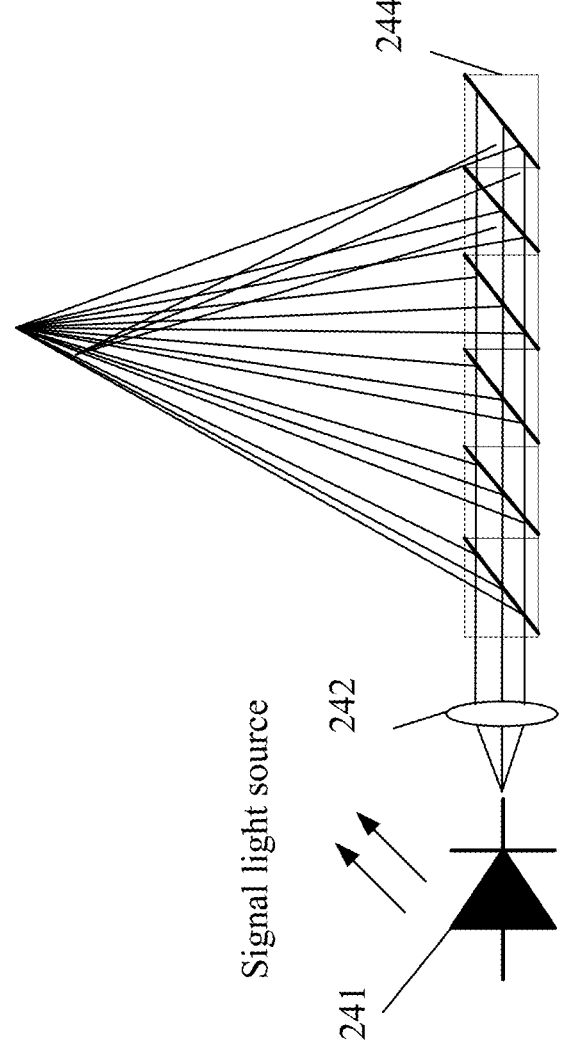
FIG. 28b is a schematic diagram of a local optical path of a LiDAR using an optical deflection module according to another embodiment of the present disclosure.

Regarding angles of the plane mirrors, all the plane mirrors can be at 45 degrees, so that the outgoing lasers are evenly distributed in stripes. However, in this case, a deflection mechanism 23 with a larger area needs to be provided to receive the outgoing lasers reflected by all the plane mirrors. Therefore, the angle of the plane mirror can be changed to change the deflection direction, so that the outgoing laser passing through the plane mirror can arrive and be focused, thereby reducing the size of the deflection mechanism 23. For example, as shown in FIG. 28b, included angles between outgoing lasers emitted by a plurality of plane mirrors and the laser emission module 241 are successively decreased in the first direction, so that an outgoing laser passing through each plane mirror is focused toward the center.

Figure 29A:
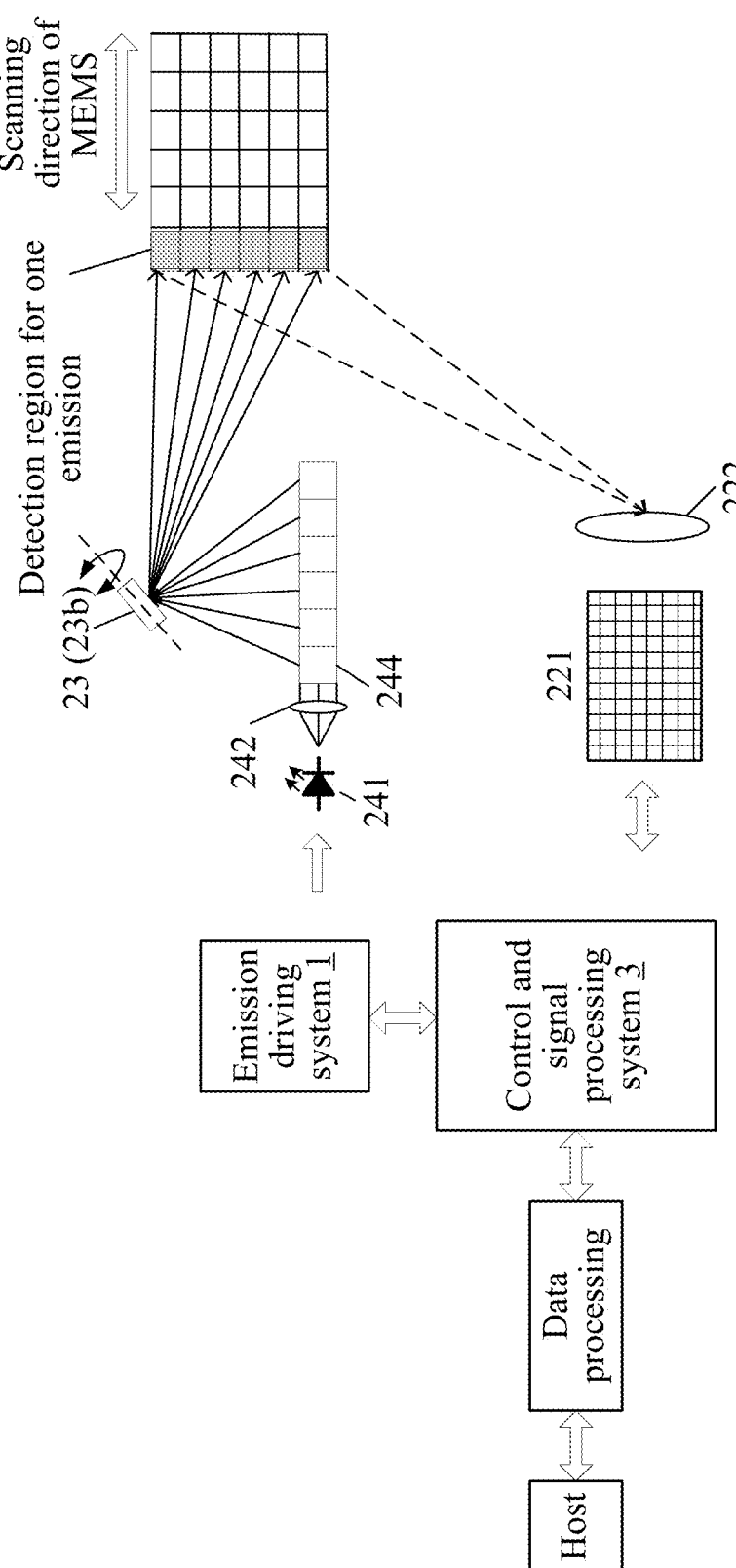
FIG. 29a is a schematic diagram of an optical path of a LiDAR according to another embodiment of the present disclosure.
Figure 29B:
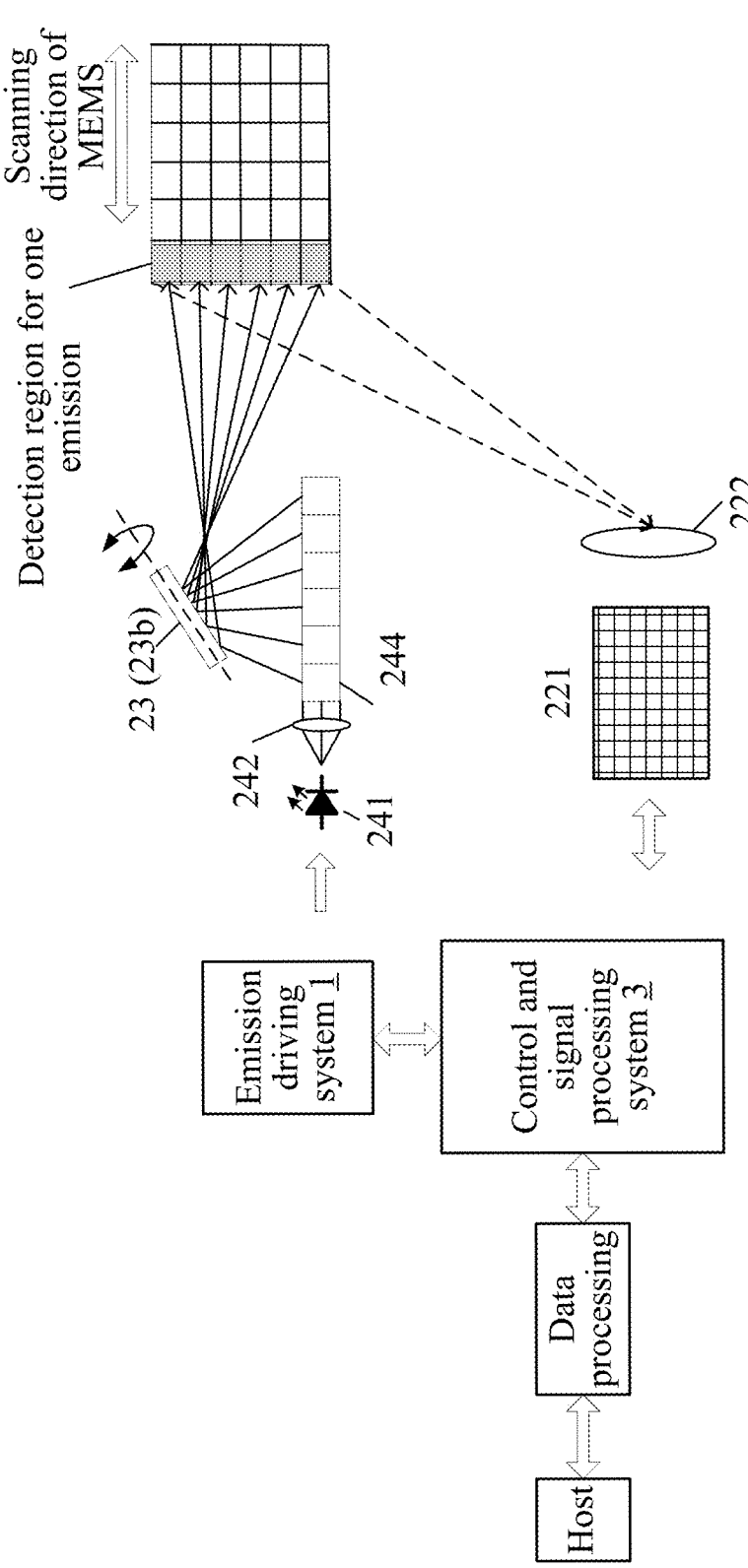
FIG. 29b is a schematic diagram of an optical path of a LiDAR according to still another embodiment of the present disclosure.

As shown in FIG. 29a, the deflection mechanism 23 is exactly located at a focal position at which the outgoing laser is focused. When the deflection mechanism 23 is at this position, the size of the deflection mechanism 23 can be minimized. The deflection mechanism 23 may also be located at a non-focus position, for example, a position shown in FIG. 29b. In this case, the deflection mechanism 23 has a larger size than that in FIG. 29a.

Figure 30:
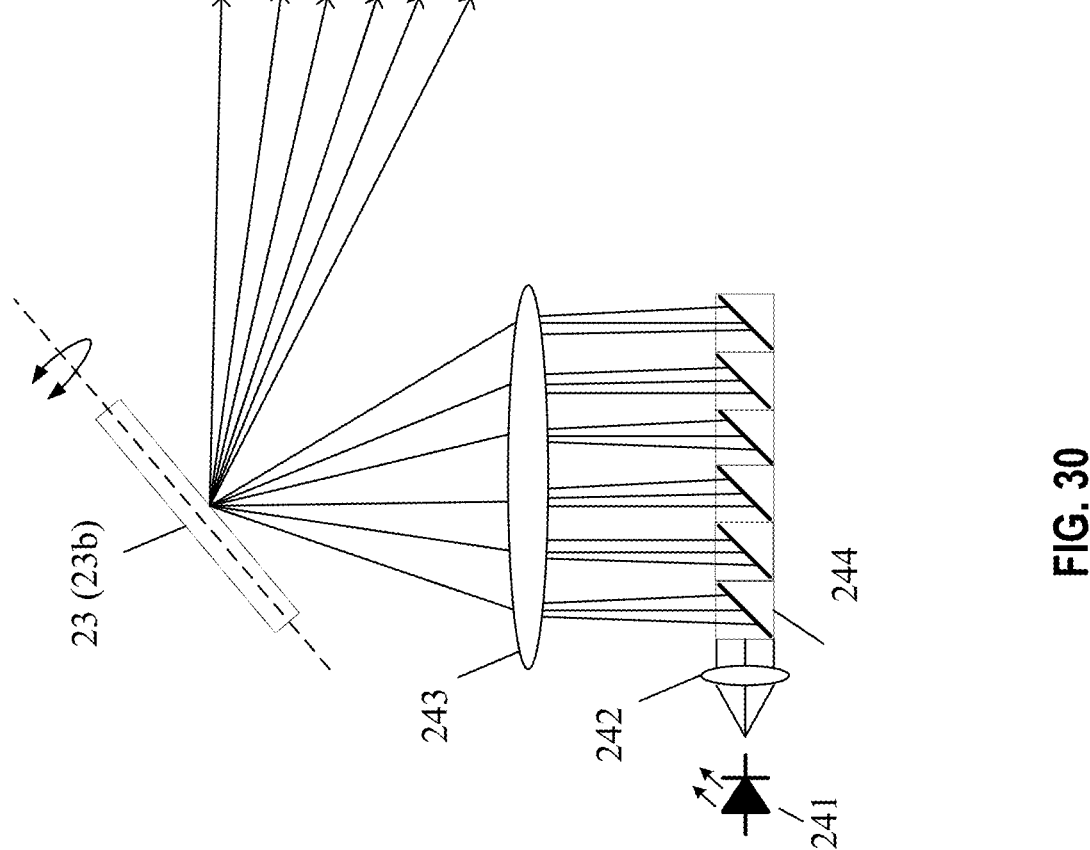
FIG. 30 is a schematic diagram of a local optical path of a LiDAR according to yet another embodiment of the present disclosure.

As shown in FIG. 30 in another embodiment, in addition to the use of the second optical shaping module 242 to collimate the outgoing laser emitted by the laser emission module 241, a lens 243 is also configured to focus the outgoing laser deflected by each plane mirror and emit the outgoing laser to the deflection mechanism 23. There is an optical path gap between the outgoing laser beams collimated by the second optical shaping module 242, and as a result, the light spot reflected by the deflection mechanism 23 is a discontinuous linear light spot, thereby causing a blind spot for detection. A lens 243 is provided on an outgoing laser path reflected by the plane mirror to focus the beam, so that the light spot incident on the deflection mechanism 23 is a continuous gapless linear light spot, and therefore, the light spot reflected by the deflection mechanism 23 is also a continuous gapless linear light spot to avoid a blind spot during detection.

The following describes a case of shaping the linear light spot when the light spot of the outgoing laser in the foregoing embodiment is a linear light spot.

Figure 31A:
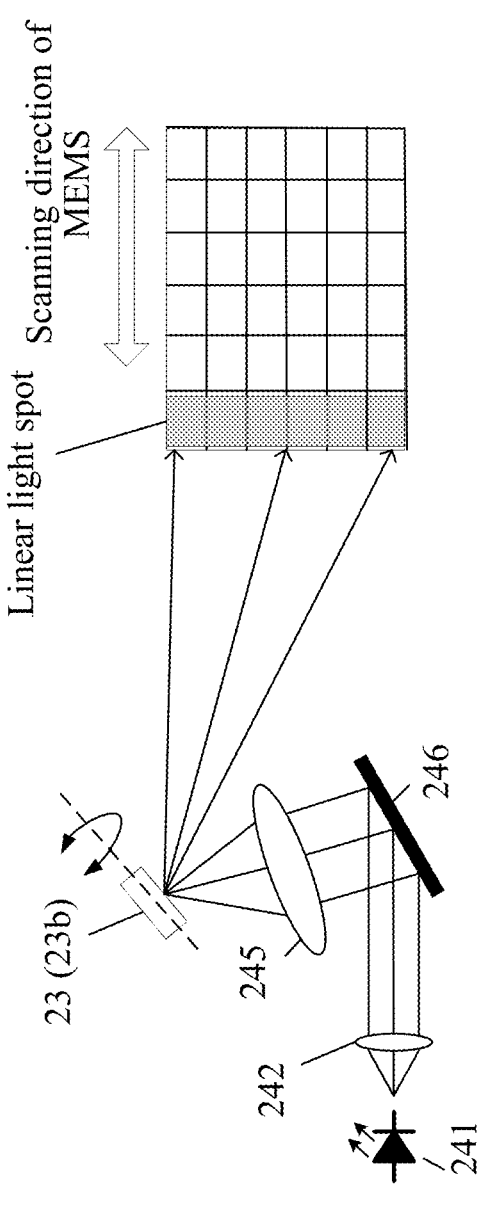
FIG. 31a is a schematic diagram of a local optical path of a LiDAR including an optical shaping module according to an embodiment of the present disclosure.

There is an optical path gap between outgoing laser beams collimated by the laser emission module 241, and therefore, a light spot reflected by the deflection mechanism 23 is a non-continuous linear light spot, and there is a blind spot during detection. Therefore, as shown in FIG. 31a, in some embodiments, the LiDAR 100 may further be provided with a third optical shaping module 245 between the second optical shaping module 242 and the deflection mechanism 23. The laser device 2412 is used as the laser emission module 241, the laser emission module 241 is configured to emit the outgoing laser to the second optical shaping module 242, and the outgoing laser is collimated by the second optical shaping module 242 into a linear light spot and then emitted to the third optical shaping module 245. The third optical shaping module 245 is configured to focus the outgoing laser and emit the outgoing laser to the deflection mechanism 23. The deflection mechanism 23 is configured to receive the outgoing laser and reflect the outgoing laser to the detection region of the array detector 221. The deflection mechanism 23 is also configured to scan through the outgoing laser in the form of the linear light spot to traverse the entire detection region. The third optical shaping module 245 may use a cylindrical lens or a micro-cylindrical-lens array. The deflection mechanism 23 may use a device that can implement optical scanning, such as a MEMS micromirror, a reflector, or a transmission prism. In this embodiment, the linear light spot covers the entire detection region in the vertical direction, and therefore, a one-dimensional MEMS micromirror 23b can be used as the deflection mechanism 23, to complete scanning in one direction through the one-dimensional MEMS micromirror 23b. If the linear light spot only covers part of the detection region in the vertical direction, the two-dimensional MEMS micromirror is required. To reduce the size of the product, a reflection module may also be provided in the optical path. For example, in this embodiment, a reflector 246 is provided between the second optical shaping module 242 and the third optical shaping module 245.

In this embodiment, the third optical shaping module 245 is provided between the second optical shaping module 242 and the deflection mechanism 23, and therefore, the third optical shaping module 245 focuses the outgoing laser and then emits the outgoing laser to the deflection mechanism 23, so that an outgoing laser spot reflected by the deflection mechanism 23 is a continuous gapless linear light spot, to avoid a blind spot during detection.

Figure 31B:
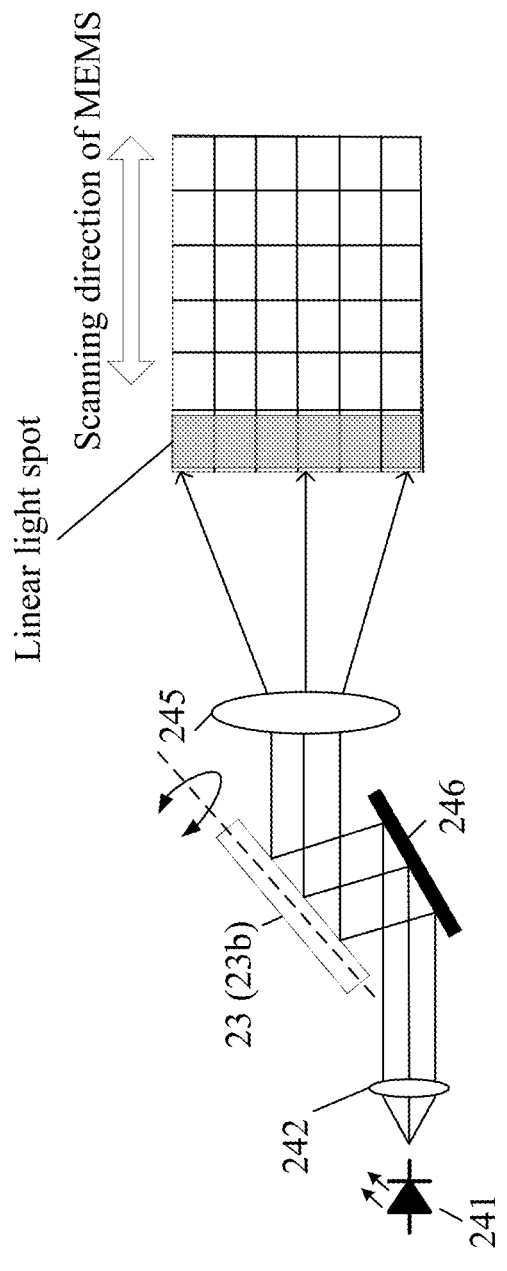
FIG. 31b is a schematic diagram of a local optical path of a LiDAR including an optical shaping module according to another embodiment of the present disclosure.
Figure 31C:
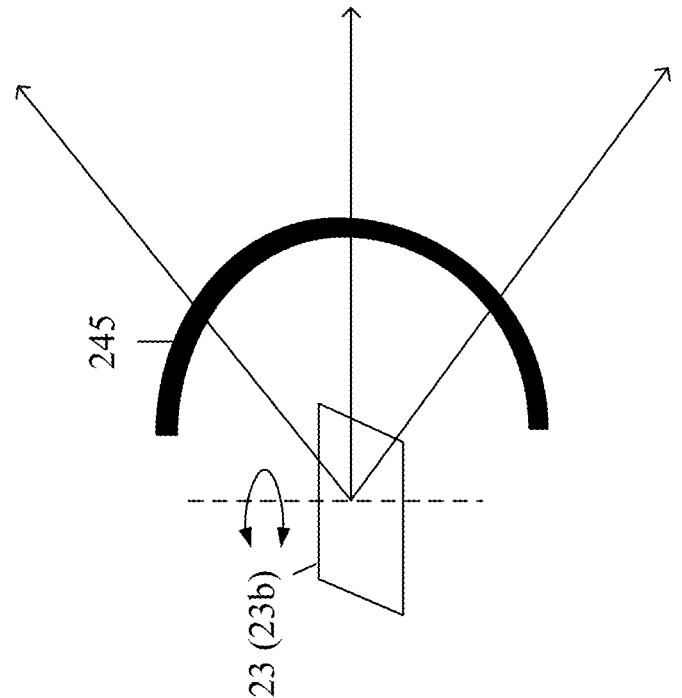
FIG. 31c is a schematic diagram of a deflection mechanism and the optical shaping module in FIG. 31b.

The position of the third optical shaping module 245 can also be adjusted. As shown in FIG. 31*b*, in another embodiment, the third optical shaping module 245 is provided on an optical path of the outgoing laser reflected by the deflection mechanism 23. The laser emission module 241 is configured to emit an outgoing laser to the second optical shaping module 242, and the outgoing laser is collimated by the second optical shaping module 242 into a linear light spot and then emitted to the deflection mechanism 23. The deflection mechanism 23 is configured to receive the outgoing laser and reflect the outgoing laser to the third optical shaping module 245. The third optical shaping module 245 is configured to shape the outgoing laser into a continuous gapless linear light spot and then emit the continuous gapless linear light spot to the detection region of the array detector 221. The deflection mechanism 23 is further configured to scan through the linear light spot to traverse the entire detection region. The third optical shaping module 245 is the cylindrical lens or the micro-cylindrical-lens array. For example, a cross-section of the third optical shaping module 245 in a rotation plane of the deflection mechanism 23 is arc-shaped and is symmetrical around the deflection mechanism 23, as shown in FIG. 31*c*. The deflection mechanism 23 may use a device that can implement optical scanning, such as a MEMS micromirror, a reflector, or a transmission prism. In this embodiment, the linear light spot covers the entire detection region in the vertical direction, and therefore, a one-dimensional MEMS micromirror 23*b* can be used as the deflection mechanism 23, to complete scanning in one direction through the one-dimensional MEMS micromirror 23*b*. If the linear light spot only covers part of the detection region in the vertical direction, the two-dimensional MEMS micromirror is required.

In this embodiment, the third optical shaping module 245 is provided on the optical path of the outgoing laser reflected by the deflection mechanism 23. The third optical shaping module 245 shapes the outgoing laser reflected by the deflection mechanism 23 into the continuous gapless linear light spot and then emits the linear light spot to the detection region of the array detector 221, and a finally emitted outgoing laser spot is the continuous gapless linear light spot, thereby avoiding the blind spot during detection.

Based on the forgoing LiDAR 100, an embodiment of the present disclosure proposes an automated driving device 200, including the LiDAR 100 in the forgoing embodiment. The automated driving device 200 may be a car, an airplane, a boat, or other related apparatuses where the LiDAR is used for intelligent sensing and detection. The automated driving device 200 includes a driving device body 201 and the LiDAR 100 in the forgoing embodiment. The LiDAR 100 is mounted on the driving device body 201.

Figure 32A:
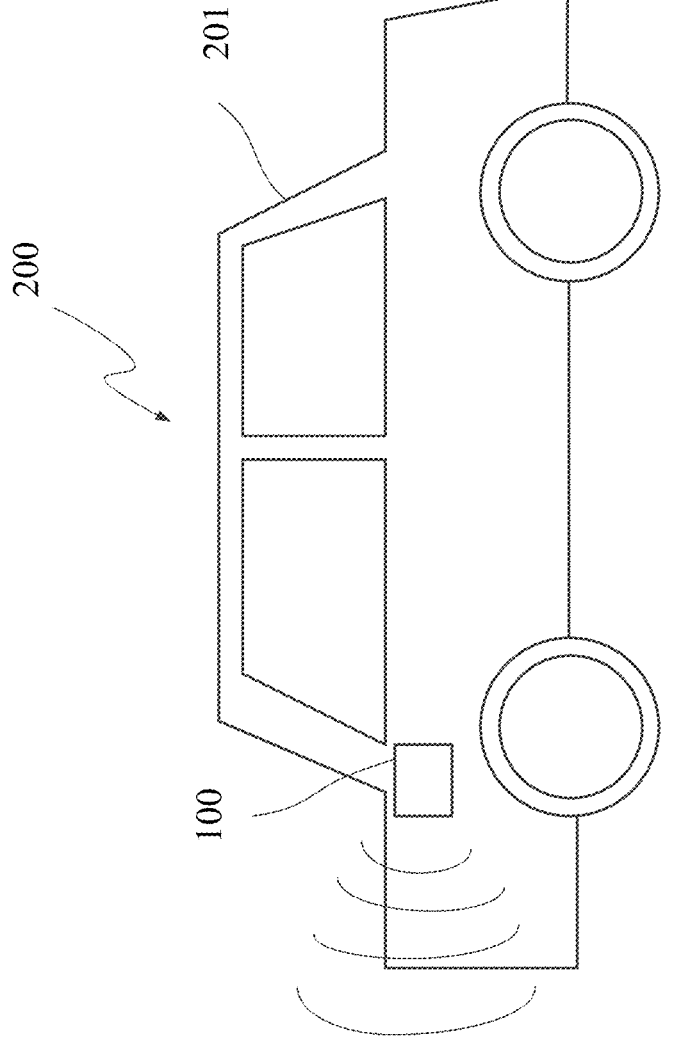
FIG. 32a is a schematic structural diagram of an automated driving device according to an embodiment of the present disclosure.
Figure 32B:
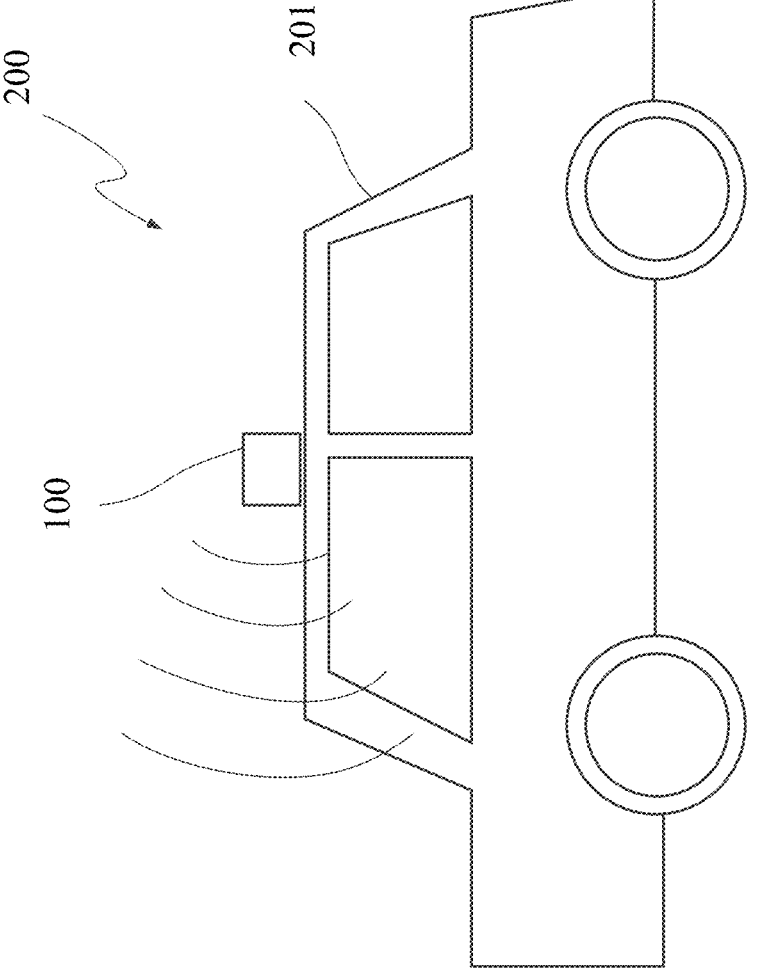
FIG. 32*b* is a schematic structural diagram of an automated driving device according to another embodiment of the present disclosure.

As shown in FIG. 32*a*, the automated driving device 200 is an unmanned vehicle, and the LiDAR 100 is mounted on a side face of the vehicle body. As shown in FIG. 32*b*, the automated driving device 200 is also the unmanned vehicle, and the LiDAR 100 is mounted on a roof of the vehicle.

Finally, it should be noted that the foregoing embodiments are intended for describing instead of limiting the technical solutions of the present disclosure. Although the present disclosure is described in detail with reference to the foregoing embodiments, the person skilled in the art should understand that modifications may be made to the technical solutions described in the foregoing embodiments or equivalent replacements may be made to some or all technical features thereof, without departing from the scope of the technical solutions. All these modifications or replacements shall fall within the scope of the claims and specification of the present disclosure. Particularly, the technical features mentioned in all embodiments may be combined in any manner, provided that no structural conflict occurs. The present disclosure is not limited to the specific embodiments disclosed in this specification, but includes all technical solutions that fall within the scope of the claims.

What is claimed is:

1. A LiDAR, comprising an emission driving system, a laser transceiving system, and a control and signal processing system, wherein the laser transceiving system comprises an emission assembly and a receiving assembly;

the emission assembly is configured to emit an outgoing laser, the outgoing laser scanning to traverse a detection region, wherein the emission assembly comprises a laser emission module comprising a plurality of laser emission units, wherein the laser emission module is an array emitter, the laser emission units are m*n laser emission units of the array emitter, and on-off of the laser emission units is separately controlled;

the receiving assembly comprises an array detector comprising a plurality of detection units, and the array detector is configured to synchronously and sequentially turn on the detection units to receive an echo laser, the echo laser being a laser returned after the outgoing laser is reflected by an object in a detection region, wherein the array detector comprises m*n detection units, and wherein m and n are both integers greater than 1;

the emission driving system is used to drive the emission assembly; and the control and signal processing system is used to control the emission driving system to drive the emission assembly, and to control the receiving assembly to receive the echo laser, wherein the array emitter is configured to sequentially turn on a first laser emission unit to emit the outgoing laser, and wherein the first laser emission unit comprises one or more laser emission units;

the array detector is configured to turn on a first detection unit synchronously and sequentially to receive the echo laser, wherein the first detection unit comprises one or more detection units; and a position of the first detection unit corresponds to a position of the first laser emission unit, and the echo laser received by the first detection unit is the laser returned after the outgoing laser emitted by the first laser emission unit is reflected by the object in the detection region, wherein the first laser emission units comprise only one laser emission unit, and the first detection units comprise only one detection unit; and the array detector is also configured to turn on one or more of second detection units synchronously and sequentially to receive the echo laser, and the one or more of second detection units are around the first detection unit; or wherein the first laser emission unit comprises p*q laser emission units, and the first detection unit comprises p*q detection units, and wherein both p and q are integers greater than or equal to 1, and 1≤p≤m or 1≤q≤n, wherein p is less than m, and q is less than n; and the laser emission module is configured to turn on the laser emission units along a first direction and then an opposite direction of the first direction back and forth, or turn on the laser emission units row by row or column by column along the first direction constantly; or p is equal to m, and q is less than n; and the laser emission module is configured to turn on the laser emission units in a vertical direction; or p is less than m, and q is equal to n; and the laser emission module is configured to turn on the laser emission units in a horizontal direction.

2. The LiDAR according to claim 1, wherein the laser emission module is configured to sequentially turn on the laser emission units to emit the outgoing laser, the outgoing laser scanning to traverse all detection regions of the array detector.

3. The LiDAR according to claim 2, wherein the array detector is configured to turn on a selected detection unit, to detect a detection region scanned by the outgoing laser emitted by the laser emission units.

4. The LiDAR according to claim 3, wherein the array emitter is configured to sequentially turn on the laser emission units to emit the outgoing laser, the outgoing laser scanning to traverse all the detection regions of the array detector.

\* \* \* \* \*